United States Patent
Hreha et al.

(10) Patent No.: US 10,128,577 B2
(45) Date of Patent: Nov. 13, 2018

(54) SATELLITE SYSTEM WITH DIFFERENT FREQUENCY PLAN AT THE EQUATOR

(71) Applicant: Space Systems/Loral, LLC, Palo Alto, CA (US)

(72) Inventors: William Hreha, San Jose, CA (US); Guillaume Lamontagne, Montreal (CA); Eric Shima, Montreal (CA)

(73) Assignee: Space Systems/Loral, LLC, Palo Alto, CA (US)

( * ) Notice: Subject to any disclaimer, the term of this patent is extended or adjusted under 35 U.S.C. 154(b) by 189 days.

(21) Appl. No.: 15/172,882

(22) Filed: Jun. 3, 2016

(65) Prior Publication Data
US 2017/0290012 A1    Oct. 5, 2017

Related U.S. Application Data

(60) Provisional application No. 62/314,938, filed on Mar. 29, 2016.

(51) Int. Cl.
*H01Q 21/24* (2006.01)
*H04W 16/28* (2009.01)
(Continued)

(52) U.S. Cl.
CPC ........... *H01Q 21/24* (2013.01); *H01Q 3/2682* (2013.01); *H04B 7/043* (2013.01); *H04B 7/18515* (2013.01); *H04B 7/18519* (2013.01); *H04B 7/18523* (2013.01); *H04B 7/18534* (2013.01); *H04B 7/18541* (2013.01);
(Continued)

(58) Field of Classification Search
CPC ............. H04W 16/28; H04W 56/0015; H04W 72/0413; H04W 72/042; H04W 72/0446; H04W 72/0453; H04W 84/18; H04B 7/18519; H04B 7/18578
See application file for complete search history.

(56) References Cited

U.S. PATENT DOCUMENTS 5,736,959 A * 4/1998 Patterson ............... H01Q 1/242
                                                        342/354
5,784,695 A    7/1998 Upton
(Continued)

FOREIGN PATENT DOCUMENTS

EP    0961420    12/1999

OTHER PUBLICATIONS

Hreha, "Satellite System Using Time Domain Beam Hopping," U.S. Appl. No. 15/172,825, filed Jun. 3, 2016.
(Continued)

*Primary Examiner* — Dominic Rego
(74) *Attorney, Agent, or Firm* — Vierra Magen Marcus LLP

(57) ABSTRACT

A non-geostationary satellite is configured to provide a plurality of spot beams that implement a first frequency plan at Earth's Equator and a second frequency plan away from Earth's Equator. The second frequency plan is different than the first frequency plan. In one embodiment, the non-geostationary satellite is part of a constellation of non-geostationary satellites, with each of the satellites providing spot beams that implement a first frequency plan at Earth's Equator and implement a second frequency plan away from Earth's Equator as the satellites travel in orbit around Earth.

27 Claims, 54 Drawing Sheets

(51) Int. Cl.
| | |
|---|---|
| *H04B 7/185* | (2006.01) |
| *H04W 72/04* | (2009.01) |
| *H04W 56/00* | (2009.01) |
| *H01Q 3/26* | (2006.01) |
| *H04B 7/0426* | (2017.01) |
| *H04W 84/18* | (2009.01) |
| *H04B 7/19* | (2006.01) |

(52) U.S. Cl.
CPC ..... *H04B 7/18578* (2013.01); *H04B 7/18584* (2013.01); *H04W 16/28* (2013.01); *H04W 56/0015* (2013.01); *H04W 72/042* (2013.01); *H04W 72/0413* (2013.01); *H04W 72/0446* (2013.01); *H04W 72/0453* (2013.01); *H04B 7/18513* (2013.01); *H04B 7/18521* (2013.01); *H04B 7/18547* (2013.01); *H04B 7/18595* (2013.01); *H04B 7/19* (2013.01); *H04W 72/046* (2013.01); *H04W 84/18* (2013.01)

(56) References Cited

U.S. PATENT DOCUMENTS

| | | | | |
|---|---|---|---|---|
| 5,790,070 A | * | 8/1998 | Natarajan | H01Q 1/288 342/354 |
| 5,969,669 A | * | 10/1999 | Ishikawa | H04B 7/18547 342/357.2 |
| 6,424,310 B1 | * | 7/2002 | Broas | H01Q 19/17 343/779 |
| 6,491,257 B1 | | 12/2002 | Emmons, Jr. | |
| 6,522,643 B1 | * | 2/2003 | Jacomb-Hood | H04B 7/18539 370/330 |
| 6,539,003 B1 | | 3/2003 | Agarwal | |
| 6,684,056 B1 | | 1/2004 | Emmons, Jr. | |
| 6,726,152 B2 | | 4/2004 | Higgins | |
| 6,766,987 B2 | | 7/2004 | Taormina | |
| 6,850,732 B2 | | 2/2005 | Patterson | |
| 6,904,265 B1 | | 6/2005 | Valdivia | |
| 6,944,140 B1 | * | 9/2005 | Linsky | H04B 7/18515 370/323 |
| 6,992,992 B1 | * | 1/2006 | Cooper | H04B 7/18513 370/316 |
| 7,263,090 B2 | | 8/2007 | Cronin | |
| 7,869,759 B2 | | 1/2011 | Pateros | |
| 8,077,652 B2 | | 12/2011 | Thesling | |
| 8,218,476 B2 | | 7/2012 | Miller | |
| 8,315,199 B2 | | 11/2012 | Dankberg | |
| 8,340,016 B1 | | 12/2012 | Miller | |
| 8,401,467 B2 | | 3/2013 | Miller | |
| 8,427,999 B2 | | 4/2013 | Foxworthy | |
| 8,433,332 B2 | | 4/2013 | Agarwal | |
| 8,494,445 B2 | | 7/2013 | Miller | |
| 8,712,321 B1 | * | 4/2014 | Dankberg | H04B 7/18513 370/316 |
| 8,805,275 B2 | | 8/2014 | O'Neill | |
| 8,989,652 B2 | | 3/2015 | Whelan | |
| 8,995,943 B2 | | 3/2015 | Corman | |
| 9,014,620 B2 | | 4/2015 | Dankberg | |
| 9,130,644 B2 | | 9/2015 | Jayasinha | |
| 9,253,003 B1 | * | 2/2016 | Harel | H04L 25/03006 |
| 9,591,498 B1 | * | 3/2017 | Pearson | H04W 56/0035 |
| 2002/0110094 A1 | * | 8/2002 | Reddy | H04B 7/2041 370/316 |
| 2004/0192376 A1 | * | 9/2004 | Grybos | H04B 7/18519 455/552.1 |
| 2011/0210888 A1 | * | 9/2011 | Mercier | G01S 19/07 342/357.27 |
| 2011/0268158 A1 | * | 11/2011 | Miller | H04B 7/2041 375/138 |
| 2011/0274253 A1 | * | 11/2011 | Gorman | H04L 12/2801 379/32.04 |
| 2013/0069820 A1 | * | 3/2013 | Wyler | H04B 7/195 342/354 |
| 2013/0070666 A1 | * | 3/2013 | Miller | H04B 7/212 370/326 |
| 2014/0197987 A1 | * | 7/2014 | Corman | H04B 7/10 342/352 |
| 2014/0225767 A1 | * | 8/2014 | Cordone | H04B 7/18508 342/352 |
| 2015/0158602 A1 | | 6/2015 | Marshack | |
| 2015/0244433 A1 | * | 8/2015 | Jindal | H04B 7/0413 370/329 |
| 2015/0365870 A1 | * | 12/2015 | Lauer | H04W 36/24 370/331 |
| 2017/0026110 A1 | * | 1/2017 | Richardson | H01Q 1/1257 |

OTHER PUBLICATIONS

Hreha, "Synchronization for Satellite System," U.S. Appl. No. 15/172,859, filed Jun. 3, 2016.

Hreha, "Satellite System With Single Polarization Path," U.S. Appl. No.15/172,965, filed Jun. 3, 2016.

Hreha, "Satellite System With Steerable Gateway Beams," U.S. Appl. No.15/172,978, filed Jun. 3, 2016.

Hreha, "Satellite System Having Terminals in Hopping Beams Communicating With More Than One Gateway," U.S. Appl. No. 15/173,038, filed Jun. 3, 2016.

Hreha, "Satellite System With Beam Hopping Plan That Takes Into Account the Needs of Gateways and Subscriber Terminals," U.S. Appl. No. 15/173,054, filed Jun. 3, 2016.

Hreha, "Satellite System Beam to Beam Handover," U.S. Appl. No. 15/173,083, filed Jun. 3, 2016.

Hreha, "Satellite System With Handover for Multiple Gateways," U.S. Appl. No. 15/173,097, filed Jun. 3, 2016.

DVB Fact Sheet—2nd Generation Satellite, DVB S2, Aug. 2012.

Digital Video Broadcasting, Second generation framing structure, channel coding and modulation systems for Broadcasting, Interactive Services, News Gathering and other broadband satellite applications, Part I (DVB-S2), Nov. 2014.

Digital Video Broadcasting, Implementation guidelines for the second generation system for Broadcasting, Interactive Services, News Gathering and other broadband satellite applications, Part I (DVB-S2), Mar. 2015.

\* cited by examiner

Field of Regard

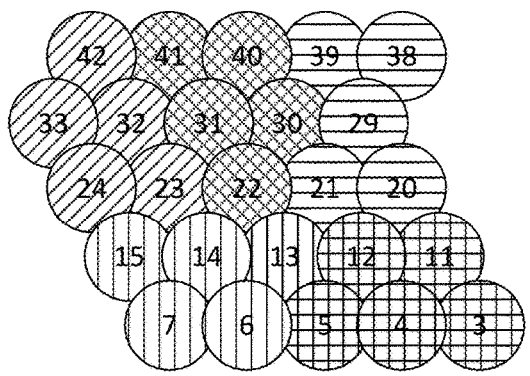
Figure 16A
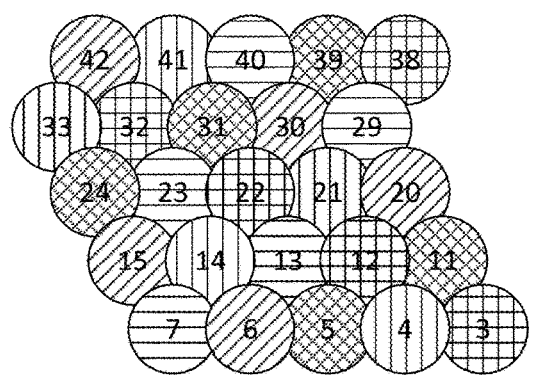
Figure 16B
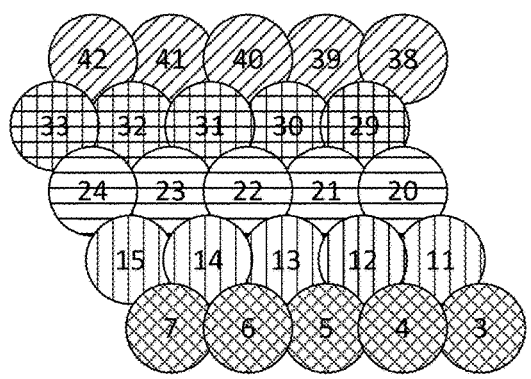
Figure 16C
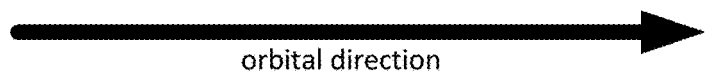

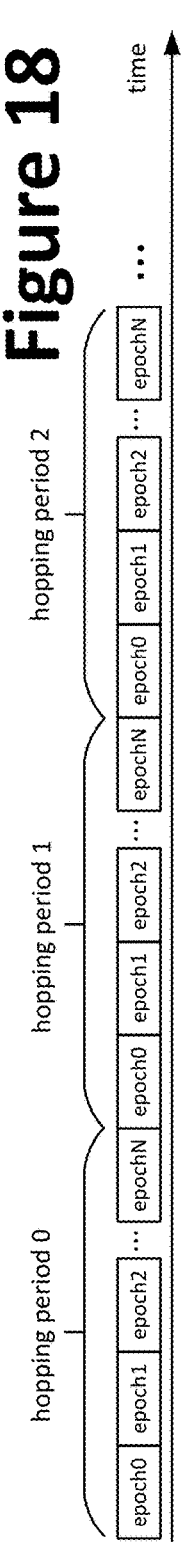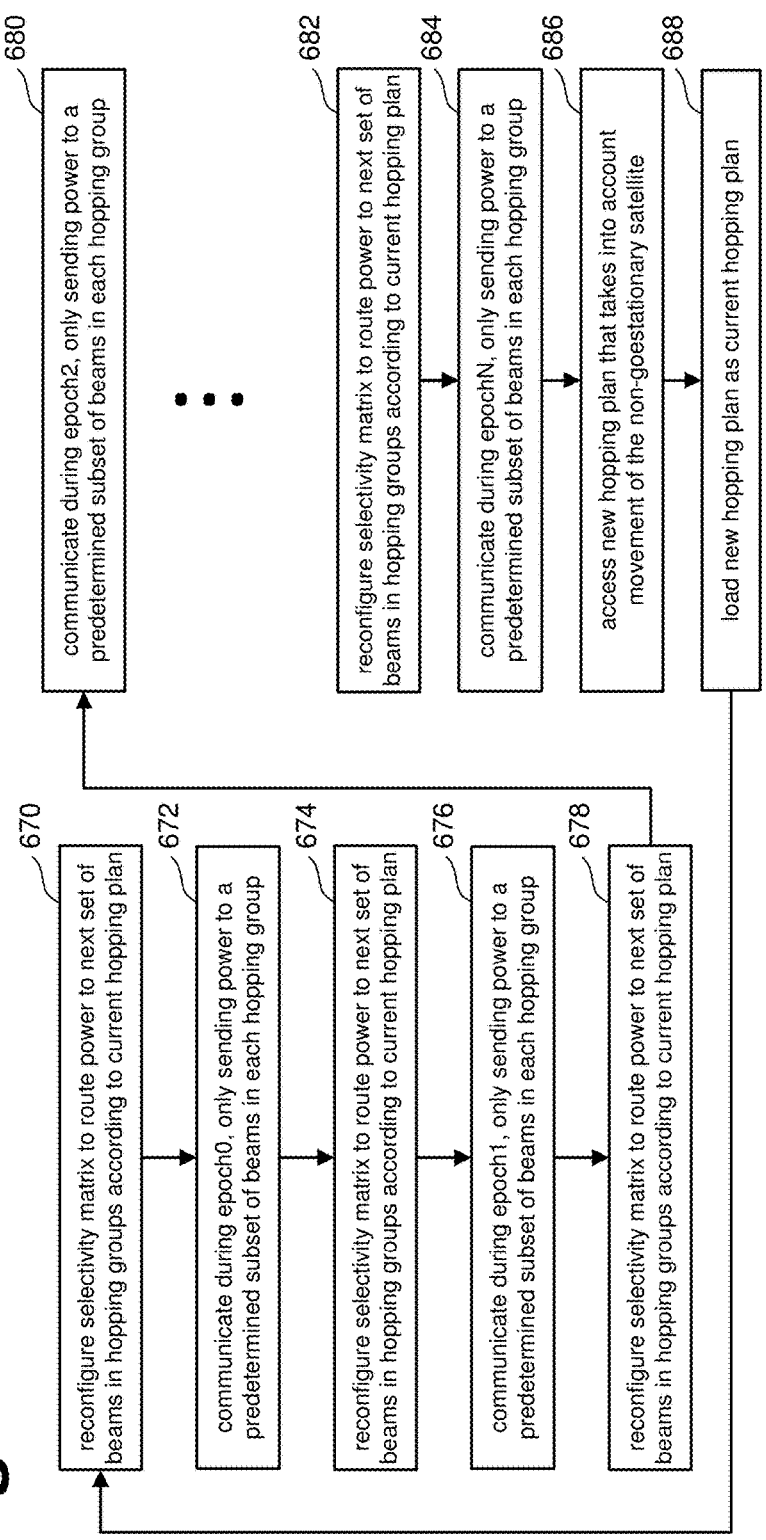

Field of Regard

| HG1 | 1 | 23 | 55 | 78 | 129 | 153 | 189 |
|---|---|---|---|---|---|---|---|
| HG2 | 2 | 24 | 56 | 79 | 130 | 154 | 190 |
| HG3 | 3 | 31 | 57 | 80 | 131 | 155 | - |
| HG4 | 4 | 32 | 58 | 198 | 132 | 156 | - |
| HG5 | 5 | 33 | 59 | 110 | 133 | 165 | - |
| HG6 | 6 | 34 | 60 | 111 | 134 | 166 | - |
| HG7 | 7 | 35 | 61 | 112 | 135 | 167 | - |
| HG8 | 8 | 36 | 63 | 113 | 136 | 168 | - |
| HG9 | 9 | 37 | 64 | 114 | 137 | 169 | - |
| HG10 | 10 | 38 | 65 | 115 | 147 | 170 | - |
| HG11 | 11 | 39 | 66 | 116 | 148 | 171 | - |
| HG12 | 12 | 40 | 67 | 117 | 149 | 172 | - |
| HG13 | 13 | 41 | 68 | 118 | 150 | 173 | - |
| HG14 | 14 | 42 | 69 | 124 | 151 | 178 | - |
| HG15 | 15 | 43 | 70 | 125 | 152 | 179 | - |
| HG16 | 16 | 44 | 71 | 126 | 200 | 180 | - |
| HG17 | 17 | 45 | 72 | 127 | 157 | 181 | - |
| HG18 | 18 | 46 | 73 | 128 | 158 | 182 | - |
| HG19 | 19 | 47 | 74 | 199 | 159 | 183 | - |
| HG20 | 20 | 48 | 75 | 138 | 160 | 184 | - |
| HG21 | 21 | 49 | 76 | 139 | 161 | 185 | - |
| HG22 | 22 | 50 | 77 | 140 | 162 | 186 | - |
| HG23 | 25 | 51 | 196 | 141 | 163 | 187 | - |
| HG24 | 26 | 52 | 123 | 142 | 164 | 188 | - |
| HG25 | 27 | 53 | 122 | 143 | 174 | 191 | - |
| HG26 | 28 | 54 | 121 | 144 | 175 | 192 | - |
| HG27 | 29 | 195 | 120 | 145 | 176 | 193 | - |
| HG28 | 30 | 62 | 119 | 146 | 177 | 194 | - |

Figure 21

| EHG1 | 91 | 99 | 106 | 85 |
|---|---|---|---|---|
| EHG2 | 92 | 89 | 101 | 104 |
| EHG3 | 93 | 97 | 90 | 103 |
| EHG4 | 94 | 98 | 86 | 197 |
| EHG5 | 81 | 95 | 100 | 107 |
| EHG6 | 82 | 96 | 102 | - |
| EHG7 | 83 | 108 | 88 | 105 |
| EHG8 | 84 | - | 87 | 109 |

Figure 22

Field of Regard

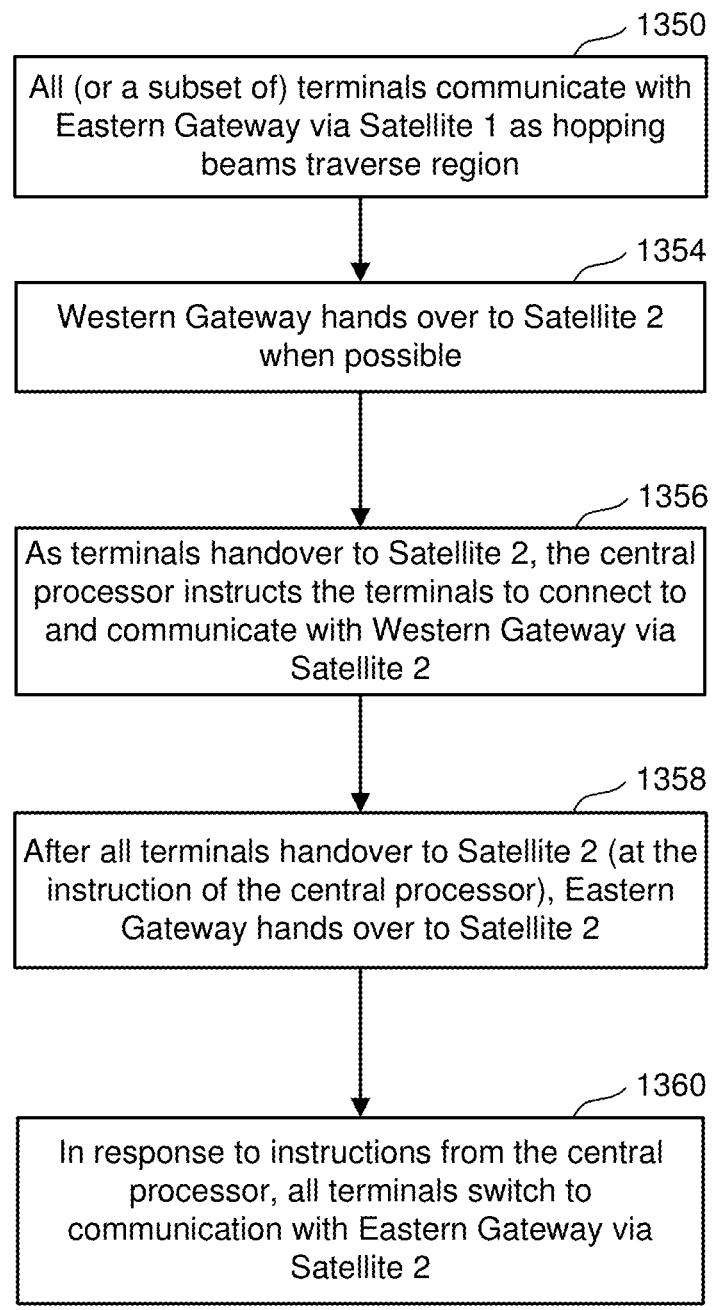

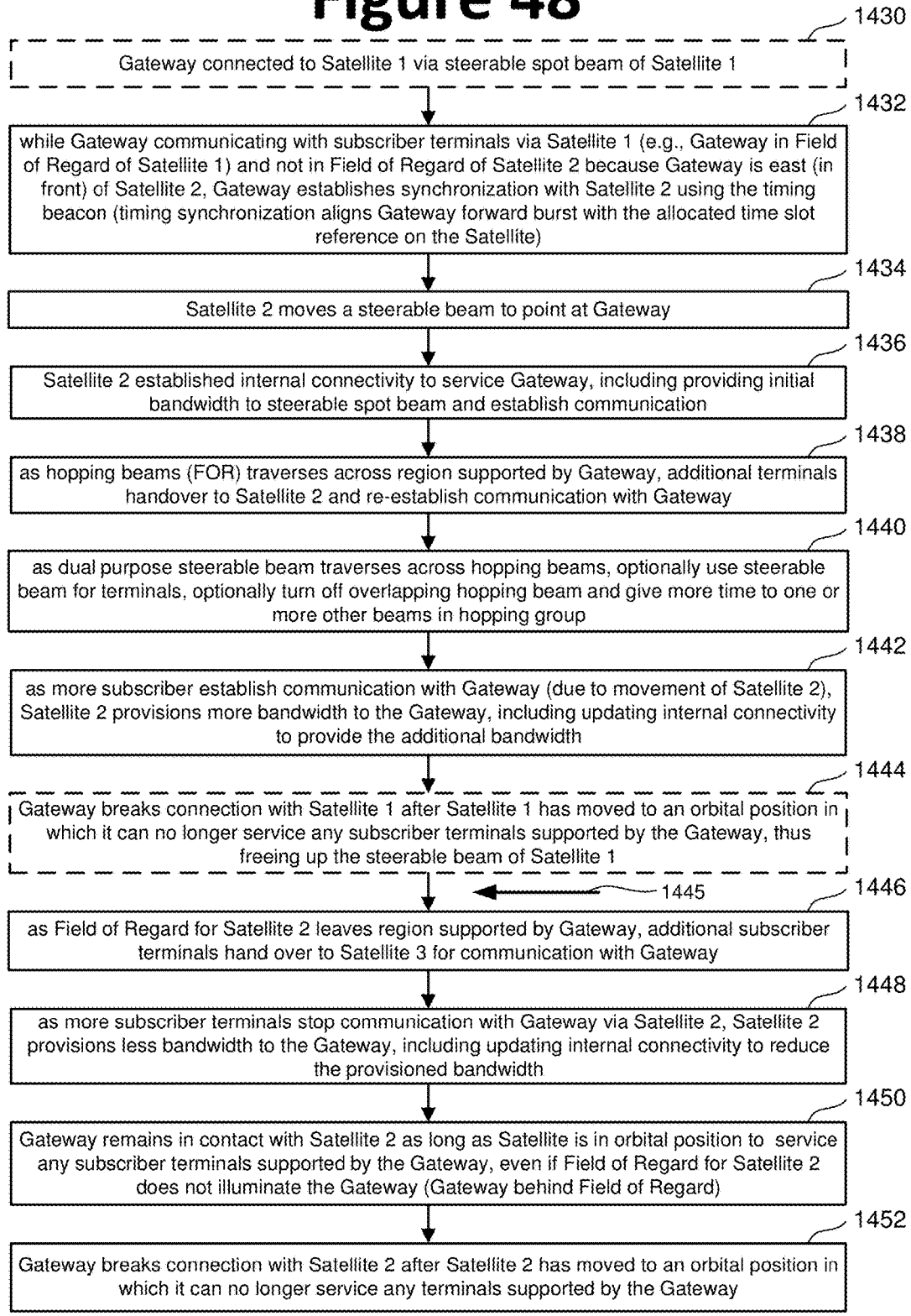

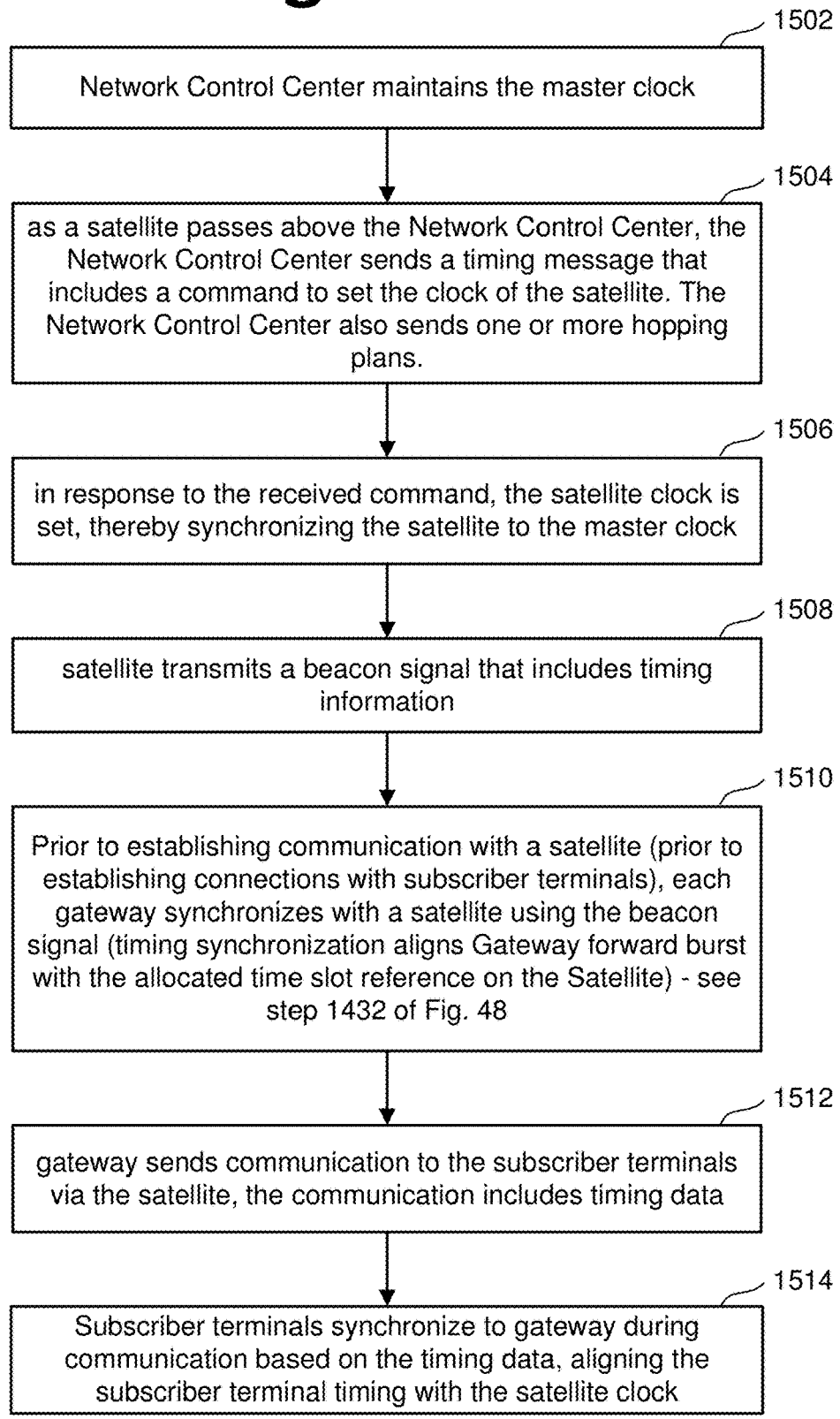

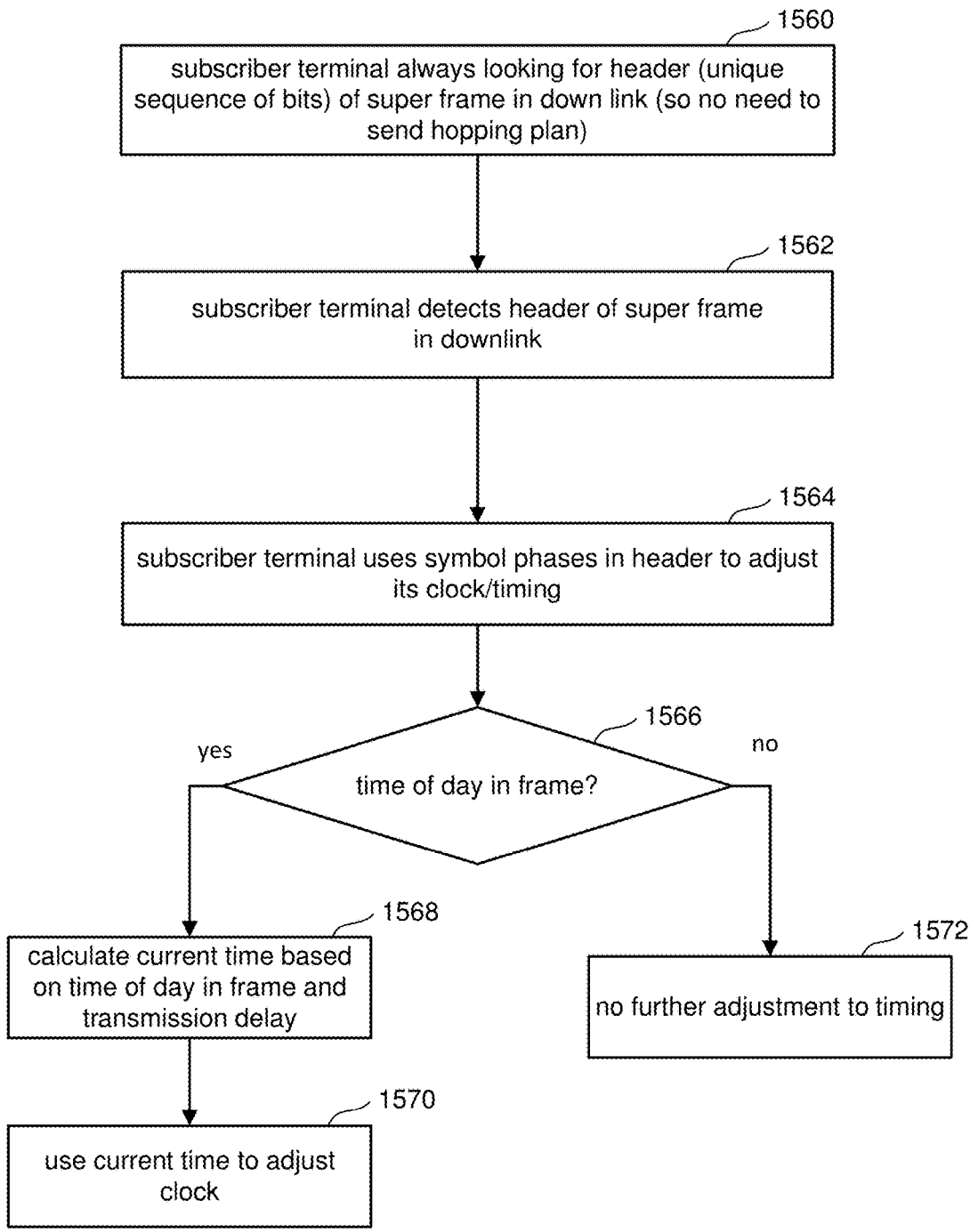

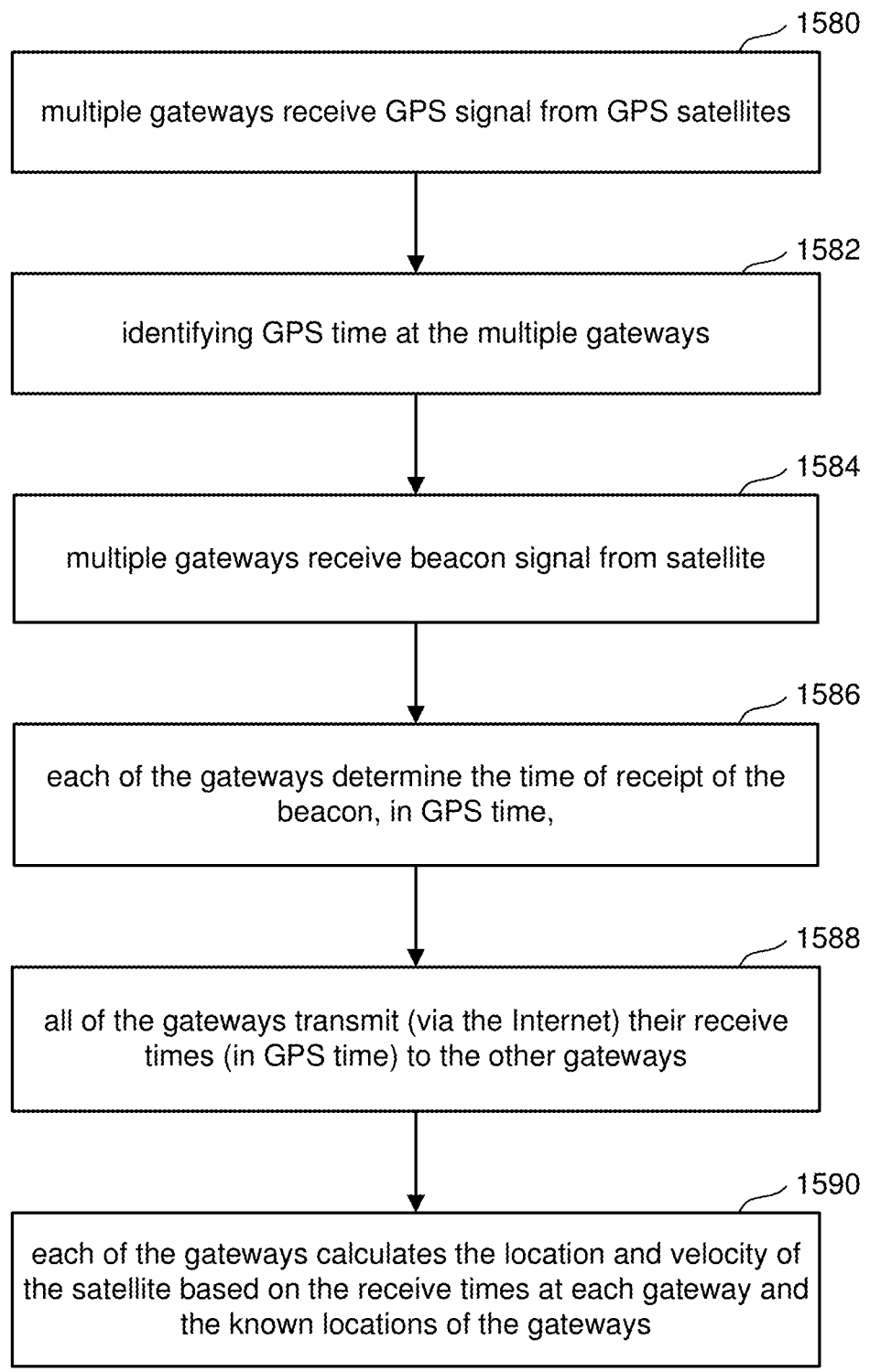

SATELLITE SYSTEM WITH DIFFERENT FREQUENCY PLAN AT THE EQUATOR

This application claims priority to U.S. Provisional Application No. 62/314,938, "Non-Geostationary Satellite Constellation Communication System," filed on Mar. 29, 2016, incorporated herein by reference.

BACKGROUND

The present disclosure relates to technology for satellite communication systems.

Satellite communication systems typically include one or more satellites and a set of ground terminals. Such systems typically operate within regulations that allocate operating frequency bandwidth for a particular communications service and specify, among other things, a maximum signal power spectral density of communications signals radiated to the ground. A growing market exists for provision of high data rate communication services to individual consumers and small businesses which may be underserved by or unable to afford conventional terrestrial services. Satellite communication systems have been proposed to provide such high data rate communication services. However, designing a satellite system to meet these needs is challenging.

BRIEF DESCRIPTION OF THE DRAWINGS

FIGS. 16A, 16B, and 16C depict example beam maps.

FIG. 18 is a timing diagram describing time domain beam hopping.

FIG. 19 is a flow chart describing one embodiment of a process for performing time domain beam hopping.

FIG. 21 is a table providing an example assignment of hopping groups away from the Equator.

FIG. 22 is a table providing an example assignment of hopping groups at the Equator.

FIG. 45 is a flow chart describing one embodiment of a process for performing a handover of gateways between satellites, where the gateways are operating within hopping beams and communicating with hopping beams.

FIG. 48 is a flow chart describing one embodiment of a process for performing a handover for gateways communicating with steerable spot beams of the satellites in the constellation.

FIG. 50 is a flow chart describing one embodiment of a process for performing timing synchronization for the satellite communication system.

FIG. 52 is a flow chart describing one embodiment of a process for synchronizing a subscriber terminal to a gateway.

FIG. 53 is a flow chart describing one embodiment of a process performed by gateways to automatically determine a location of a satellite.

DETAILED DESCRIPTION

System Overview

A satellite communication system is proposed that comprises a constellation of non-geostationary satellites orbiting the Earth, a plurality of gateways and a plurality of subscriber terminals (also referred to as terminals). The subscriber terminals communicate with the gateways via the satellites, as the satellites move in orbit. Each of the satellites provide a plurality of non-articulated spot beams that implement time domain beam hopping and a plurality of steerable spot beams for communicating with the gateways and subscriber terminals. The system can be used to provide access to the Internet or other network, telephone services, video conferencing services, private communications, broadcast services, as well as other communication services.

A non-geostationary satellite is configured to provide a plurality of spot beams that implement a first frequency plan at Earth's Equator and a second frequency plan away from Earth's Equator. The second frequency plan is different than the first frequency plan. In one embodiment, the non-geostationary satellite is part of a constellation of non-geostationary satellites, with each of the satellites providing spot beams that implement a first frequency plan at Earth's Equator and implement a second frequency plan away from Earth's Equator as the satellites travel in orbit around Earth.

Figure 1:
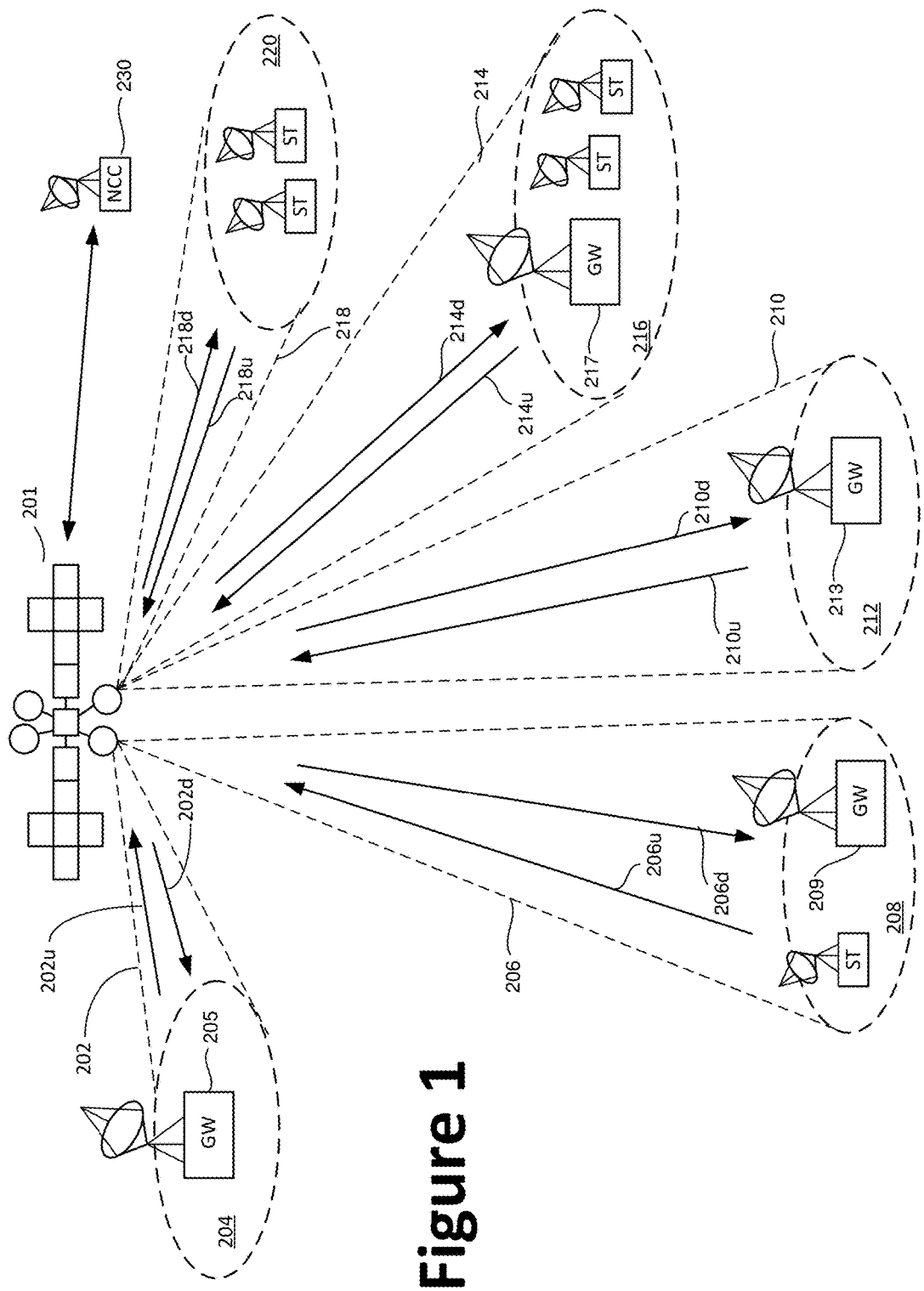
FIG. 1 is a block diagram describing one embodiment of a portion of a satellite communications system.

FIG. 1 is a block diagram depicting a portion of a satellite communications system that includes one or more satellites. FIG. 1 depicts satellite 201, which is a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments (as described below) the system will include multiple satellites that are referred to as a constellation of satellites.

In one embodiment, satellite 210 comprises a bus (i.e., spacecraft) and one or more payloads, including a communications payload. The satellite may also include multiple power sources, such as batteries, solar panels, and one or more propulsion systems, for operating the bus and the payload. The satellite includes an antenna system that provides a plurality of beams, including non-articulated and steerable spot beams, for communicating with subscriber terminals and gateways.

A subscriber terminal is a device that wirelessly communicates with a satellite, usually to be used by one or more end users. The term subscriber terminal may be used to refer to a single subscriber terminal or multiple subscriber terminals. A subscriber terminal is adapted for communication with the satellite communication system including satellite 201. Subscriber terminals may include fixed and mobile subscriber terminals including, but not limited to, a cellular telephone, wireless handset, a wireless modem, a data transceiver, a paging or position determination receiver, or mobile radiotelephone, a cellular backhaul, a trunk, an enterprise computing or storage device, an airborne device, a maritime device or a head end of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, a terminal or a mobile.

The term gateway may be used to refer to a device that communicates wirelessly with a satellite and provides an interface to a network, such as the Internet, a wide area network, a telephone network or other type of network. In some embodiments, gateways manage the subscriber terminals.

FIG. 1 also shows a Network Control Center 230, which includes an antenna and modem for communicating with satellite 201, as well as one or more processors and data storage units. Network Control Center 230 provides commands to control and operate satellite communication payload 201, as well as all other satellite communication payloads in the constellation. Network Control Center 230 may also provide commands to any of the gateways (via a satellite or a terrestrial network) and/or subscriber terminals.

In one embodiment, satellite 201 is configured to provide two hundred fixed (i.e., non-articulated so that they are fixed in relation to satellite 201) spot beams that use time domain beam hopping among the spot beams. In other embodiments, more or less than two hundred spot beams can be used for the time domain beam hopping. In one embodiment, the two hundred hopping beams are divided into thirty six hopping groups such that one beam in each group is active at a given time; therefore, thirty six of the two hundred spot beams are active at an instance in time. In addition to the two hundred non-articulated spot beams that perform time domain beam hopping, one embodiment of satellite 201 includes eight 4.2 degree steerable spot beams used to communicate with gateways. In other embodiments, more or less than eight can be used. Additionally, satellite 201 includes six 2.8 degree steerable spot beams which can have a dual purpose of communicating with gateways and/or providing high capacity communication for subscriber terminals that would otherwise fall under the hopping beams of the two hundred spot beams performing time domain beam hopping. Other embodiments can use different sized spot beams.

For example purposes only, FIG. 1 shows five spot beams: 202, 206, 210, 214 and 218. Spot beam 202 is a 4.2 degree steerable spot beam that illuminates coverage area 204 for communicating with one or more gateways 205 via downlink 202d and uplink 202u. Spot beam 206 is a 2.8 degree steerable dual purpose beam that illuminates coverage area 208 in order to communicate with one or more gateways 209 and one or more subscriber Terminals ST via downlink 206d and uplink 206u. Spot beam 210 is a 2.8 degree steerable spot beam that could be used to communicate with gateways and/or subscriber terminals ST, but in the example of FIG. 1 spot beam 210 illuminates coverage area 212 to communicate with one or more gateways 213 via downlink 210d and uplink 210u. The two hundred spot beams that perform time domain beam hopping can be used to communicate with subscriber terminals and/or gateways. Spot beams 214 and 218 are two examples of the two hundred non-articulated spot beams that performed time domain beam hopping. Spot beam 214 illuminates coverage area 216 to communicate with one or more gateways 217 and one or more subscriber terminals ST via downlink 214d and uplink 214u. Spot beam 218 illuminates coverage area 220 to communicate with subscriber terminals ST via downlink 218d and uplink 218u.

Figure 2:
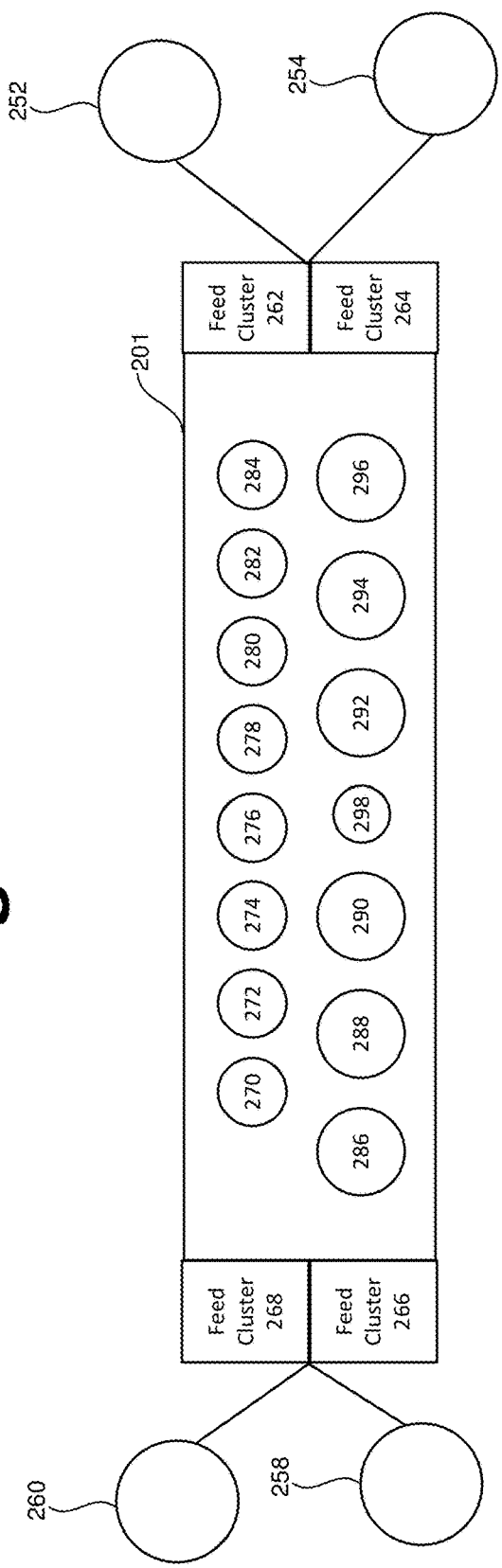
FIG. 2 is a block diagram depicting a satellite and its antenna system.

FIG. 2 is a block diagram depicting more details of one embodiment of an antenna system of satellite 201. For example, FIG. 2 shows antennas 252, 254, 258 and 260 which provide the two hundred spot beams that implement time domain beam hopping. Each of antennas 252, 254, 258 and 260 provide fifty spot beams each. FIG. 2 shows feed cluster 262 pointed at antenna 252, feed cluster 264 pointed at antenna 254, feed cluster 266 pointed at antenna 258 and feed cluster 268 pointed at antenna 260. Additionally, satellite 201 includes six 2.8 degree steerable antennas for communicating with gateways and/or providing high capacity beams for subscriber terminals, including antennas 286, 288, 290, 292, 294 and 296. Satellite 201 also includes eight 4.2 degree steerable antennas for communicating with gateways, including antennas 270, 272, 274, 276, 278, 280, 282 and 284. In one embodiment, the antennas are mechanically steerable. In another embodiment, a phased array or other means can be used to electronically steer the spot beams. Satellite 201 also includes an antenna 298 for communicating with network control center 230 in order to provide telemetry and commands to satellite 201, and provide status and other data back to network control center 230.

Antenna 298, or any of the other antennas, can also be used to provide a beacon signal. In some embodiments, satellite 201 can include an additional antenna for providing the beacon signal. In traditional satellites, the beacon signal provides subscriber terminals and gateways with a gauge to determine how much power should be used. A terminal on the ground can transmit a signal which the satellite will use to generate a corresponding downlink, which can then be compared to the strength of the beacon signal, and then can adjust its power up or down to match the beacon signal. The beacon signal can also be used to determine when a satellite is not operational. Additionally, beacon signals can be used to compensate for Doppler shift. Since the terminals knows the beacon is supposed to be on a certain frequency, it can calculate its Doppler based on the current reception of the beacon signal.

Figure 3:
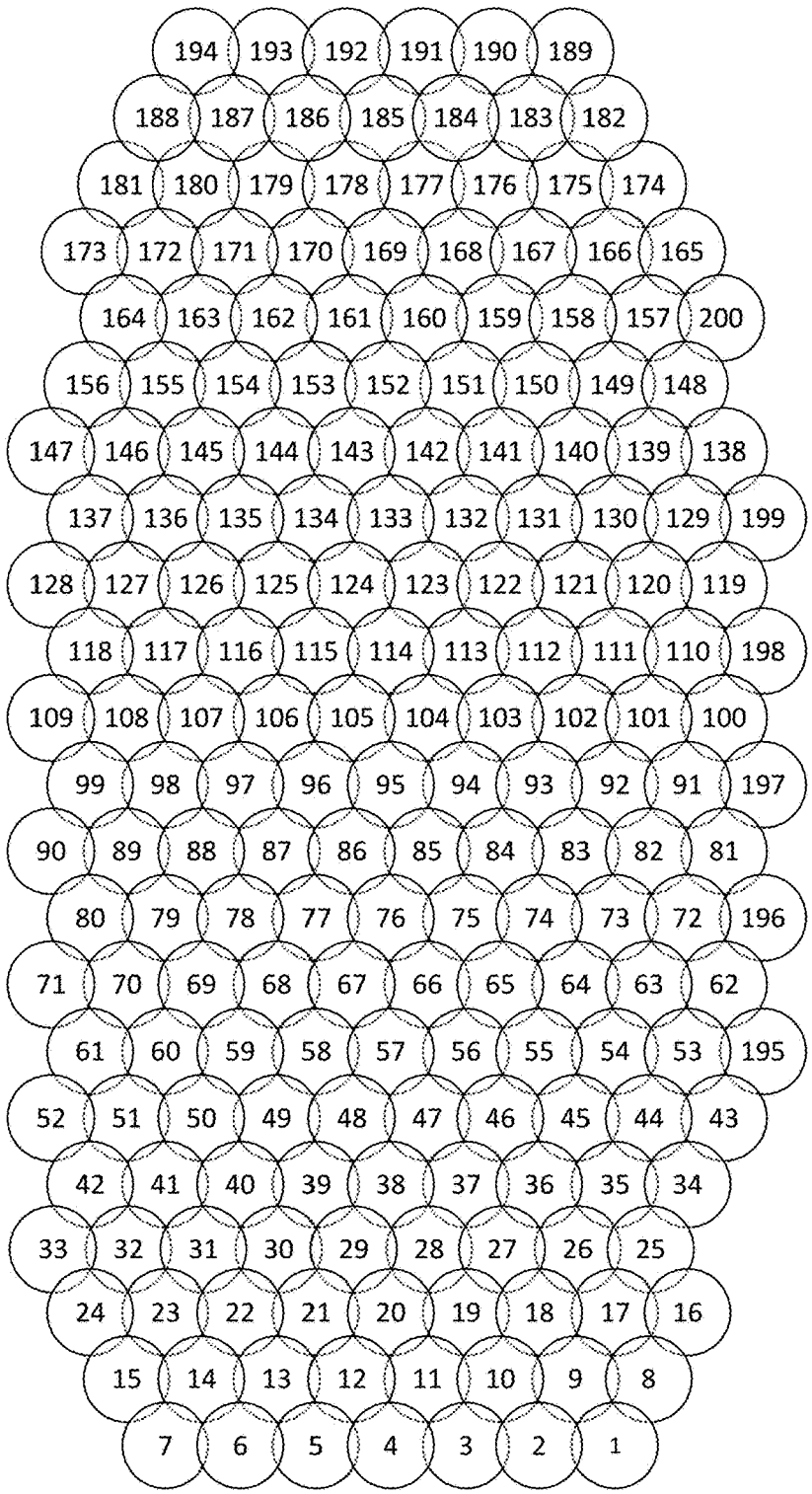
FIG. 3 depicts a beam map for a Field of Regard.

FIG. 3 provides an example beam map for the two hundred non-articulated spot beams of satellite 201 that implement time domain beam hopping. In one embodiment, those spot beams are fixed in direction, relative to satellite 201. As can be seen, the two hundred spot beams depicted in FIG. 3 are numbered 1-200. In one embodiment, the spot beams overlap; for example, the −5 dB contour of each spot beam overlaps with the −5 dB contour of other spot beams neighboring it. All the spot beams together comprise the Field of Regard of satellite 201. The Field of Regard of the satellite is different than the Field of View of the satellite. For example, the Field of Regard is the target area that the satellite can see/communicate based on its position. Thus, the entire beam map of FIG. 3 is the Field of Regard. In contrast, the Field of View is the area that the satellite's payload can actually see at an instance in time. For example, when performing time domain beam hopping, only a subset of those spot beams depicted in FIG. 3 are active at a given time. Therefore the Field of View is less than the Field of Regard.

Figure 4:
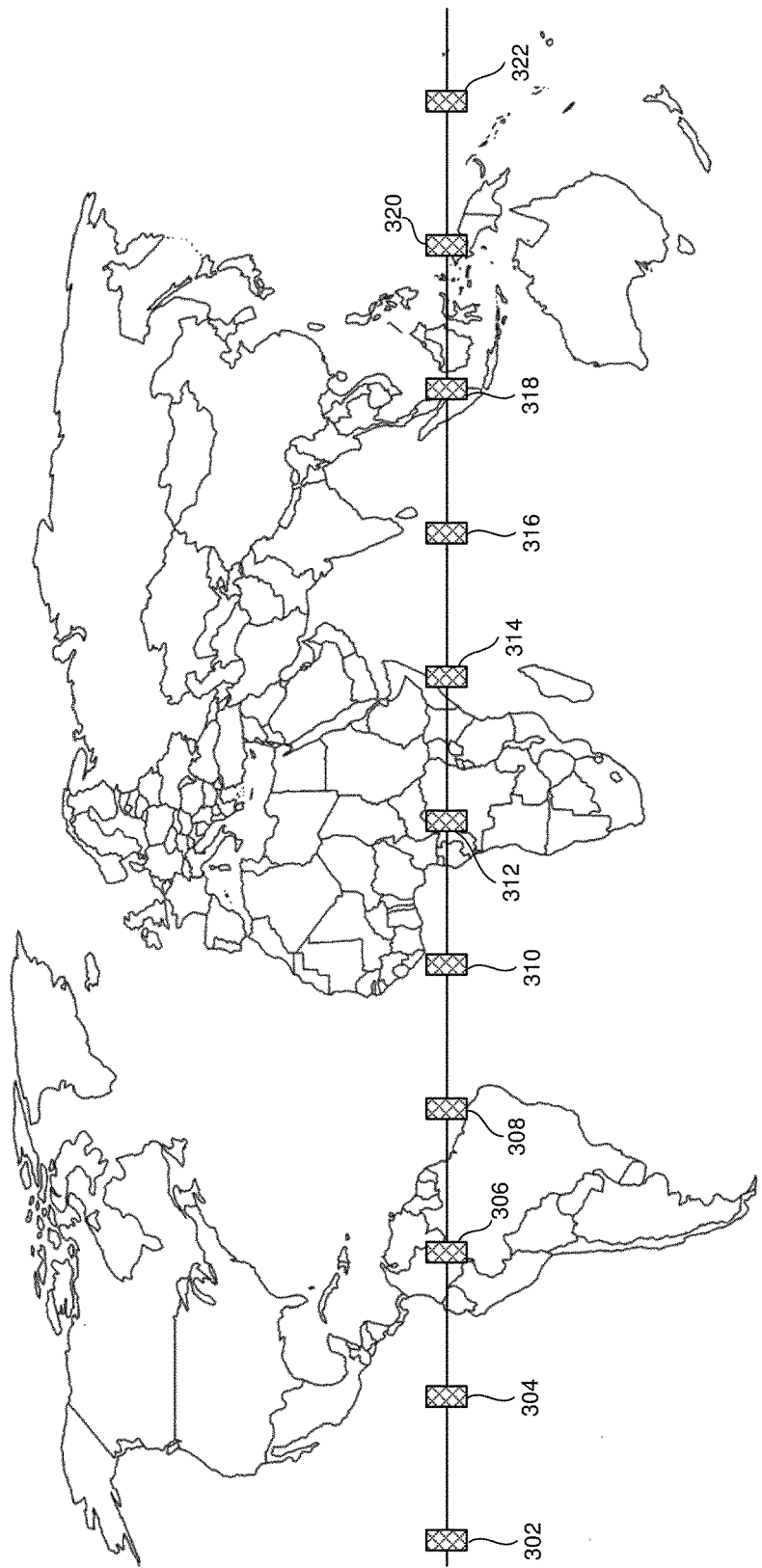
FIG. 4 is a map of the world, showing a constellation of non-geostationary satellites.

In one embodiment, satellite 201 is only one satellite of a larger constellation of satellites that implement the satellite communication system. In one example embodiment, the satellite constellation includes eleven satellites, with each satellite having the same structure as satellite 201. However, each of the satellites can be independently programmed to implement the same or different time domain beam hopping plans, as will be explained below. FIG. 4 is a map of the world showing eleven MEO satellites 302, 304, 306, 308, 310, 312, 314, 316, 318, 320, and 322. In one embodiment, all eleven satellites are in orbit about the Equator. In one example, all eleven satellites are moving in the same orbital direction along the same orbital path and are equally spaced apart from each other. Because the satellites are in MEO orbit, they are non-geostationary, meaning that they will move with respect to any location on the Earth. As the satellites move in orbit, the user and gateway spot beams' coverage areas will drift across the Earth's surface with the satellites. In one example, there will be a drift rate of 360 degrees longitude every six hours, or one degree per minute. In such embodiment, each satellite will orbit past the same earth position in six hours, or four times a day. In one embodiment, the time it takes to drift the width of a spot beam covering subscriber terminals (one of the two hundred beam hopping spot beams) is approximately 2.8 minutes (168 seconds).

Figure 5:
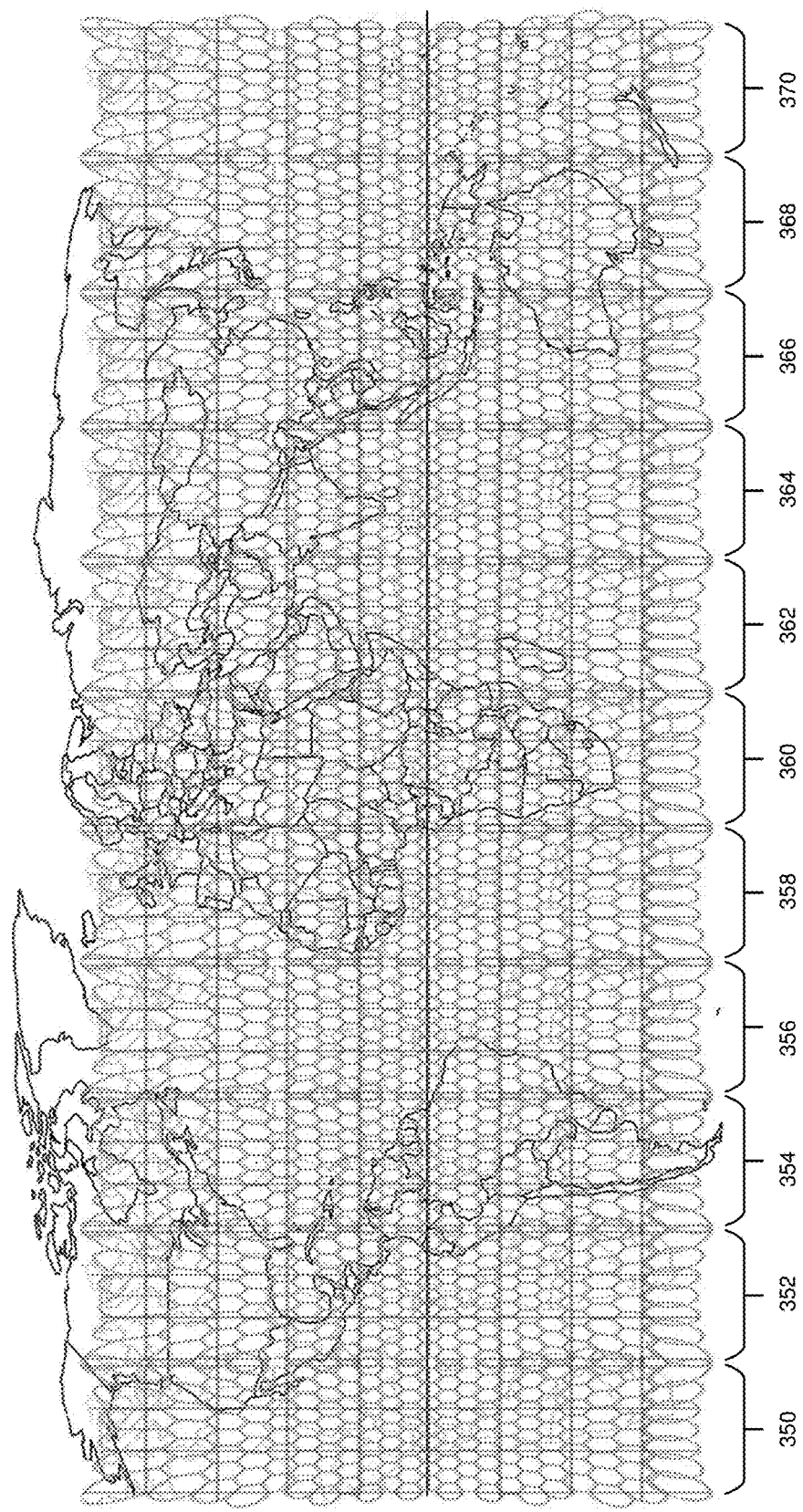
FIG. 5 is a map of the world, showing the beam maps for eleven non-geostationary satellites.

FIG. 5 shows the same map of the world as FIG. 4, with the beam maps (the Field of Regard) for each of the satellites depicted over the map. For example, satellite 302 projects beam map 350, satellite 304 projects beam map 352, satellite 306 projects beam map 354, satellite 308 projects beam map 356, satellite 310 projects beam map 358, satellite 312 projects beam map 360, satellite 314 projects beam map 362, satellite 316 projects beam map 365, satellite 318 projects beam map 366, satellite 320 projects beam map 368, and satellite 322 projects beam map 370. Note that the satellites 302-322 are constantly moving west to east; therefore, beam maps 350-370 are also moving west to east, and are never stationary (in one embodiment). As can be seen, adjacent satellites have adjacent beam maps and adjacent Fields of Regard when operating the satellites. In one embodiment, the beam maps of adjacent satellites overlap so that among the constellation's satellites there is continuous coverage around the globe; however, there may be gaps in coverage at the north and south poles (where there is little demand). That is, the beam map of each satellite is adjacent to a beam map on the adjacent satellite to provide a composite beam map that circumnavigates the Earth.

Figure 6:
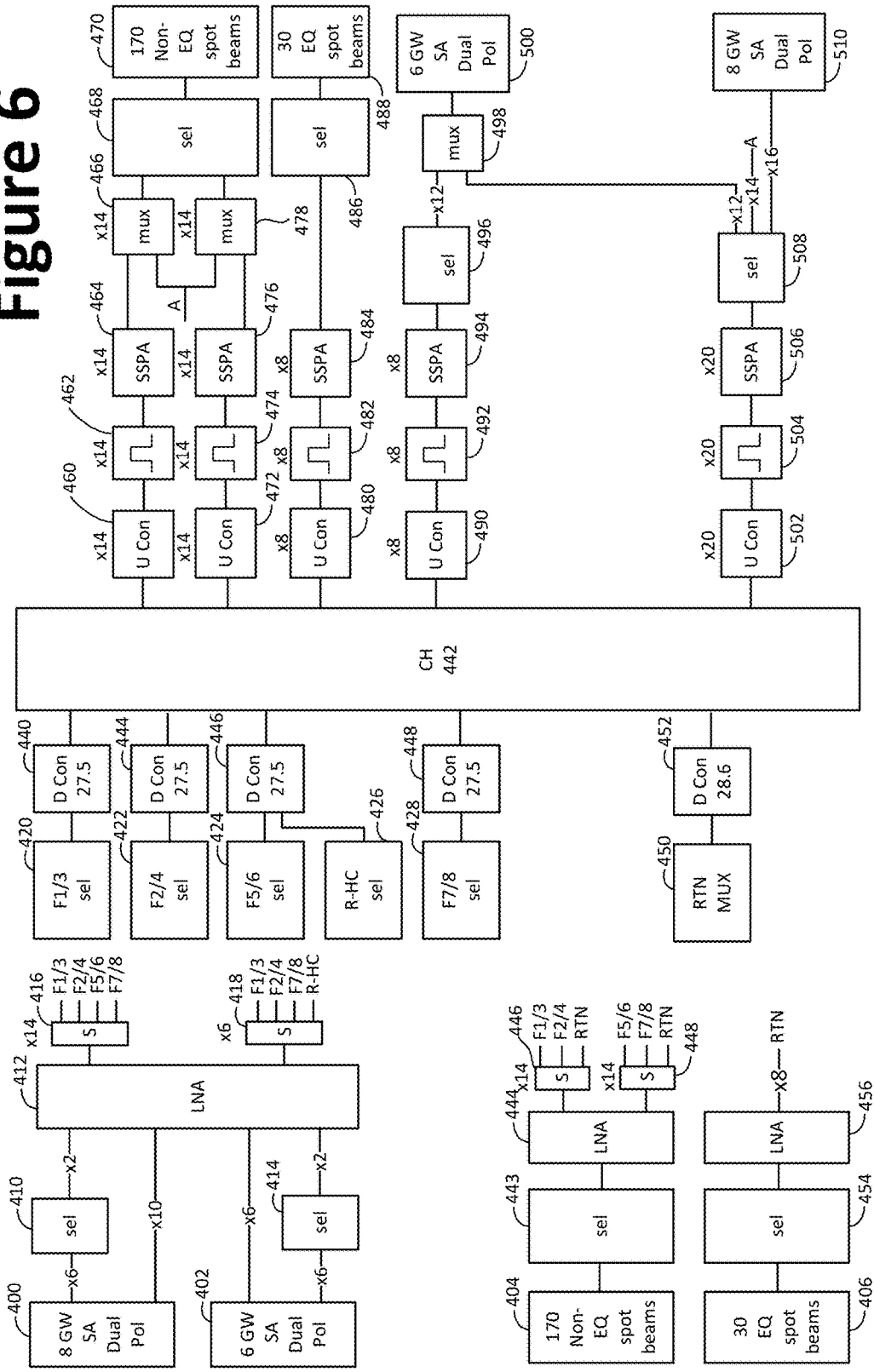
FIG. 6 is a block diagram of one embodiment of a communications payload for a non-geostationary satellites.

FIG. 6 is a block diagram of one embodiment of a communications payload for non-geostationary satellite 201. In one embodiment, each of satellites 302-322 implement the same structure and design of satellite 201; therefore, the payload of FIG. 6 will be implemented on each of satellites 302-322. Traditionally, the communications path from the gateway to the subscriber terminal via the satellite is referred to as the forward path and the communications path from the subscriber terminals to the gateway via the satellite are referred to as the return path. When a satellite is used to provide connectivity to the Internet, a user at a computer connected to a subscriber terminal will send a request for content on the Internet to the gateway via the satellite, and the gateway will provide, in response to that request, access onto the Internet. The response from the Internet will be provided to the gateway, and then forwarded onto the subscriber terminal via the satellite.

The structure of FIG. 6 implements both the forward path and the return path. The uplink beams are received at the left hand portion of the components of FIG. 6 and the downlink beams are provided at the right hand edge of the components of FIG. 6. For example, FIG. 6 shows eight gateway steerable dual polarization antennas 400 and six gateway/high capacity subscriber terminal steerable antennas with dual polarization 402 for receiving uplink beams. FIG. 6 also shows the two hundred non-articulated spot beams divided into two groups: one hundred and seventy spot beams 404 illuminating areas away from the Equator and thirty spot beams 406 illuminating areas at the Equator.

The eight 4.2 degree gateway steerable spot beams 400 provide sixteen signals, eight in each polarization (left hand/right hand or horizontal/vertical). Six of those sixteen signals are provided to selection matrix 410 which includes a set of switches that selects two of the six input signals and provides those two selected signals to low noise amplifier 412. Ten of the 16 dual polarization signals from antennas 400 are applied directly to low noise amplifier bank 412 comprising low noise amplifiers. Note that the antennas 400 of FIG. 6 correspond to antennas 270-284 of FIG. 2. Similarly, antennas 402 of FIG. 6 correspond to antennas 286-296 of FIG. 2. The six gateway steerable antennas 402 provide 12 signals (six signals in two polarizations). Six of those signals are provided directly to low noise amplifier bank 412, the other six signals are provided to a 6:2 selection matrix 414, which chooses two of the signals to provide to low noise amplifier bank 412. Note that the satellite payload will include a processor (not depicted) which controls each of the selection matrices described herein. Alternatively, satellite bus will include a processor that will control the selection matrices. As described above, low noise amplifier bank 412 has 20 input signals and, therefore has 20 output signals. Fourteen of the signals output from low noise amplifier bank 412 are provided to separate splitters 416. That is, there are 14 splitters 416. Each splitter splits the incoming signal into four copies noted as: F1/3, F2/4, F5/6 and F7/8. The other six outputs from LNA 412 are provided to a different set of splitters 418 that split the signal to four copies labeled as: F1/3, F2/4, F7/8 and R-HC. The seven outputs of the splitter that started with an F are part of the forward path. The one output of the splitter 418 that is labeled R-HC is part of the return path from a steerable high capacity spot beam used to connect to subscriber terminals. In one embodiment splitters 416 and 418 include filters for passing the frequency bands of the labeled output and stopping all other frequencies.

After the splitters 416 and 418, the signals are sent to appropriate matrices 420, 422, 424, 426 and 428 in order to select which bands to use. Selection matrix 420 receives the signal F1/3. Selection matrix 422 receives signal F2/4. Selection matrix 424 receives signal F5/6. Selection matrix 426 receives signal R-8C. Selection matrix 428 receives F7/8. Eleven signals of the output of selection matrix 420 are provided to down converter 440, which provides its output to channel 442. The 11 signals of the output of selection matrix 422 are provided to down converter 444, which provided its output to channelizer 442. The output of selection matrix 424 includes seven signals that are provided to down converter 446, which provides its output to channelizer 442. The output of selection matrix 426 includes six signals that are provided to down converter 446, which provides its output to channelizer 442. The output of selection matrix 428 includes 11 signals that are provided to down converter 448, which provides its output to channelizer 442. Each of the selection matrices includes a series of programmable switches to route a subset of inputs to the output ports.

The one hundred and seventy non-Equatorial spot beams 404 are provided to selection matrix 443 which chooses twenty eight out of the one hundred and seventy spot beams. That is, one beam from each of 28 beam hopping groups (discussed below) is chosen. Those 28 signals are sent to low noise amplifier 444. Half of the signals output from low noise amplifier 444 are provided to splitters 446. The other half of the signals are provided to splitters 448. Each of the fourteen splitters 446 make three copies of the signal and output those three copies as F1/3, F2/4 and RTN. Each of the fourteen splitters 448 make three copies of their respective incoming signals and output them F5/6, F7/8 and RTN. Note that the signals F1/3, F2/4, F5/6 and F7/8 are part of the forward path representing communication from a gateway in one of the one hundred and seventy hopping beams. The signal RTN is part of the return path, from subscriber terminals. Note that in some embodiments, each of the splitters has appropriate band pass filters. In some embodiments, each of the selection matrices has appropriate band pass filters at respective inputs and/or outputs.

FIG. 6 shows the thirty non-articulated beam hopping spot beams near the Equator being provided to selection matrix 454. The eight selected signals are provided to low noise amplifier 456 which outputs a signal labeled RTN. Note in some embodiments, each of the low noise amplifiers 456, 444 and 412 have band pass filters at their input and/or output. Additionally, band pass filters can be used at each of the antennas 400, 402, 404 and 406. Based on the output of splitters 448 and low noise amplifier 456, thirty six signals labeled RTN are frequency combined in MUX 450 which outputs 9 signals. The output of MUX 450 is provided to down converter 452. The output of down converter 452 is provided to channelizer 442. Each of the selection matrices 410, 414, 420, 422, 424, 426, 428, 443 and 454 includes switches that are used to switch throughput among the various spot beams in the hopping groups or among various bands from the gateways and high capacity steerable spot beams. The chosen signals are provided to channelizer 442 which is used to route spectrum between the uplinks and downlinks. In one embodiment, channelizer 442 is a digital channelizer that is fully programmable in orbit. More details of channelizer 442 are provided below with respect to FIG. 7. Channelizer 442 can be thought of as a giant switching or routing matrix that is fully programmable. FIG. 6 shows that channelizer 442 provides fourteen outputs to upconverter 460, fourteen outputs to upconverter 472, eight outputs to upconverter 480, eight outputs to upconverter 490 and twenty outputs to upconverter 502. Note that upconverters 460, 472, 480 and 490 (all which function to increase the frequency of the signal) are provided as part of the forward path, while upconverter 502 is provided for the return path. The output of each of the 14 up converters 460 are provided to filters 462. The output of each of the fourteen filters 462 are provided to solid state power amplifiers (SSPA) 464. The output of each of the fourteen SSPAs are provided to multiplexer 466. The output of multiplexer 466 is provided to 28:170 selection matrix 468. The 170 outputs of selection matrix 468 are provided as the one hundred and seventy non-Equatorial non-articulated beam hopping spot beams 470.

The output of the fourteen upconverters 472 are provided to separate filters 474. The output of each of the fourteen filters 474 is provided to separate SSPAs 476. The output of each of the fourteen SSPAs 476 are provided to multiplexer 478. The output of multiplexer 478 is provided to selection matrix 468. The output of the eight upconverters 480 are provided to filters 482. The output of the eight filters 482 are provided to separate SSPAs 484. The output of SSPAs 484 are provided to selection matrix 486. The output of selection matrix 486 is provided as the thirty Equatorial region non-articulated beam hopping spot beams of 488. Note that the SSPAs can be turned off (e.g., when the satellite is over the ocean or other non-inhabited area) to conserve power.

The output of upconverters 490 (which can be part of the forward path or the return path) are provided to filters 492. The output of the eight filters 492 are provided to SSPAs 494. The output of the eight SSPAs 494 are provided to selection matrix 496. The 12 output signals from selection matrix 496 are provided to multiplexor 498. The output of multiplexor 498 are provided as the six 2.8 degree gateway/high capacity subscriber terminals steerable spot beams, with dual polarization.

The output of upconverters 502 are provided to separate filters 504. The output of the twenty filters 504 are provided to separate SSPAs 506. The output of the 20 SSPAs 506 are provided to selection matrix 508, which provides 42 outputs. Twelve of the 42 outputs are provided to multiplexer 498, fourteen of the 42 outputs are provided to multiplexer 466 and multiplexer 478, and sixteen of the 42 outputs are provided as the eight gateway steerable dual polarization spot beams described above.

In an alternative embodiment, many or all of the selection matrices can be eliminated by having the selection/switching performed by channelizer 442. In some embodiments, the payload of FIG. 6 can be fully implemented by just a channelizer that will switch, route and filter.

Figure 7:
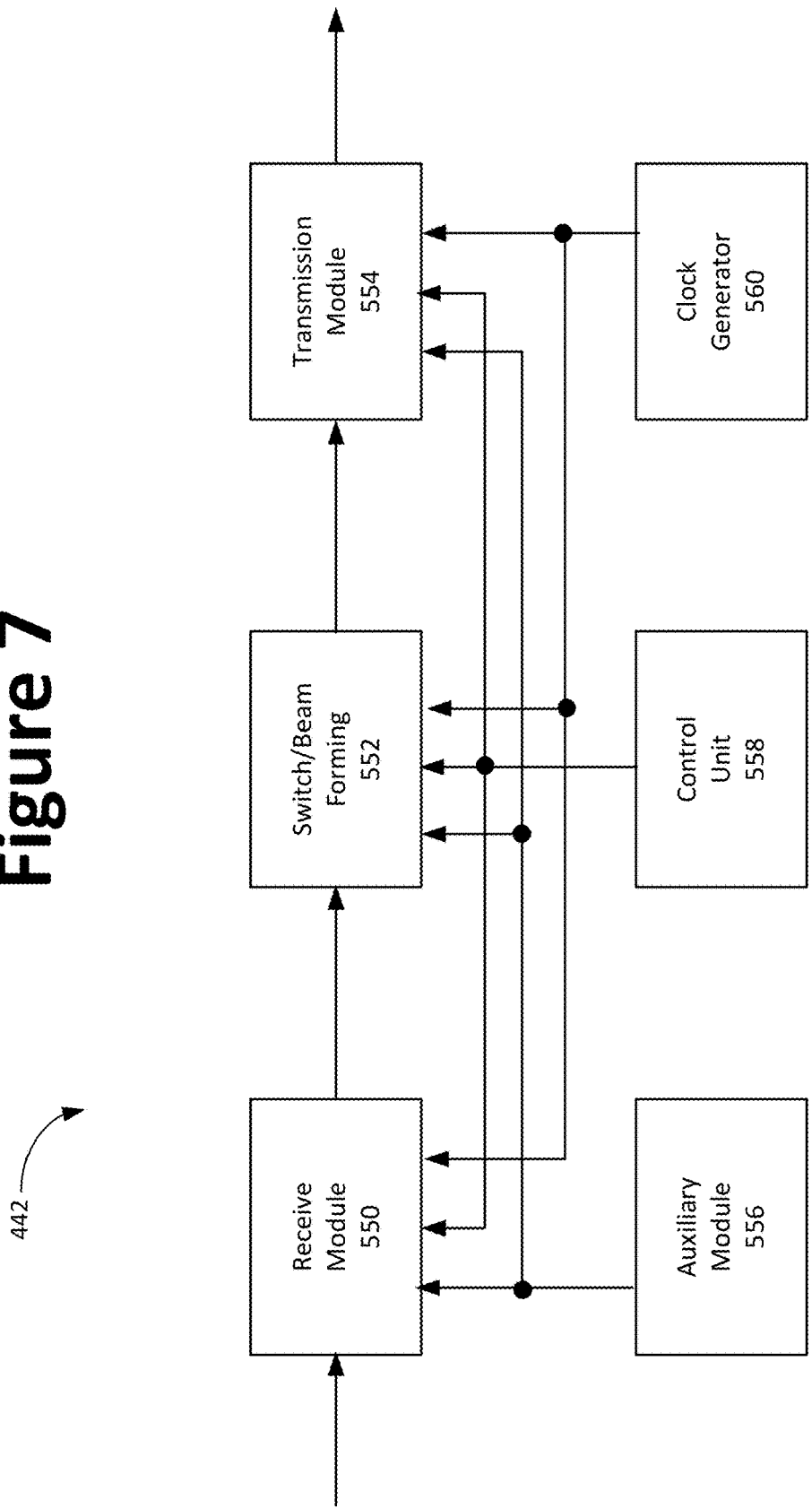
FIG. 7 is a block diagram of one embodiment of a digital channelizer.

FIG. 7 is a block diagram describing one example implementation of channelizer 442. The technologies described herein are limited to any one particular architecture or implementation of channelizer 442. The embodiment of FIG. 7 is only one example that is suitable for the technology described herein and many other configurations are also usable. Inputs to channelizer 442 are provided to a receive module 550, where signals can be filtered, amplified, stored or simply received. The output of receive module 550 is provided to switch network and beam forming network 552. The output of switch network and beam forming network 552 is provided to a transmission module 554 which provides the outputs of channelizer 442. Channelizer 442 also includes an auxiliary module 556, control unit 558 and clock generator 560, which are all connected to receive module 550, switch network/beam forming network 552 and transmission module 554. In one embodiment, control unit 558 includes one or more processors used to program the switch networks/beam forming network 552. Clock generator 560 provides a clock signal to implement timing within channelizer 442. In one embodiment, auxiliary module 556 is used to control the switches of the switching network, adjust beams, provide spectrum analysis and provide uplink and downlink modems.

In one embodiment, each of the non-geostationary satellites 302-322 are configured to provide a plurality of spot beams (described above) that implement a first frequency plan at the Earth's Equator and a second frequency plan away from the Earth's Equator, with the first frequency plan being different than the second frequency plan. Thus, when operating the constellation of non-geostationary satellites, multiple or all of those satellites within the constellation will communicate with a terminal or multiple terminals at the Equator using spot beams to implement the first frequency plan and multiple or all of the satellites of the constellation will communicate with a different terminal(s) that is away from the Equator using spot beams that implement the second frequency plan.

Figure 8:
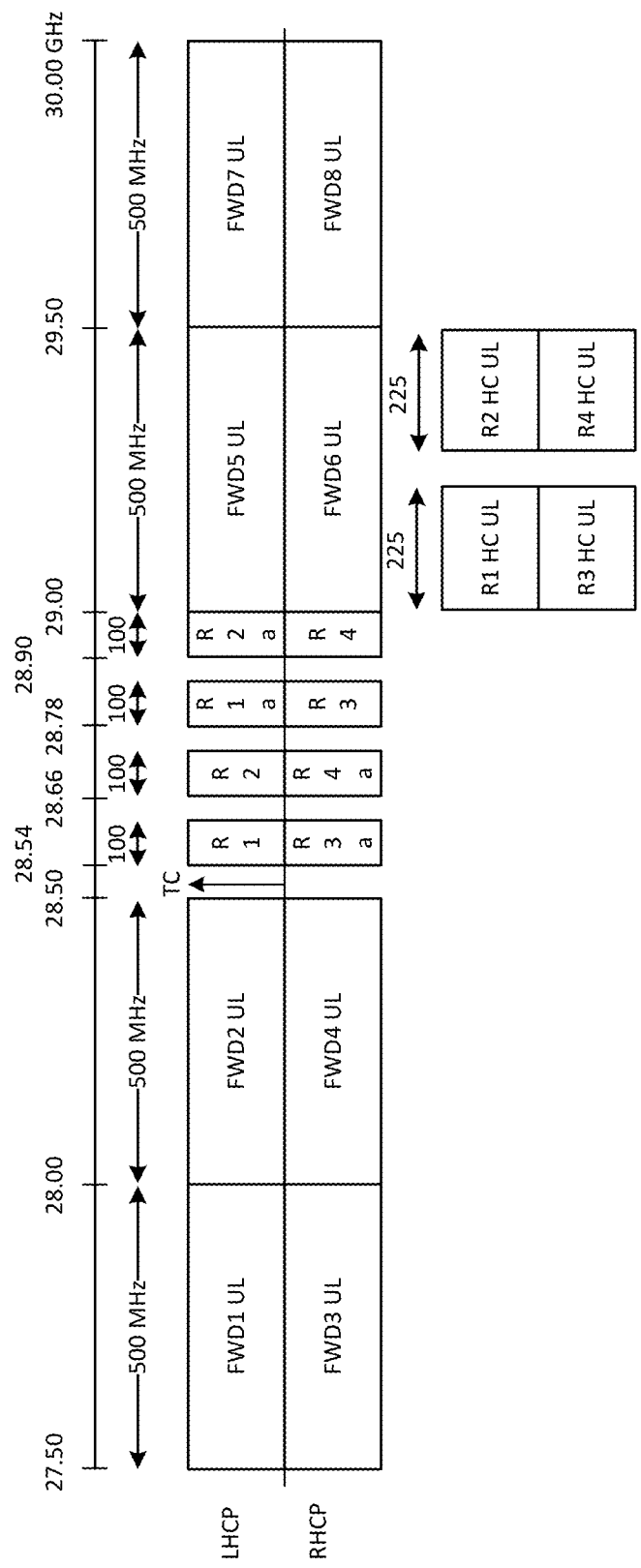
FIG. 8 depicts an example embodiment of an uplink frequency plan for beams away from the Equator.
Figure 9:
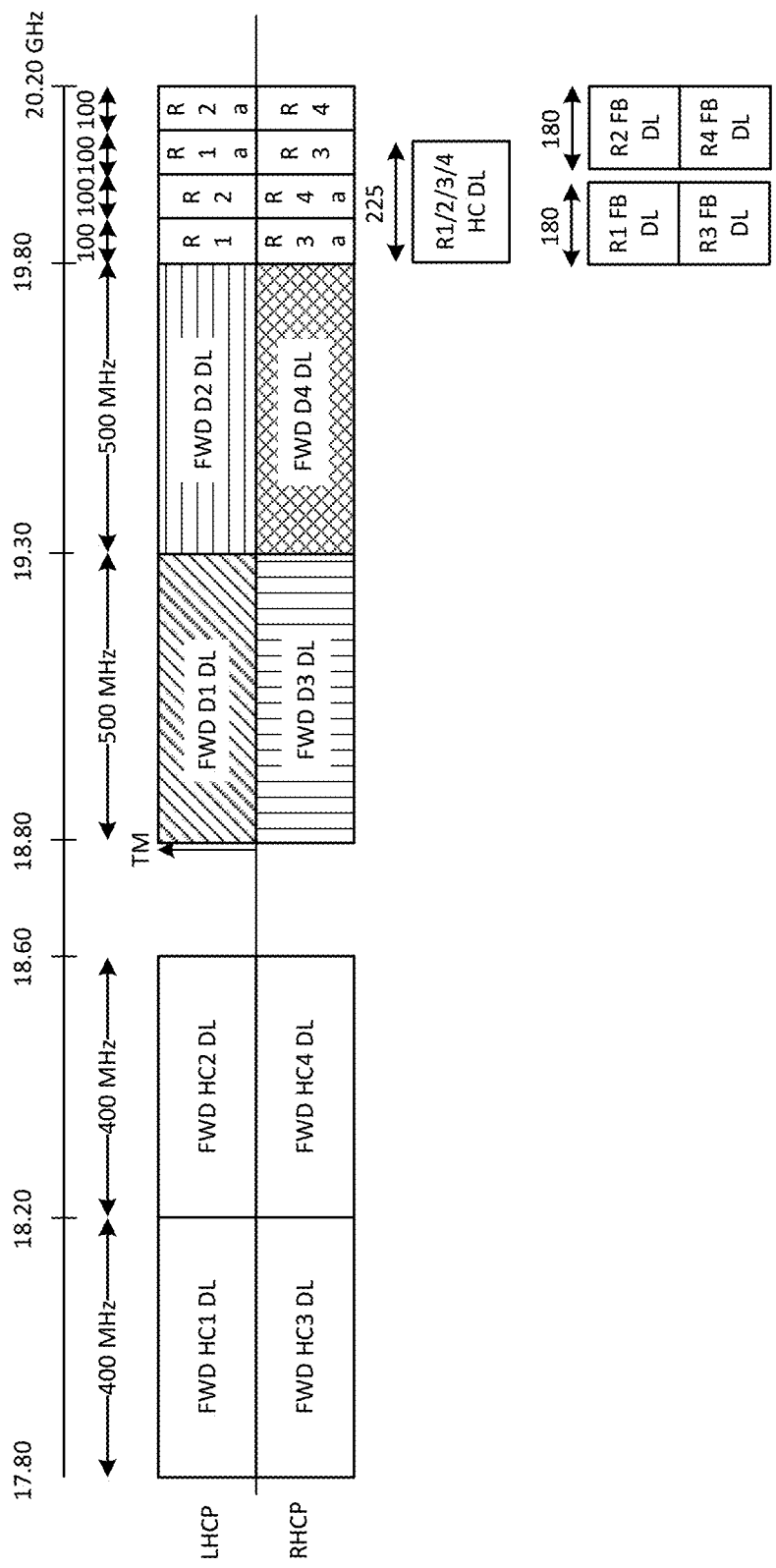
FIG. 9 depicts an example embodiment of a downlink frequency plan for beams away from the Equator.
Figure 11:
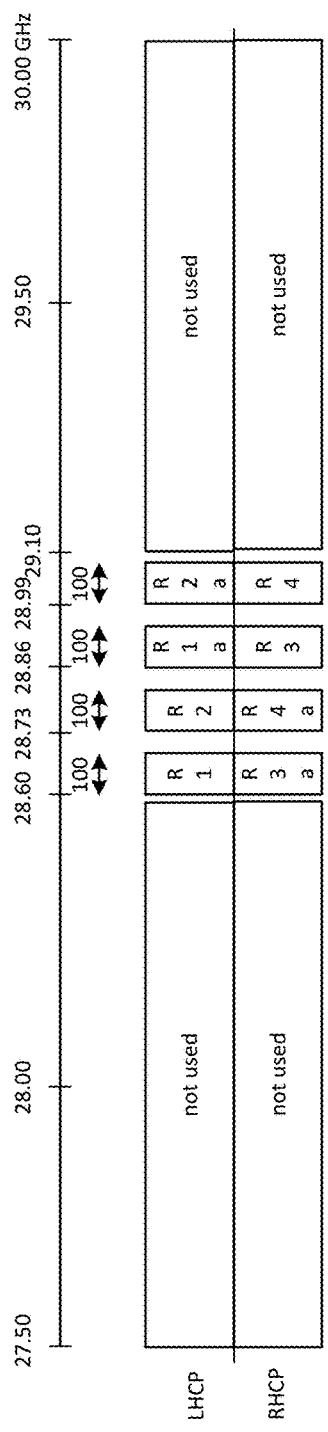
FIG. 11 depicts an example uplink frequency plan for beams at the Equator.
Figure 12:
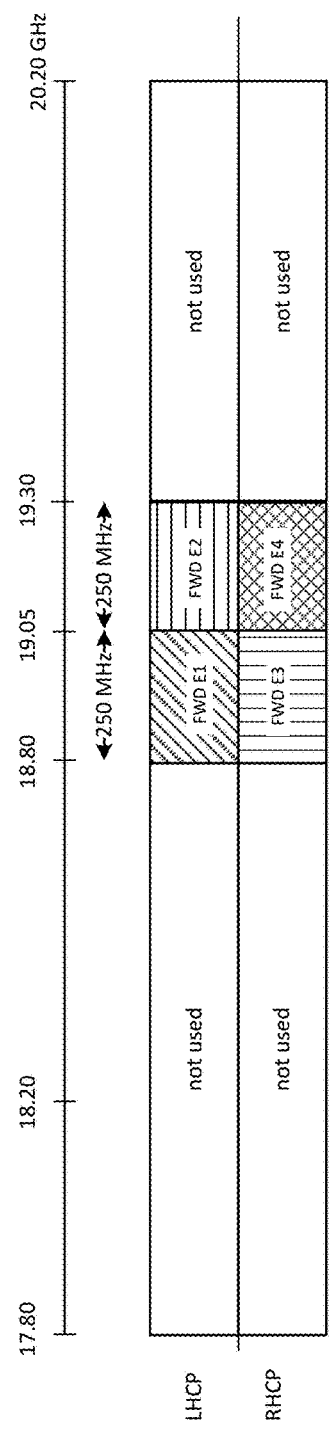
FIG. 12 depicts an example downlink frequency plan for beams at the Equator.

In one embodiment, the frequency plans at the Equator and away from the Equator are both using the KA band; however, other bands can also be used. FIGS. 8 and 9 provide the frequency plan for the areas away from the Earth's Equator, while FIGS. 11 and 12 provide the frequency plan for the areas at the Equator. More specifically, FIG. 8 provides the frequency plan away from the Equator for uplinks. FIG. 8 shows the uplink using between 27.50 GHz through 30.00 GHz. The frequency plan includes three components. The first component is the forward uplink utilized by gateways including eight colors (frequency band plus polarization) each comprising a 500 MHz frequency band in one polarization (left hand circular polarization LHCP or right hand circular polarization RHCP) labeled as FWD1 UL, FWD2 UL, FWD3 UL, FWD4 UL, FWD5 UL, FWD6 UL, FWD7 UL, FWD8 UL. The second component of FIG. 8 includes the return path used by subscriber terminals which includes eight colors each of which is a frequency band of 100 MHz in one polarization labeled as R1, R2, R3, R4, R1a, R2a, R3a, and R4a. FIG. 8 also shows frequency plan for the return path used by subscriber terminals in the high capacity steerable beams which comprise four colors each of which is a frequency band of 225 MHz and one polarization (LHCP or RHCP), labeled as R1 HC UL, R2 HC UL, R3 HC UL and R4 HC UL. The arrow labeled TC indicates the frequency assigned for Telemetry and Control signals.

FIG. 9 shows the frequency plan for the downlink in the regions away from the Equator. The frequency plan for communicating downlink beam to the subscriber terminals uses four colors each with a 500 MHz frequency band in one polarization (LHCP or RHCP) labeled as FWD D1 DL, FWD D2 DL, FWD D3 DL and FWD D4 DL. As mentioned above, the 170 non-articulated spot beams that implement time domain beam hopping can also serve gateways and do so using four colors each of which are 180 MHz frequency bands in one polarization and labeled in FIG. 9 as R1 FB DL, R2 FB DL, R3 FB DL and R4 FB DL. As discussed above, the satellite can include high capacity steerable beams that can service both gateways and subscriber terminals. The downlink to the subscriber terminals in those high capacity steerable beams use four colors each with 400 MHz frequency band in one polarization that are labeled in FIG. 9 as FWD HC1 DL, FWD HC2 DL, FWD HC3 DL, and FWD HC4 DL. As discussed above, the satellite can include 4.2 degree steerable spot beams that communicate with gateways. Those beams will utilize two colors, each which includes 400 MHz frequency band in one polarization and composed of 8 sub channels that are labeled in FIG. 9 as R1, R2, R3, R4, R1a, R2a, R3 and R4a. When the high capacity steerable beams are utilized, the downlink can also be part of the 4.2 degree steerable spot beams return path and includes a 225 MHz frequency band in one polarization, within the 400 available spectrum and labeled R1/2/3/4 HC DL. Note that in one embodiment, frequency plan for the uplink and the downlink are constructed such that the subscriber terminals and the gateways use different frequencies. When a particular spot beam of the of spot beams performing time domain beam hopping serves a gateway and subscriber terminals then the subscriber terminals and the gateway use different frequencies. The arrow labeled TM (which can be in-band or out of band) represents Telemetry and Control Signals. Note that while the example embodiment depicted in FIGS. 8 and 9 shows the two polarizations as left hand circular polarization LHCP or right hand circular polarization RHCP, other embodiments can use left hand or right hand polarizations whet her it is circular of linear. Some embodiments of satellite communication systems use vertical and horizontal polarization.

Figure 10:
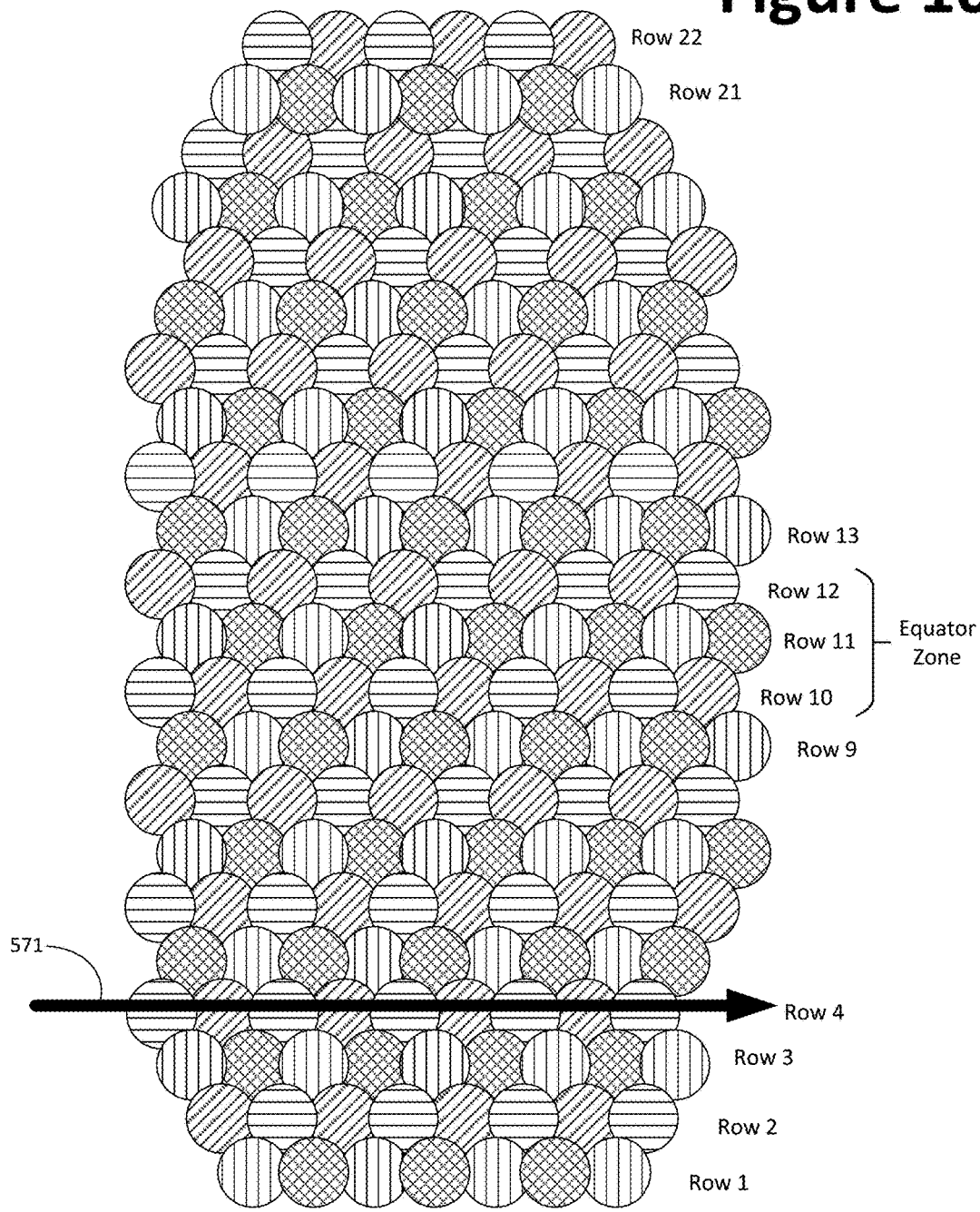
FIG. 10 is a beam map depicting one embodiment of an assignment of colors (frequency band+polarization) to spot beams.

FIG. 10 is a beam map that shows the same Field of Regard as FIG. 3, and, therefore, the same beam map as FIG. 3. However, instead of showing numbers in each of the spot beams on the beam map, FIG. 10 shades each beam. The shading of FIG. 10 corresponds to the shading in FIG. 9. Thus, each of the spot beams is assigned a downlink color (frequency band and polarization) using the frequency plan of FIG. 9. For example, the bottom left hand most beam in row one has vertical shading and therefore corresponds to FWD D3 DL and the uppermost right hand beam in row 22 has angled shading which corresponds to FWD D1 DL. FIG. 10 shows a four color reuse plan.

FIGS. 11 and 12 show the frequency plan for the area at the Equator. In one embodiment, different frequency plans are used at the Equator because there is a need to avoid interference with geostationary satellites. FIG. 11 depicts the frequency plan for the uplink. In one embodiment, none of the steerable spot beams will be used in the area near the Equator. Therefore, the area near the Equator will only be serviced by non-articulated spot beams that are implementing time domain beam hopping. The uplink in the Equator area will include eight colors, each of which has a frequency band of 100 MHz in one polarization so that four colors are left hand polarized and between 28.60 GHz and 29.10 GHz. The eight colors of the uplink in the Equator region are labeled as R1, R2, R3, R4, R1a, R2a, R3a, and R4a. Each of these frequency bands are used as part of the return path implementing communication from subscriber terminals toward the satellite.

FIG. 12 shows the frequency plan for the downlink in the area of the Equator and represents four colors used for the forward downlink. Each of the colors includes frequency bands that are 250 MHz in one polarization, labeled as FWD E1, FWD E2, FWD E3, and FWD E4. The four colors range between 18.80 GHz and 19.3 GHz.

So differences in the downlink at the Equator versus away from the Equator includes away from the non-Equator downlink colors having twice as big frequency ranges. For example, FWD D1 DL is 500 MHz between 18.8 and 19.3 GHz versus FWD E1 being 250 MHz between 18.8 and 19.05. FWD D2 DL is 500 MHz between 19.3 and 19.8 GHz versus FWD E2 being 250 MHz between 19.05 GHz and 19.3 GHz; FWD D3 DL is 500 MHz between 18.8 and 19.3 GHz while FWD E3 is 250 MHz between 18.8 and 19.05 GHz; and FWD D4 DL is 500 MHz between 19.3 and 19.8 GHz versus FWD E4 being 250 MHz between 19.05 and 19.3 GHz. While the return links in the Equator and non-Equator are both 100 MHz bands, the frequency bands for the Equator region are shifted up in frequency; for example, R1 in FIG. 8 starts at 28.54 GHz while R1 in FIG. 11 starts at 28.6 GHz.

As can be seen from FIGS. 8, 9, 11 and 12, the frequency plan away from the Equator includes frequency ranges not in the frequency plan at the Equator; the frequency plan at the Equator includes different uplink frequency ranges than the second frequency plan; the frequency plan away from the Equator includes larger frequency ranges than frequency plan at the Equator; the frequency plan away from the Equator includes more frequency ranges than the frequency plan at the Equator; and the frequency plan away from the Equator includes more bandwidth than the frequency plan at the Equator. The spot beams at the Equator consist of only non-articulated spot beams relative to the satellite and the spot beams away from the Equator include non-articulated spot beams relative to the satellite and steerable spot beams.

When operating the constellation of non-geostationary satellites 302-322, multiple satellites of the constellation communicating with a first terminal at the Equator use spot beams that implement the frequency plan for the Equator and multiple satellites of the constellation communicating with a second terminal away from the Equator use spot beams that implement the frequency plan for regions away from the Equator (e.g., using adjacent Fields of Regard for the satellites of the constellation).

Figure 13:
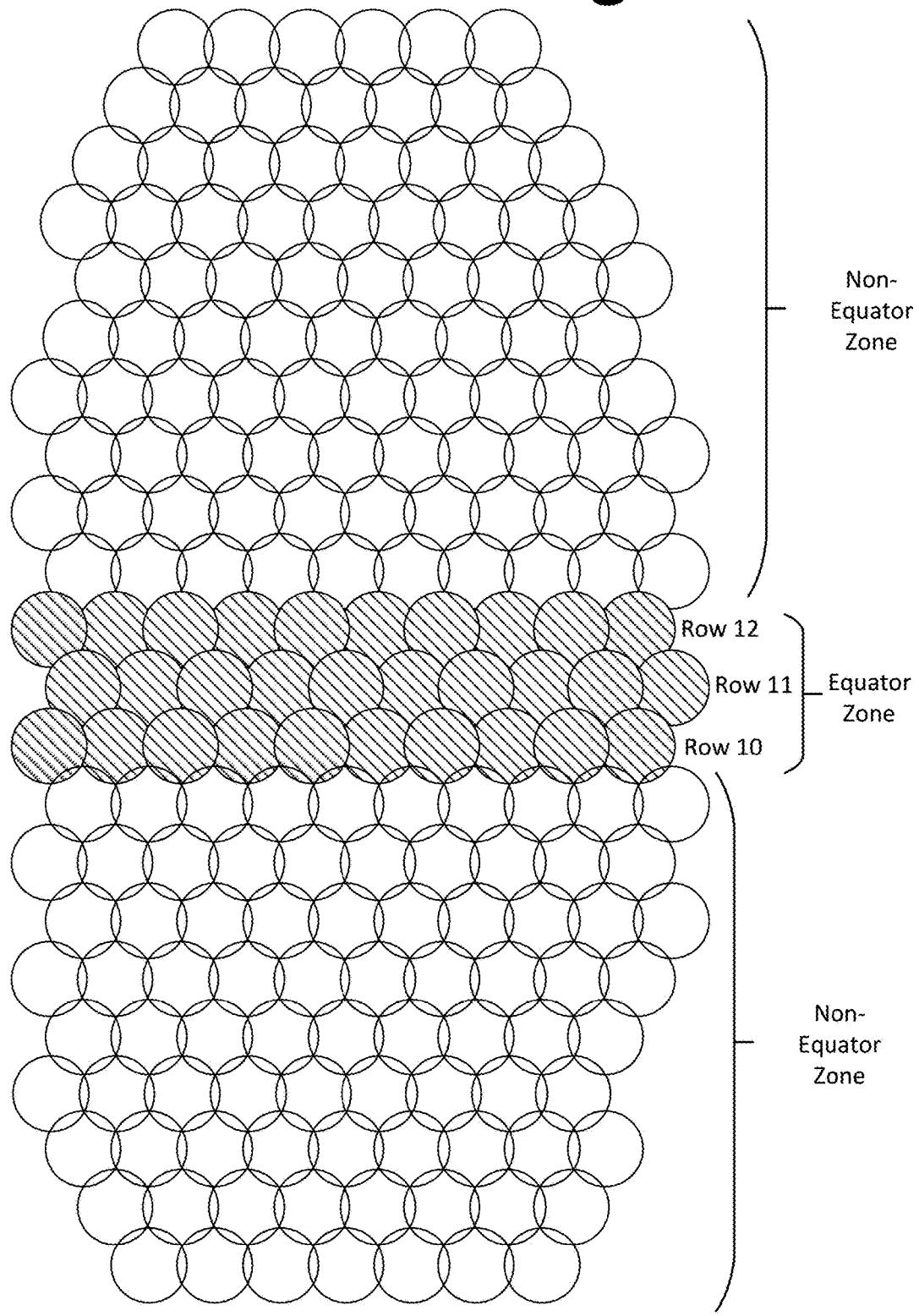
FIG. 13 depicts a beam map.

FIG. 13 shows the same Field of Regard and same beam map as FIG. 3 and FIG. 10; however, FIG. 13 graphically depicts the Equator zone and the non-Equator zone (away from the Equator). With the Equator zone corresponds to the frequency plan of FIGS. 11 and 12 and the non-Equator zone corresponds to the frequency plan of FIGS. 8 and 9. Note that FIG. 13 uses shading for the Equator zone. If the rows of the beams in the beam map of FIGS. 3, 10 and 13 were to be numbered, as depicted in FIGS. 10 and 13, rows 10, 11 and 12 refer to the Equator zone. Note that FIG. 12 uses shading for the four colors of the frequency plan. This shading is also used to assign each of the colors to the various spot beams in the Equator zone as depicted in FIG. 10.

Figure 13A:
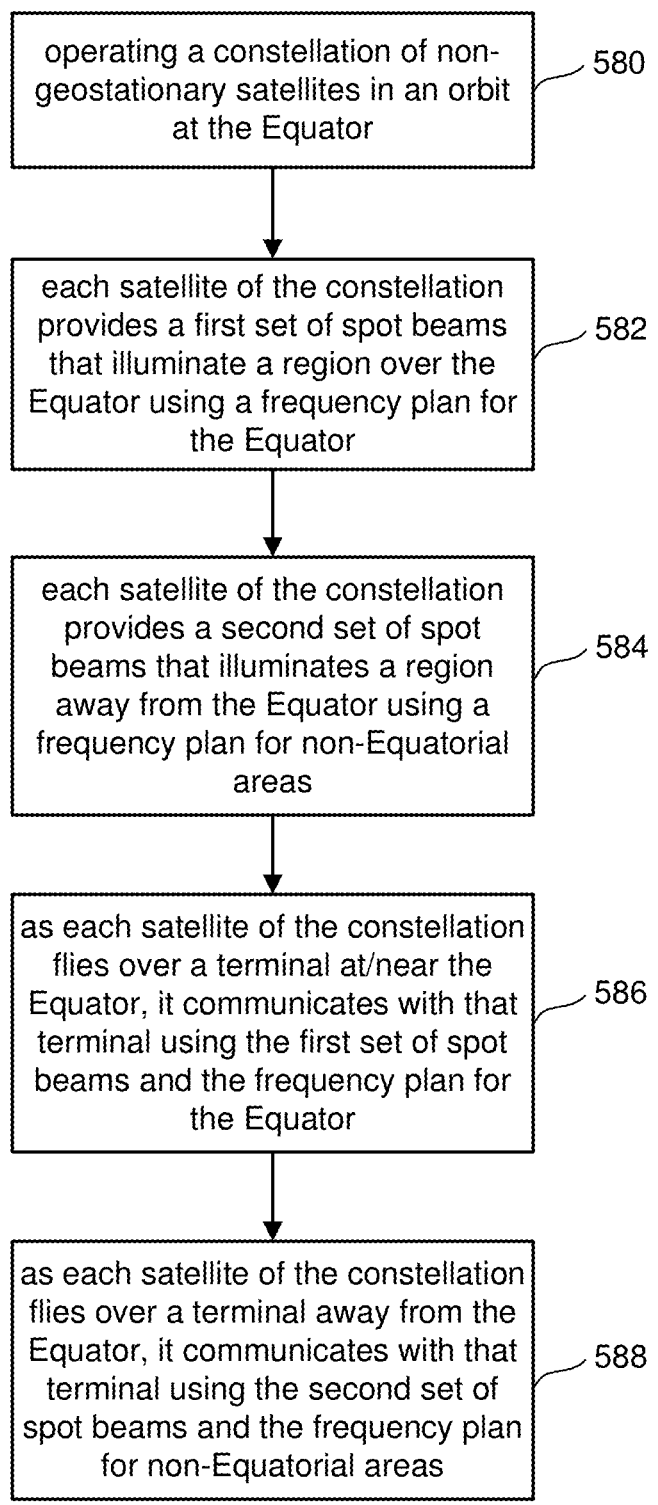
FIG. 13A is a flow chart describing one embodiment of a process for operating a constellation of satellites with different frequency plans and different hopping plans between beams at the Equator and beams away from the Equator.

FIG. 13A is flowchart describing one embodiment of a process for operating a constellation of satellites that use different frequency plans and different hopping plans (described below) between spot beams at the Equator and spot beams away from the Equator. In step 580, the system operates the constellation of non-geostationary satellites in an orbit at the Equator. In other embodiments, other orbits can be used. In step 582, each satellite of the constellation provides a first set of spot beams that illuminate a region over the Equator using a frequency plan for the Equator, for example, the frequency plan of FIGS. 11 and 12. In step 584, each satellite of the constellation provides a second set of spot beams that illuminates a region away from the Equator using a frequency plan for non-Equatorial areas. For example, step 584 can include using the frequency plans of FIGS. 8 and 9 in the non-Equator zone of FIG. 13. Step 582 can include using the frequency plans of FIGS. 11 and 12 in the Equator zone of FIG. 13. In step 586, each of the satellites of the constellation flies over a terminal at or near the Equator as it is traversing along its orbital path along the Equator. As it flies over that terminal, it communicates with that terminal using the first set of spot beams and the frequency plan for the Equator. In step 588, as each satellite of the constellation flies over a terminal in a region away from the Equator, it communicates with that terminal using the second set of spot beams and the frequency plan for non-Equatorial areas (e.g., the non-Equator zone). As discussed above, each of the 11 satellites of the example constellation depicted in FIG. 4 traverse over the same orbit four times a day and thus each of the satellites will have an opportunity to communicate with each terminal potentially four times a day (if that terminal is stationary and always on), using the appropriate Equator zone or non-Equator zone frequency plan. The process of FIG. 13A is not necessarily performed in the order or sequence depicted in FIG. 13A, and other sequences can be implemented. For example, step 580 can be thought of as summarizing the whole operation of the system and can encompass all other steps, steps 582 and 584 can be performed in parallel, and steps 582 and 584 can be performed in parallel.

As discussed above, the high capacity steerable beams can provide service to subscriber terminals as well as gateways. The satellites can support full mesh networks between subscribers terminals in high capacity steerable beams. For example, two subscriber terminals in a same high capacity steerable beam can communicate with each other directly via the satellite without going through a gateway. Additionally, two subscriber terminals in a different high capacity steerable beams can communicate with each other directly via the satellite without going through a gateway. These subscriber terminals in high capacity steerable beams and the high capacity steerable beams are not performing time domain beam hopping. Additionally, gateways can communicate with subscriber terminals in the high capacity beams without using time domain beam hopping. Another embodiment is to configure beam assignments in the articulated array such that continuous connectivity is provided to geographic locations, such that no beam hopping is required by either the gateway or subscriber terminals in either feeder of subscriber uplinks.

Single Polarity Across Path of Spot Beams

As the 11 satellites 302-322 travel along their orbital path west to east at the Equator, the spot beams (including the entire Field of Regard) will move over the Earth's surface from west to east. As the spot beams move over a subscriber terminal, that subscriber terminal will first connect with an eastern spot beam in the Field of Regard and then slowly move towards the western spot beams as the spot beams as a whole (see FIG. 3)*move* west to east. For example, a subscriber terminal may first connect to spot beam 199. Subsequently, the subscriber terminal will move through spot beams 129, 130, 131, 132, 133, 134, 135, 136 and then 137.

Figure 14A:
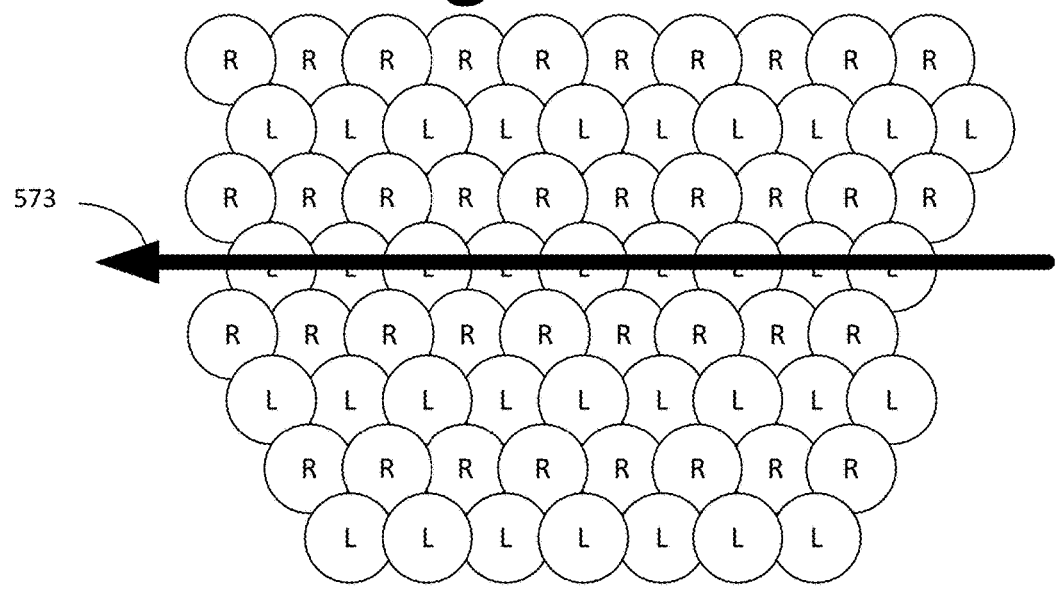
FIGS. 14A and 14B depict example beam polarization maps.

In one embodiment, each of the non-geostationary satellites 302-322 provide the plurality of spot beams (e.g., the beam map in Field of Regard of FIG. 3) to use multiple frequencies and multiple (e.g., two) polarities, such that all spot beams along a path completely across the plurality of spot beams in the orbital direction communicate using a common polarization. In the above-described example, the path completely across the plurality of spot beams was from spot beam 199 to spot beam 137. That path is in the orbital direction because the satellite is traveling west to east along the Equator. In this embodiment, all the spot beams in the path across beams 199, 129, 130, 131, 132, 133, 134, 135, 136 and 137 are configured to have the same polarity. This way, as the Field of Regard travels over and past a subscriber terminal, that subscriber terminal will not need to change polarities as it hands over between spot beams or between satellites. It may be that the subscriber terminal may have to change frequencies when it changes spot beams but it will not need to change polarities. This is more graphically depicted in FIG. 14A which shows a Field of Regard (or a portion of a Field of Regard), including a polarity of spot beams. In each spot beam, there is an L or an R to indicate whether the spot beam has left hand polarization or right hand polarization. Arrow 573 depicts a path completely across the plurality of spot beams in the orbital direction and shows an example of how that path will only traverse across spot beams having left hand polarization.

Figure 14B:
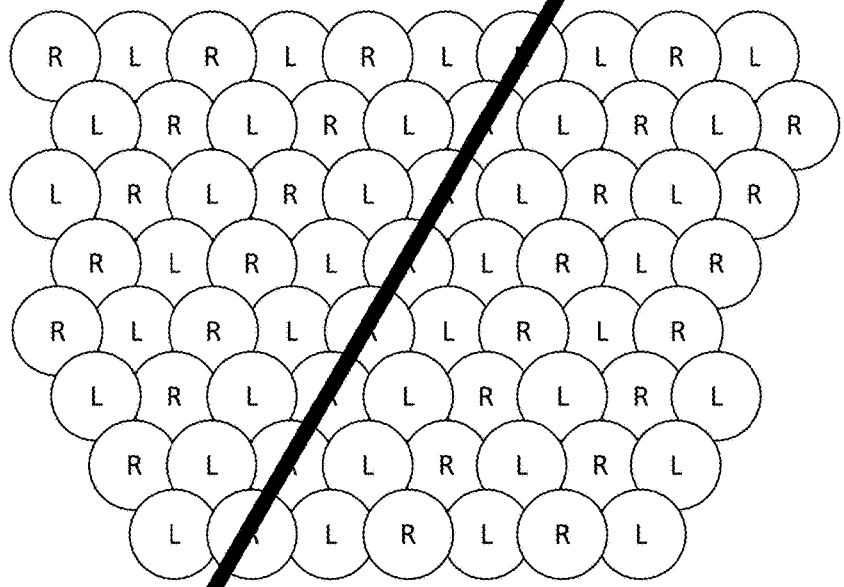

FIG. 14B shows another embodiment of a plurality of spot beams where the path completely across the plurality of spot beams in the orbital direction is on a diagonal, as indicated by arrow 575. Arrows 573 and 575 of FIGS. 14A and 14B indicate the path that a subscriber terminal will take as the subscriber terminal is stationary and the spot beams traverse over or pass the subscriber terminal. Note that the technology described herein can be used with equatorial orbits and non-equatorial orbits (orbits that do not follow the equator), including elliptical orbits.

Figure 15A:
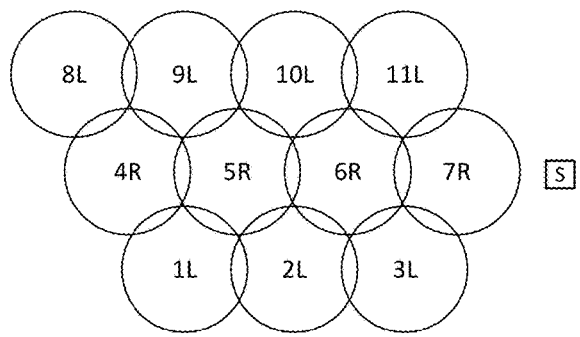
FIGS. 15A, 15B, 15C, 15D, 15E and 15F depict example beam maps.
Figure 15B:
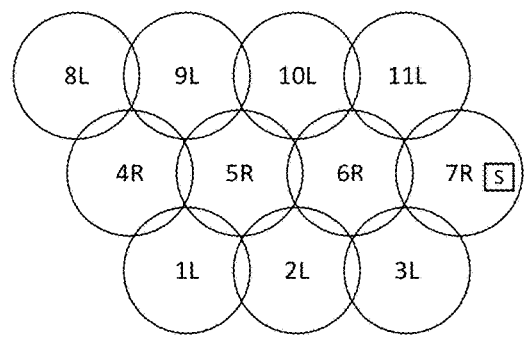
Figure 15C:
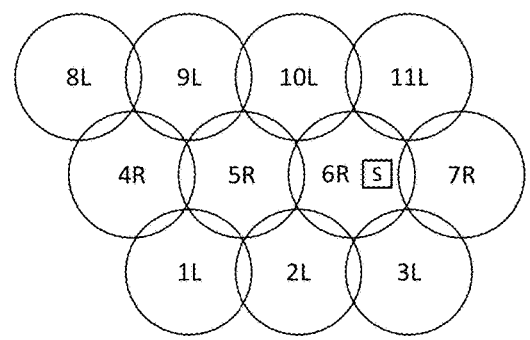
Figure 15D:
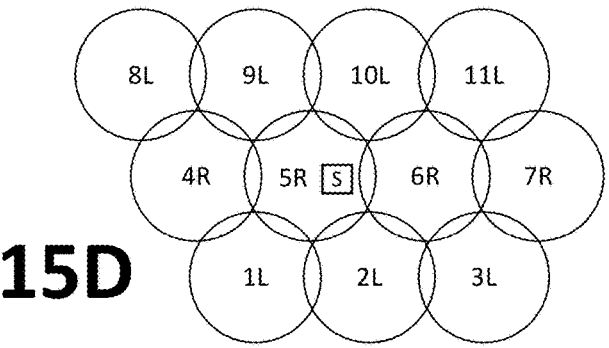
Figure 15E:
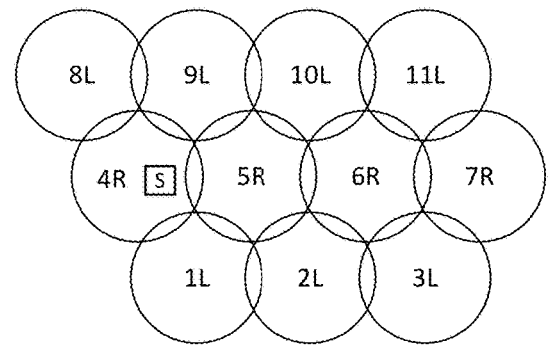
Figure 15F:
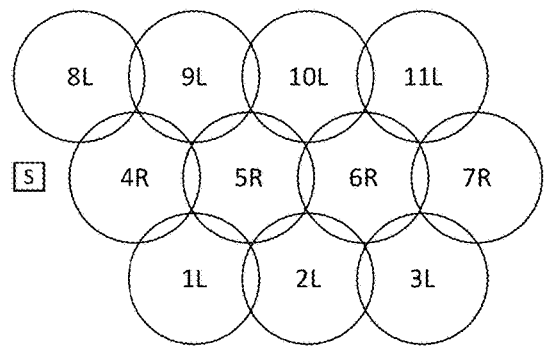

FIGS. 15A-F provides another example of a subscriber terminal traversing completely across the plurality of spot beams in the orbital direction using a single polarization. For example, in FIG. 15A, spot beams 1-11 are depicted. Next to each spot beam number is an L or an R indicating whether it is left hand polarization or using right hand polarization. The initial position of the subscriber terminal is indicated by "S." As seen in FIG. 15A, the Field of Regard is due west of the subscriber terminal S. As also seen in FIG. 8, each spot beam is configured to communicate in at least one frequency range and one polarity. Polarizations are assigned to the spot beams such that all spot beams that illuminate and are configured to communicate with the subscriber terminal S on a ground location use a same polarity, while other spot beams in the Field of Regard that do not illuminate subscriber terminal S can use another polarity. For example, FIGS. 15B-F shows the Field of Regard moving west to east. In FIG. 15B, the Field of Regard has moved such that subscriber terminal S is now within spot beam 7 and communicating with spot beam 7 using right hand polarization. Meanwhile, spot beams 1, 2, 3 and 8-11 communicate with other subscriber terminals using left hand polarization. In FIG. 15C, the Field of Regard has moved such that the subscriber terminal S is communicating with spot beam 6, also using right hand polarization. In FIG. 15D, the Field of Regard has moved such that subscriber terminal S is not in communication with spot beam 5, using right hand polarization. In FIG. 15E, the Field of Regard has moved such that subscriber terminal S is in communication with spot beam 4, using right hand polarization. In FIG. 15F, the Field of Regard has moved east of subscriber terminal S and therefore subscriber terminal S is no longer in communication with any of the spot beams or the Field of Regard depicted in FIG. 15F. As can be seen, as the spot beams traversed across or past subscriber terminal S, subscriber terminal S continued to only communicate using right hand polarization. In one embodiment, each spot beams 4, 5, 6 and 7 use different frequency bands. In other embodiments, spot beams 5 and 7 can use the same frequency band, and spot beams 4 and 6 can use the same frequency band. Therefore, as the Field of Regard traverses over or passed the subscriber terminal, the subscriber terminal will need to change frequencies between spot beams but will not change polarizations. Not changing polarization makes the handover process faster and allows the subscriber terminal to be a simpler less expensive design.

Figure 15G:
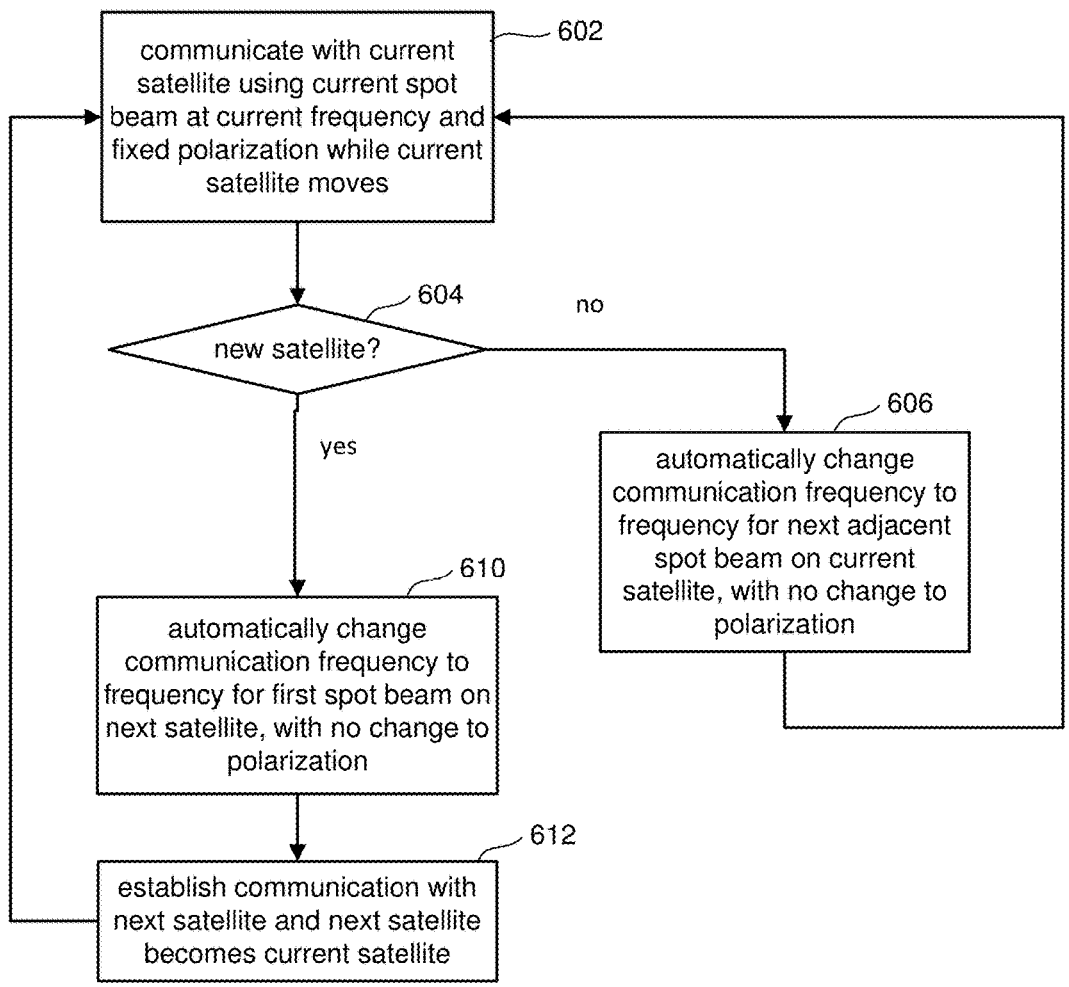
FIG. 15G is a flow chart describing one embodiment of a process for operating a satellite communications system, including changing frequencies for subscriber terminals without the need to change polarization as the satellites move with respect to the subscriber terminals.

FIG. 15G is a flowchart describing one embodiment of a process for operating a subscriber terminal, including changing frequencies for subscriber terminals without the need to change polarization as the satellite moves with respect to the subscriber terminal. In step 602, the subscriber terminal communicates with the current satellite using the current spot beam at a current frequency and fixed polarization while the current satellite moves in orbit. Step 602 is continued to be performed until the subscriber terminal comes to the edge of the spot beam. At that point a handover must take place to the next spot beam. It is determined whether the next spot beam is in a new satellite or in the current satellite (step 604). If not in a new satellite (therefore, in the current satellite), then the subscriber terminal automatically change its communication frequency to a frequency used for the next adjacent spot beam on the current satellite, with no change to polarization (step 606). The process will then continue at step 602. However, if the next adjacent spot beam is for a new satellite (step 604), then in step 610, the subscriber terminal automatically changes communication frequency to the frequency for the first spot beam on the next satellite, with no change to polarization. Thus, even as the subscriber terminal hands off from satellite to satellite, it will not need to change polarization. Thus, the subscriber terminal will maintain one polarization across the path of spot beams even over multiple satellites. In step 612, the subscriber terminal will establish communication with the next satellite and the next satellite will then become the current satellite. After step 612, the process moves back to step 602.

Figure 15H:
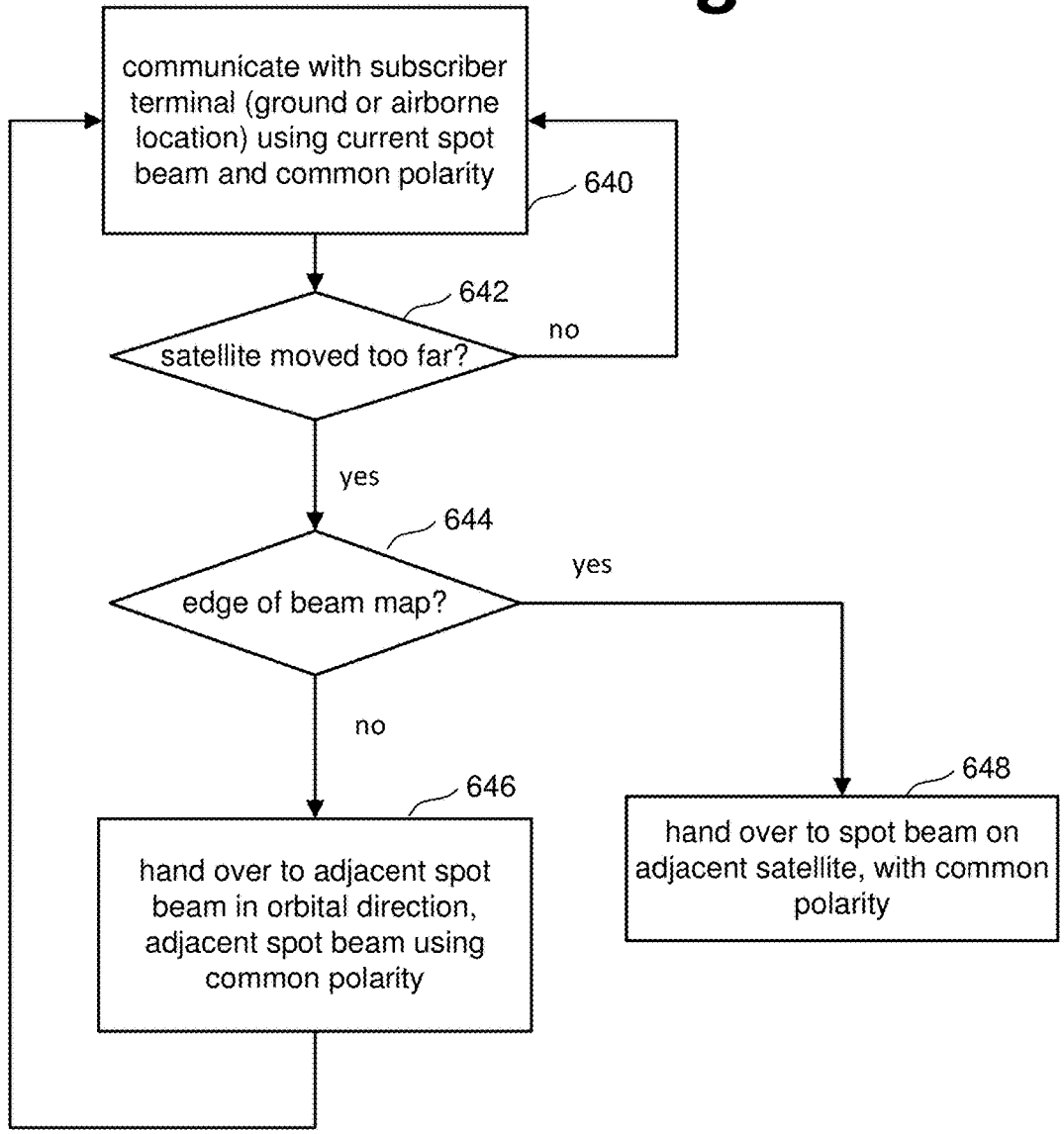
FIG. 15H is a flow chart describing one embodiment of a process for operating a satellite communications system, including implementing satellite handovers.
Figure 17A:
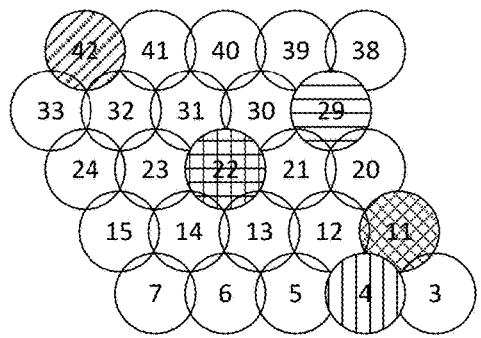
FIGS. 17A, 17B, 17C, 17D, and 17E depict example beam maps.
Figure 17B:
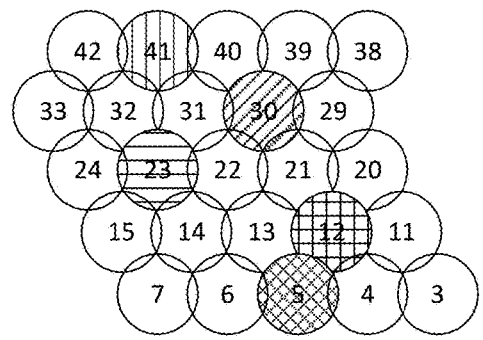
Figure 17C:
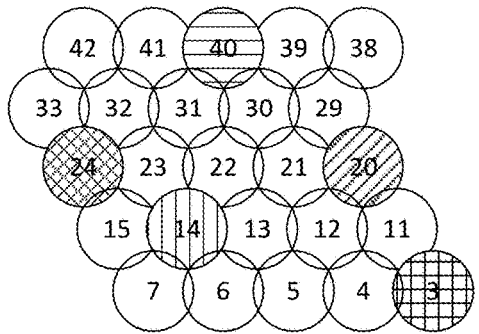
Figure 17D:
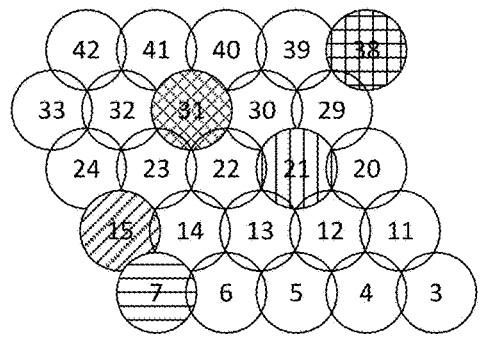
Figure 17E:
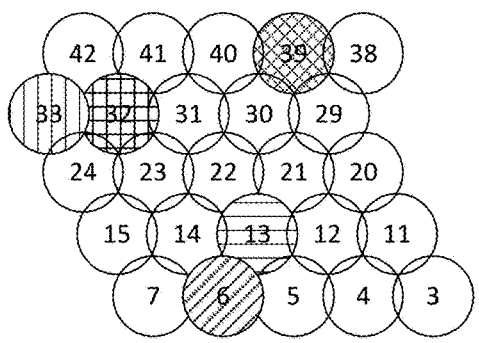

FIG. 15H is a flowchart describing one embodiment of a process for operating a satellite communication system, including implementing handovers between spot beams such that a subscriber terminal does not need to change polarities for the handover. The process of FIG. 15H is performed by a non-geostationary satellite orbiting the Earth that is configured to provide a plurality of spot beams in the Field of Regard, where the plurality of spot beams use multiple frequencies and multiple polarities, each spot beam of the plurality spot beam is configured to communicate in at least one frequency range and polarity. The satellite will communicate with a terminal using different spot beams and a common polarity while the terminal is within the Field of Regard as the first non-geostationary satellite moves relative to the Earth and the terminal changes spot beams. For example, in step 640, the satellite will communicate with a subscriber terminal (ground or airborne location) using the current spot beam and the common polarity for the path that that subscriber terminal will take across the Field of Regard. In step 642, it is determined whether the satellite has moved too far such that the subscriber terminal will no longer be in the current spot beam. If not, the process will continue in step 640. If, however, the satellite has moved too far such that the subscriber terminal is at the edge of a spot beam, it is next determined whether the subscriber terminal is at the edge of the beam map (step 644). If the subscriber terminal is not at the edge of the beam map, then the subscriber terminal will be handed over to the next adjacent spot beam in the orbital direction that uses the same common polarity in step 646. Subsequently, the process will continue in step 640. If, however, the subscriber terminal was at the edge of the beam map, then in step 648, the subscriber terminal will be handed over to a spot beam on the adjacent satellite, also using the same common polarity that the subscriber terminal has been communicating with.

Beam Hopping

As described above, each of satellites 302-322 are non-geostationary satellites configured to provide a plurality of spot beams using time domain beam hopping among the spot beams. In one embodiment, time domain beam hopping includes multiple spot beams sharing frequency bandwidth or throughput such that different spot beams can use the same frequency bandwidth or throughput at different times because the shared bandwidth or throughput hops between spot beams with only a subset of spot beams being active at a time. Thus, the satellite is configured to switch throughput among spot beams in a same hopping group. The time domain beam hopping allows the Field of Regard to be much bigger than without using time domain beam hopping. That is, the satellite can have a much wider coverage area.

One of the challenges of time domain beam hopping with a non-geostationary satellite is that the coverage area is constantly changing. In addition, over time demand for services changes. Thus there are two changing variables demand and coverage area, which complicates the task of designing a non-geostationary satellite communication system.

To implement the time domain beam hopping, the two hundred non-articulated spot beams of the satellite are divided up into beam hopping groups. Each beam hopping group includes multiple spot beams. At any instance in time, only one beam (or a subset of one or more beams) of a hopping group will be active, while the other beams of the hopping group will be inactive. In one embodiment, all beams of the hopping group utilize the same frequency and polarization. In another embodiment, the beams of a hopping group use the same frequency but mix polarizations. The system will create the notion of a hopping period divided into a number of intervals called epochs. Each beam will be assigned one or more epochs during the hopping period. By assigning different numbers of epochs to different spot beams allows the dwell time to vary among spot beams in a hopping group. In some embodiments, the hopping plans consider the revisit time that the particular application needs. For example, voice over IP may need twenty to thirty millisecond revisits to prevent a degradation in quality.

The hopping groups can be assigned to spot beams based on many different strategies. In one example, all the beams of a hopping group are next to each other. For example, FIG. 16A shows a portion of the Field of Regard of FIG. 3, including 25 spot beams divided into five hopping groups of five spot beams each. Each of the hopping groups is shaded using a different type of shading. Hopping group 1 includes beams 3, 4, 5, 11 and 12. Hopping group 2 includes beams 6, 7, 13, 14 and 15. Hopping group 3 includes beams 20, 21,

29, 38 and 39. Hopping group 4 includes beams 22, 30, 31, 40 and 41. Hopping group 5 includes beams 23, 24, 32, 33 and 42. In some embodiments, the hopping plans between hopping groups with spot beam members adjacent to spot beams members of other hopping groups are planned to avoid inter-beam interference In other embodiments, each of the beams of a hopping group is uniformly or non-uniformly distributed over the Field of Regard. For example, in this embodiment, it is possible that each of the spot beams of a hopping group utilize the same frequency range. The polarization can be different between beams. FIG. 16B shows a portion of the Field of Regard of FIG. 3 including 25 spot beams divided into five hopping groups. Each of the beams of a hopping group is shaded using the same type of shading such that different shading is used for different hopping groups. For example, hopping group 1 includes beams 3, 14, 22, 32 and 38. Hopping group 2 includes beams 4, 14, 21, 33 and 41. Hopping group 3 includes beams 5, 11, 24, 33 and 39. Hopping group 4 includes beams 6, 15, 20, 30 and 42. Hopping group 5 includes beams 7, 13, 23, 29 and 40.

In another embodiment, the hopping groups are arranged consecutively along a path traversed by a subscriber terminal. For example, FIG. 16C shows a portion of the Field of Regard of FIG. 3, with an arrow indicating the orbital direction. Each row of spot beams includes spot beams in the same hopping group. In this embodiment, adjacent rows would have different frequency ranges or different polarizations. In the embodiment of FIG. 16C, hopping group 1 includes spot beams 3, 4, 5, 6 and 7. Hopping group 2 includes beams 11, 12, 13, 14 and 15. Hopping group 3 includes beams 20, 21, 22, 23, and 24. Hopping group 4 includes beams 29, 30, 31, 32 and 33. Hopping group 5 includes beams 38, 39, 40, 41 and 42.

To graphically indicate time domain beam hopping, FIGS. 17A-17E depict five different epochs in a hopping period for the embodiment of FIG. 16B. In each of FIGS. 17A-E, the spot beam that is active for each hopping group is shaded and the spot beams that are inactive for each of the hopping groups are not shaded. In the first epoch, depicted by FIG. 17A, spot beams 4, 11, 22, 29 and 42 are active, while the other spot beams are not active. In the second epoch, depicted in FIG. 17B, spot beams 5, 12, 23, 50 and 41 are active, while the other spot beams are inactive. In the third epoch, depicted by FIG. 17C, spot beams 3, 14, 20, 24, and 40 are active, while the other spot beams are inactive. In the fourth epoch, depicted by FIG. 17D, spot beams 7, 15, 21, 31, and 38 are active, while the rest of the spot beams are inactive. In the fifth epoch, depicted in FIG. 17E, spot beams 6, 13, 32, 33, and 39 are active, while the other spot beams are inactive. It is contemplated that in some embodiments, a hopping period will have more than five epochs. However no specific number of epochs are required in a particular hopping period.

In some embodiments, the hopping period is completely configurable and programmable while the satellites are in orbit. This concept is depicted in FIG. 18 which shows a series of epochs divided into hopping periods. In this embodiment, each hopping period includes N epochs. After N epochs, the next hopping period is performed. In some embodiments, consecutive hopping periods will perform the same hopping plan (e.g., the same assignment of spot beams to epochs) until a satellite is programmed to change hopping plans (e.g., because demand has changed). During each hopping period, as depicted by FIG. 17A-17E, only one spot beam of each hopping group is active. Therefore, only a portion of the Field of Regard is active. Those spot beams that are active are referred to as the Field of View. As the number of active spot beams is less than the total number of spot beams in the beam map, each of non-geostationary satellites 302-322 has a Field of Regard that is greater than its Field of View at any instance in time.

As discussed above, each of satellites 302-322 provide a plurality of spot beams as the satellites move across the planet surface. In order to perform the time domain beam hopping, the spot beams are divided into hopping groups. The satellite uses the selection matrices described above, in conjunction with the digital channelizer, to perform the time domain beam hopping. FIG. 19 is a flowchart describing one embodiment of a process of a satellite performing the time domain beam hopping. In step 670, the satellite reconfigures the selection matrices to route power and make a connection to the applicable gateway beam to a next set of beams in the hopping groups according to the current hopping plan. In step 672, the satellite will enable communication during epoch 0 (see FIG. 18), only sending power and making gateway connection to the predetermined subset of beams in each group. In step 674, the satellite will reconfigure the selection matrices to route power to the next set of beams in the hopping groups according to the current hopping plan. In step 676, the satellite will communicate during epoch 1, only sending power to a predetermined set of beams in each hopping group according to the hopping plan. In step 678, the satellite will reconfigure the selection matrices to route power to the next set of spot beams in the hopping groups according to the current hopping plan. In step 680, the satellite will enable communication during epoch 2, only sending power to a predetermined subset of beams in each hopping group. This process will continue for each epoch, as depicted in FIG. 18, until the last epoch (designated as epoch N in FIG. 18). In step 682, the satellite will reconfigure the selection matrix to route power to the next hopping group beam sequence according to the current hopping plan. In step 684, the satellite will allow communication during epoch N, only sending power to a predetermined subset of beams in each hopping group. In step 686, the satellite can (optionally) access a new hopping plan that takes into account movement of the non-geostationary satellite. In step 688, the new hopping plan is loaded and becomes the current hopping plan, such that the process continues to step 670. Thus, the process of FIG. 19 describes the operation of the non-geostationary satellite performing time domain beam hopping during a hopping period. In one embodiment, the hopping plan can change at the end of each hopping period. In other embodiments, the hopping plan can change after a fixed number or dynamic number of hopping periods. In other embodiments, the hopping period can change after any hopping period; however, there is no requirement that a hopping plan change after any hopping period.

In one example embodiment, the hopping period is 90 seconds and an epoch is 1.286334 milliseconds. In this embodiment, the time for a spot beam to drift completely across a subscriber terminal is approximately 2 hopping periods (168 seconds).

In one example embodiment that uses time domain beam hopping for the uplink and downlink of the two hundred non-articulated spot beams, the two hundred non-articulated spot beams are divided into thirty six hopping groups. Twenty-eight of the hopping groups include either six or seven spot beams that are not in the area at the Equator. Eight hopping groups include three or four spot beams that illuminate areas at the Equator. In one embodiment, the assignment of hopping groups is set and unchangeable in the satellites. In other embodiments, the membership of the hopping groups can be changed dynamically in orbit.

Figure 20A:
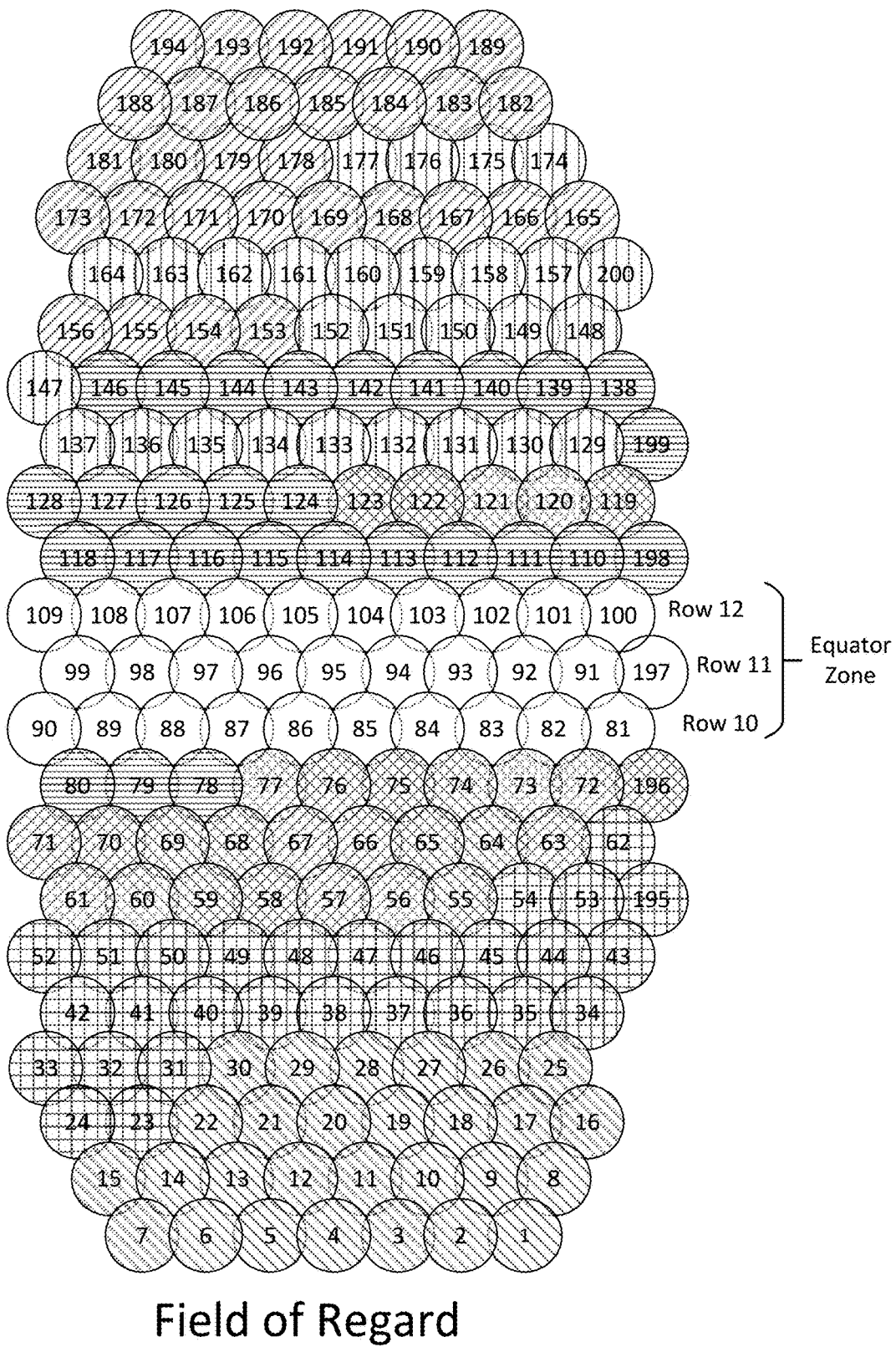
FIG. 20A depicts an example beam map showing hopping groups away from the Equator.
Figure 20B:
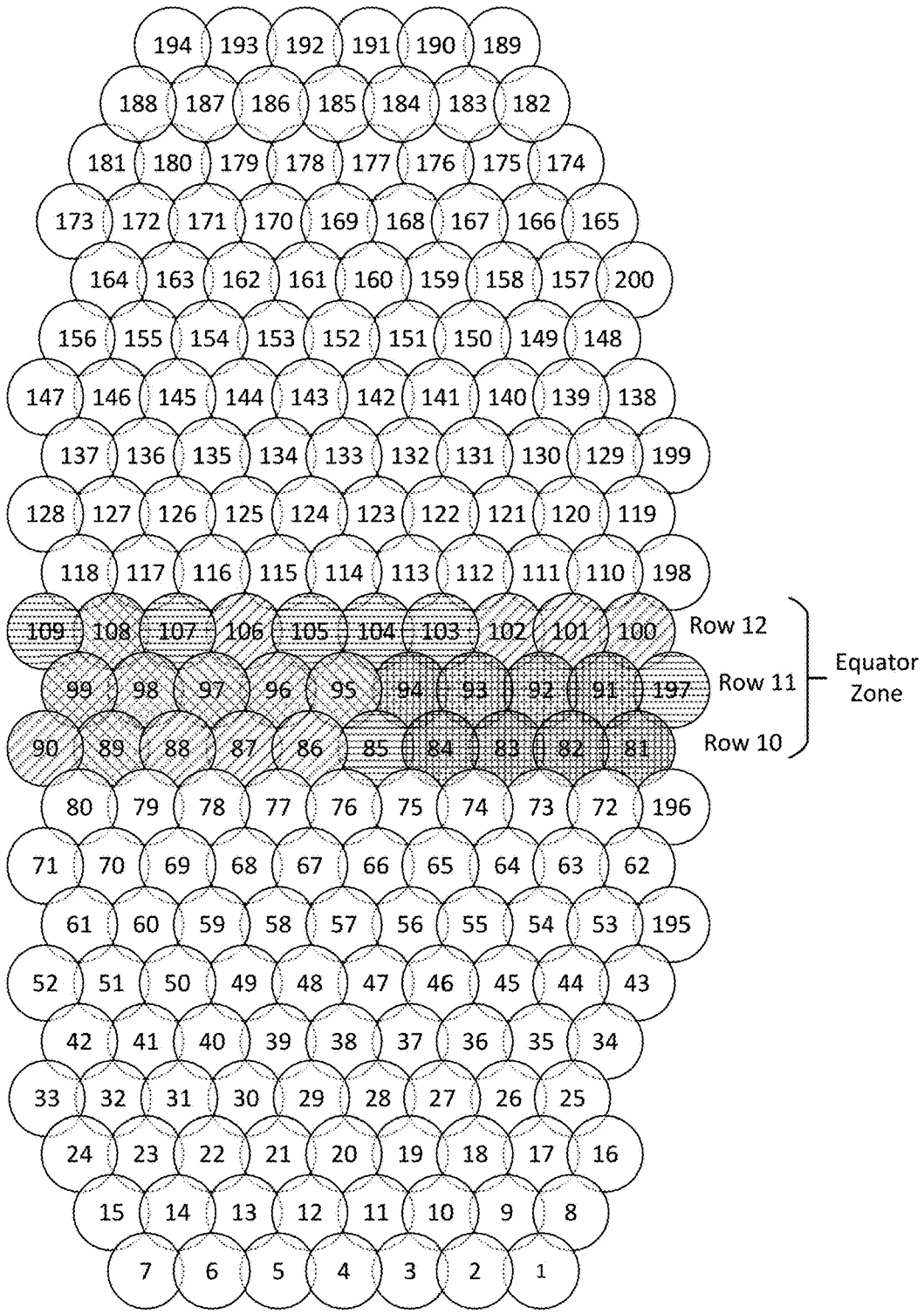
FIG. 20B depicts an example beam map showing hopping groups at the Equator.

In one embodiment, the two hundred non-articulated spot beams are divided into zones so that each hopping group can have one beam in each zone (some hopping groups may have two beams in a zone). In one example embodiment, the non-Equatorial hopping groups will hop across six zones arranged in a north/south grid. This leverages the tendency of each continent's traffic to concentrate along a specific latitude. This also decreases the probability that a heavy demand is needed on one hopping group in two locations and allows hopping groups to concentrate in any large geographic area of high traffic demand. For example, FIG. 20A shows the same Field of Regard as FIG. 3 and indicates the Equator zone (rows 10, 11 and 12). The rest of the Field of Regard, other than the Equator zone, is the non-Equator region. Those spot beams in the non-Equator region are shaded to indicate six zones. Each hopping group will include at least one beam in each zone. FIG. 20B shows the zones for the Equator zone. That is each of the spot beams in the Equator zone is shaded one of four types of shading to indicate which one of the four zones each spot beam is in. Each of the hopping groups for the Equator zone will include no more than one beam in each zone. Thus the Equator zone and the non-Equatorial region have separate zones for forming hopping groups. As such, the beam hopping is performed in the Equator zone differently than the beam hopping in the non-Equatorial region. In one embodiment, a different hopping plan is used for the Equator zone than is used in the non-Equatorial region.

FIG. 21 is a table that shows one example of the 28 hopping groups used for the 170 non-articulated spot beams of the Field of Regard in FIGS. 20A and 20B that are not in the Equator zone. The left hand column indicates the hopping group number HG1-HG28. The other seven columns indicates beam numbers for the beams in the relative hopping group. FIG. 22 is a table describing membership of the hopping groups for the Equator zone. The left hand column indicates the hopping group number EHG1-EHG8 and the other four columns indicate the beam numbers for those beams in the relative hopping groups.

Figure 23:
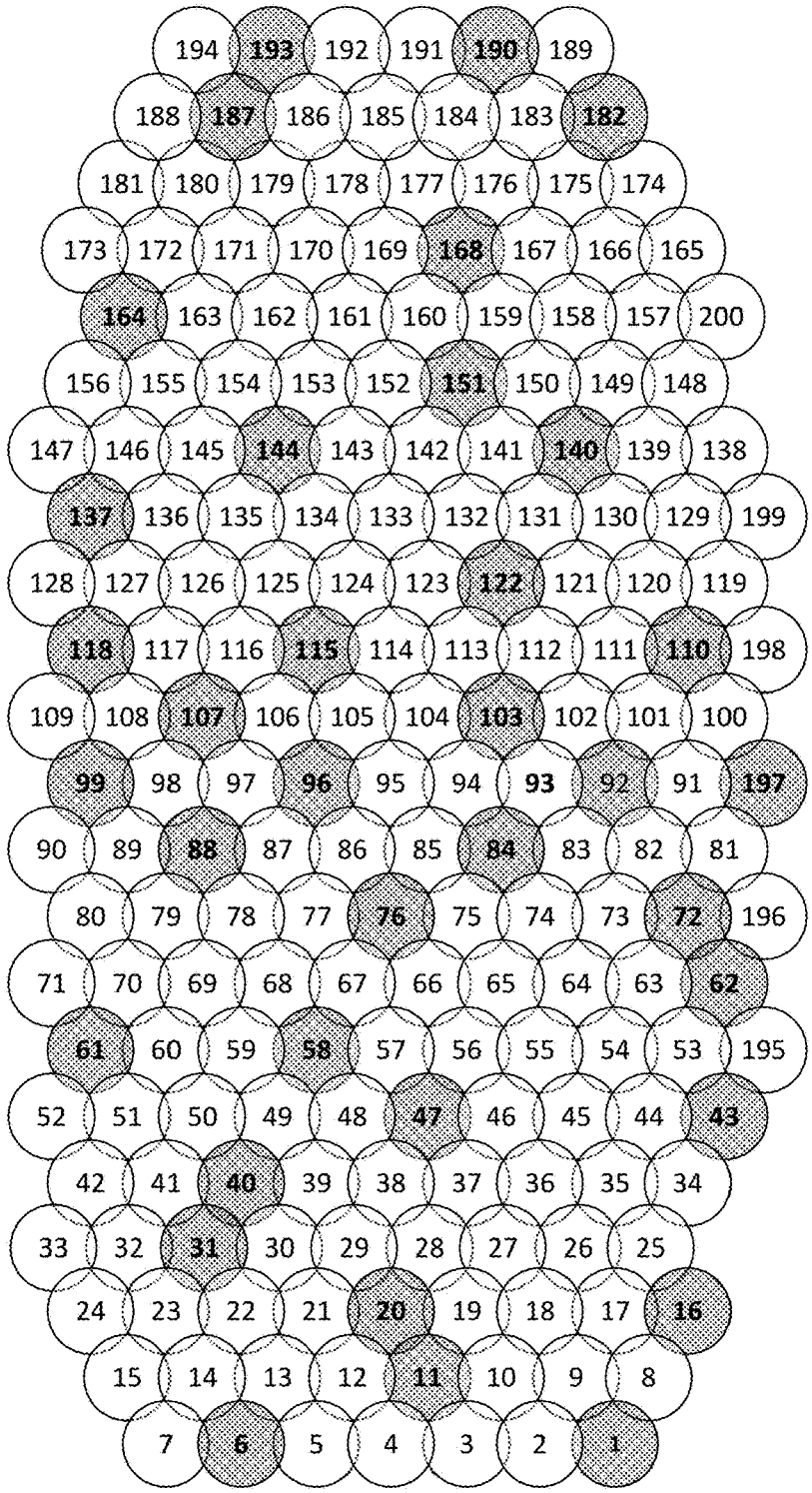
FIG. 23 depicts an example beam map showing the Field of Regard, depicting a moment in time and graphically indicating which subset of spot beams of the various hopping groups are active in the current epoch.

FIG. 23 shows the Field of Regard of FIG. 3 (and FIGS. 20A and 20B) at one epoch. Each of the hopping groups depicted in FIGS. 21 and 22 has one beam active at this particular epoch. Each of the active beams are shaded. Those active beams that are shaded represent the Field of View of the satellite at this epoch. While the entire beam represents the Field of Regard. As can be seen, the Field of Regard for the satellite is greater than the Field of View at this epoch.

Figure 24:
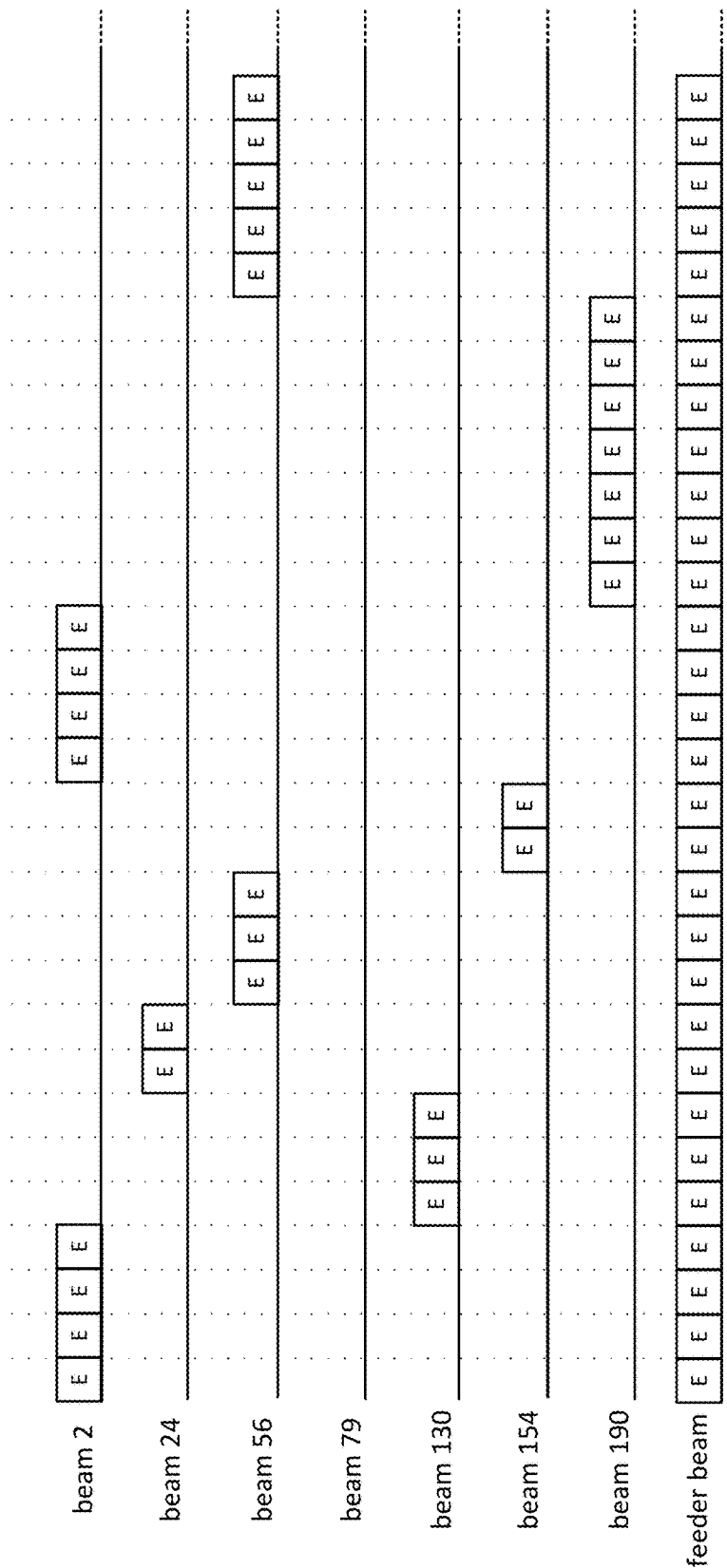
FIG. 24 describes a portion of one example of a beam hopping plan.

FIG. 24 graphically depicts how the epochs are assigned to a set of hopping beams in hopping group HG2 (see FIG. 21) over a portion of the hopping period. As can be seen, at no instance in time is any two beams active in the hopping group. That is only one beam is active at a time; however, the feeder beam which communicates with the gateway that supports beams 2, 24, 56, 79, 131, 154 and 190 is always active at each epoch. That is, at each hop, one source beam and the feeder beam is active for communication. The feeder beam is not part of the hopping group but in some embodiments connectivity to the feeder beam can be changed every hop. Thus, the gateways in the feeder beams are assigned time epochs to manager their terminals within.

Figure 25:
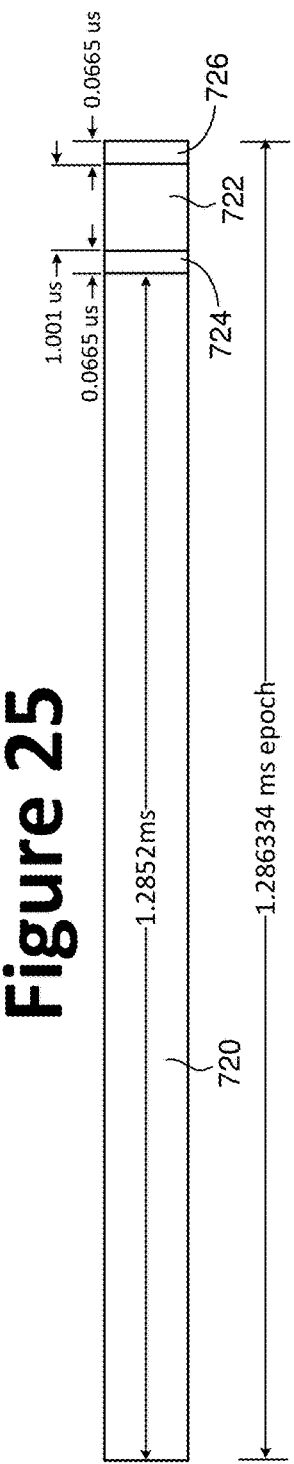
FIG. 25 depicts timing for one embodiment of a super-frame.

FIG. 25 depicts a super-frame which is the data format used during one epoch. In one embodiment, the super-frame is based on the DVB-S2x standard. Other formats of super-frames or frames can also be used. Each super-frame includes a usable portion 720 and an unusable portion. During the usable portion (or active time), data is transmitted. During the unusable portion, no data should be transmitted. In one embodiment, the usable portion lasts for 1.2852 milliseconds. The unusable portion includes a late arrival window 724, a payload transition time 722 and an early arrival window 726. Late arrival window 724 lasts for 0.0665 μs and accounts for communication that is arriving at the satellite slightly later than ought to be. Early arrival window 726 allows for 0.0665 μs and accounts for any data for the next epoch that arrives slightly early. Payload transition time 722 lasts for 1.001 μsec. During payload transition time 722, the satellite is unavailable to communicate along its various communication paths because the various selection matrices and/or the digital channelizer are adjusting/reconfiguring for the next epoch. As can be seen the entire epoch lasts for 1.286334 milliseconds. The technology described herein is not limited to any specific timing; therefore, other timing for the super-frame and transmission can also be used.

An alternative embodiment includes adding beam hop transition time between super-frames. This could also be in terms of integer number of symbols to help clocks stay synchronized, if needed. This in effect adds padding time between defined super-frames in order to configure transition time.

Figure 26:
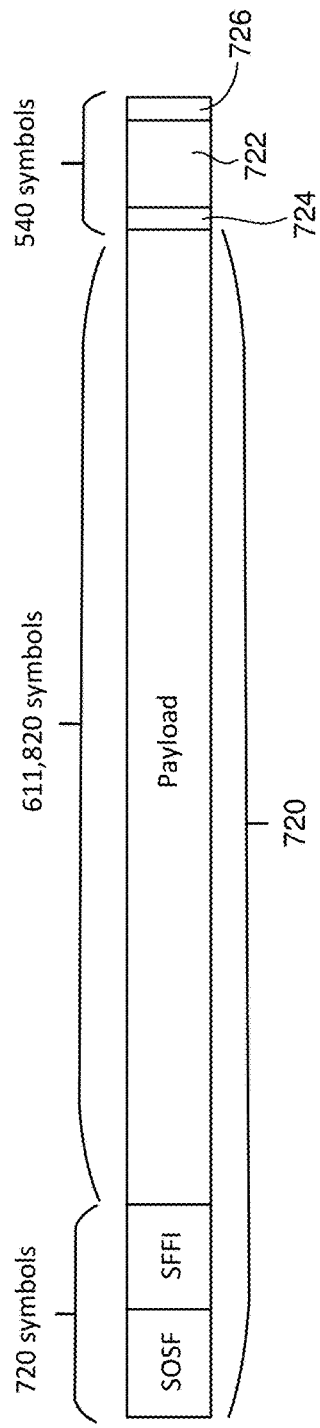
FIG. 26 depicts content of one embodiment of a super-frame.
Figure 27:
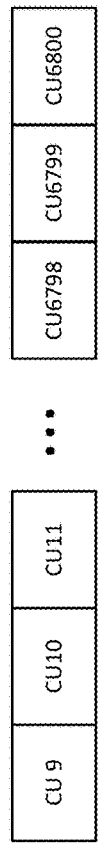
FIG. 27 depicts an example of a payload of a super-frame.

FIG. 26 also shows the same-super-frame of FIG. 25, but indicating the data contents. The unusable portion of the super-frame, which includes late arrival window 724, payload transition time 722 and early arrival window 726, utilizes the time for transmitting 540 symbols. However, no real data symbols will intentionally be transmitted during these times by the satellite. The usable portion 720 of the super-frame includes a header and a payload. The header, which uses 720 symbols, includes two fields: SOSF and SFFI. In one embodiment, SOSF is a start of a super-frame preamble that is a unique combination of bits to indicate a super-frame is starting. In one embodiment, SFFI is a super-frame format indicator which indicates which of the different super-frame formats this particular super-frame is implementing. In one embodiment, more than one super-frame format can be used for different types of communication. In some embodiments, only one format will be used for the communication system. In one embodiment the payload is broken up into a set of capacity units (CU). In one embodiment, each CU is 90 symbols and represents a slot in the payload. In one example implementation, the capacity units can be divided up between subscriber terminals within a spot beam so that different subscriber terminals will receive communication in different capacity units. This allows a type of time domain multiplexing of the data path. As depicted in FIG. 27, one embodiment of the Payload includes CU9-CU6800.

Figure 28:
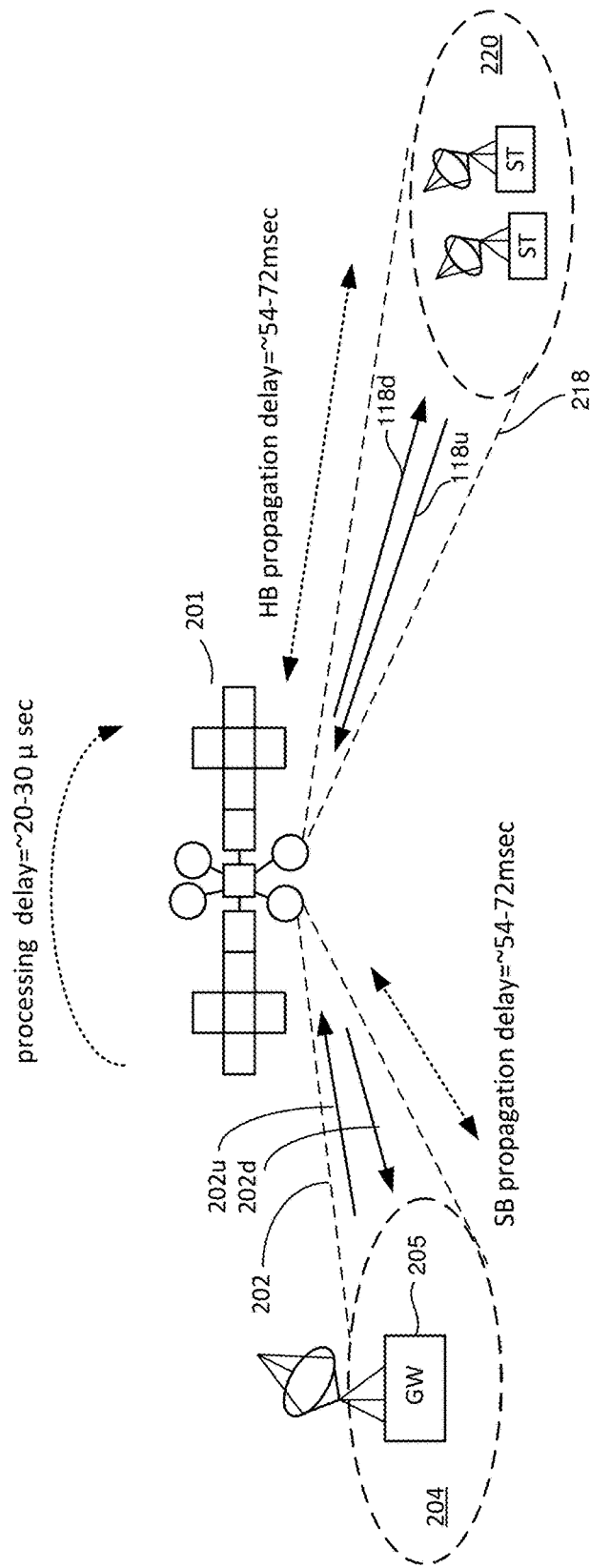
FIG. 28 depicts a portion of a satellite communication system, showing sample transmission times.

FIG. 28 describes some of the timing involved in the satellite communication system described herein. For example, FIG. 28 indicates that the propagation delay between the gateway and the satellite (SB propagation delay) is approximately 54-72 msec. The processing delay of communication through the satellite is approximately 20-30 μsec. The propagation delay from the satellite to the subscriber terminal for the non-articulated spot beams performing time domain beam hopping (HB propagation delay) is approximately 54 to 72 msec. Therefore, the satellite will transmit to a subscriber terminal in a hopping beam data that was sent by the gateway between 74 and 102 milliseconds previous. That is, the satellite is configured to receive data for a particular epoch that was sent previous to a start of the particular epoch by a time period that is significantly greater than the length of the epoch itself. For example, the data for the particular epoch can be sent to the satellite previous to the start of the particular epoch for transmitting the data by a time period that is greater than 10 or 30 times the length of the epoch. This requires very precise timing by the gateway.

There is a delay through the satellite payload so that the portion of the super-frame (see FIGS. 25 & 26) corresponding to payload transition time 722 enters the payload 20-30 μsec before it leaves the payload. Thus, the portion of the super-frame corresponding to payload transition time 722 is experienced/implemented by different portions of the payload at different times. FIG. 6 shows one example of a payload that comprises various selection matrices and a digital channelizer. Other switching components can also be used on the satellite. Different selection matrices and the digital channelizer may experience/implement payload transition time 722 at different moments in time. In one embodiment, the components of the payload have to time their reconfigurations so that the payload transition time 722 arrives at the component when it needs to reconfigure. Thus, the payload transition time 722 is implemented by different groups of switching components at different times such that different groups of switching components reconfigure for a new hopping plan at different times.

Figure 29:
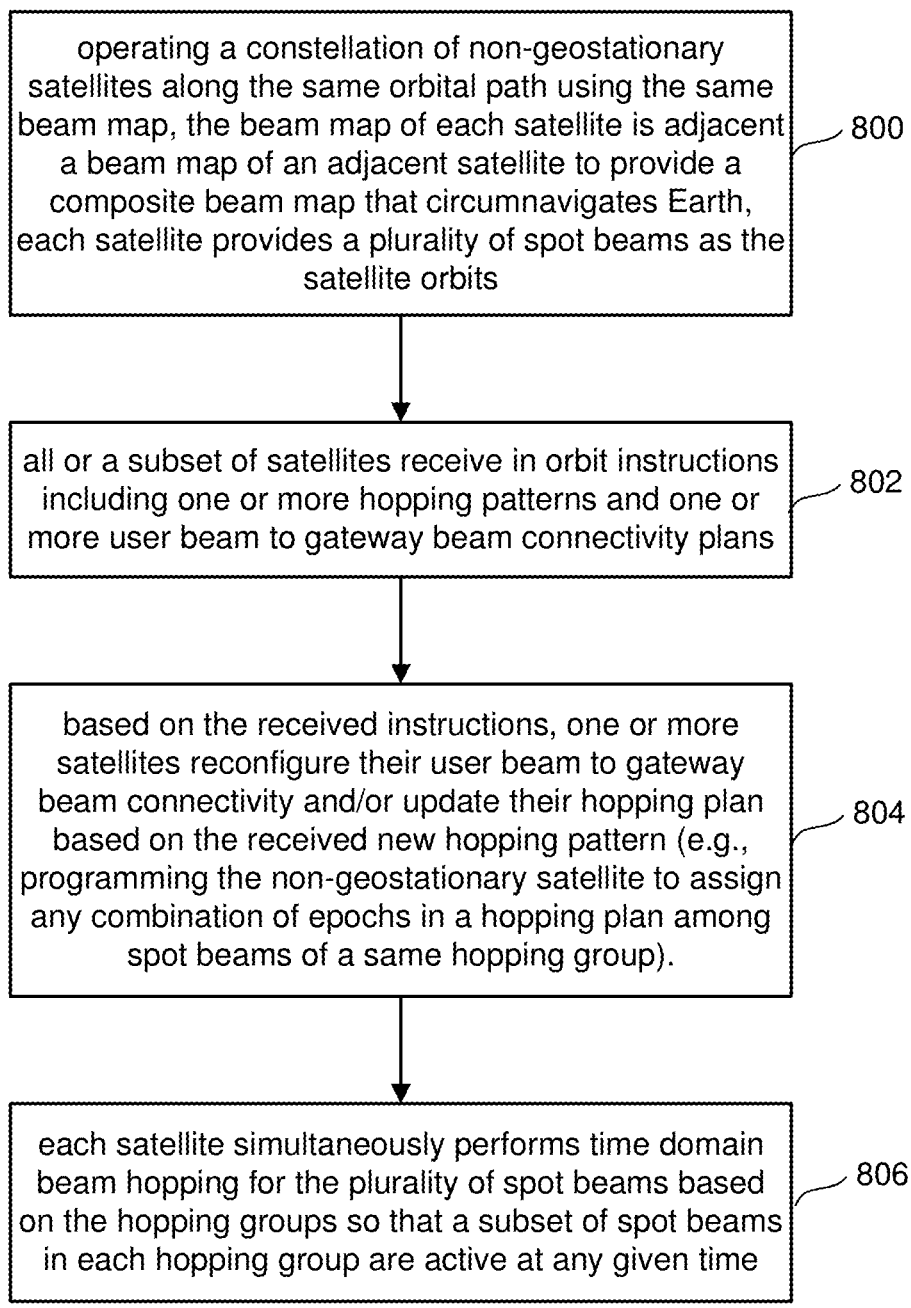
FIG. 29 is a flow chart describing one embodiment of a process for performing time domain beam hopping with a constellation of non-geostationary satellites that can dynamically change beam hopping plans.

FIG. 29 is a flowchart describing one embodiment of a process for performing time domain beam hopping, as discussed above. In step 800, the system operates the constellation of non-geostationary satellites along the same orbital path using the same beam map. The beam map of each satellite is adjacent to a beam map on the adjacent satellite to provide a composite beam map that circumnavigates the Earth. Each satellite provides a plurality of spot beams as the satellites moves across the planet surface. In step 802, all or a subset of satellites receive in-orbit instructions that include one or more hopping plans or hopping patterns, as well as one or more user beam to gateway beam connectivity plans. All gateways receive satellite dependent, time frequency dependent allocations of one or more gateway beam's bandwidth aligned with provisioned satellite user beam and gateway beam hopping patterns. In step 804, based on the received instructions in step 802, one or more satellites reconfigure their user beam to gateway beam connectivity (e.g., selection matrices and/or digital channelizer) and/or update their hopping plan based on the received new hopping pattern (e.g., programming a non-geostationary satellite to assign any combination of epochs in a hopping plan among spot beams of a same hopping group). In step 806, each satellite simultaneously performs time domain beam hopping for the plurality of non-articulated spot beams based on the hopping group so that a subset of spot beams in each hopping group are active at any given time. In one embodiment, each of steps 800-806 are performed continuously, and the process of FIG. 29 is performed repeatedly. In one embodiment, each gateway performs TDMA connectivity and sub-allocation according to its satellite-dependent, time-dependent, and user-beam-dependent gateway beam allocations. This gateway TDMA connectivity is implemented in independent time synchronization with each of the one or more satellites to which it is provisioned gateway beam allocations.

In one embodiment, the non-geostationary satellites described above includes a forward path and a return path, such that the forward path has different hopping plans than the return path. That is, the beam hooping for the forward path can be different than the beam hopping for the return. For example, the forward path can have different hopping groups, sequences and/or dwell times than the return.

Multiplexing Gateways

Figure 30:
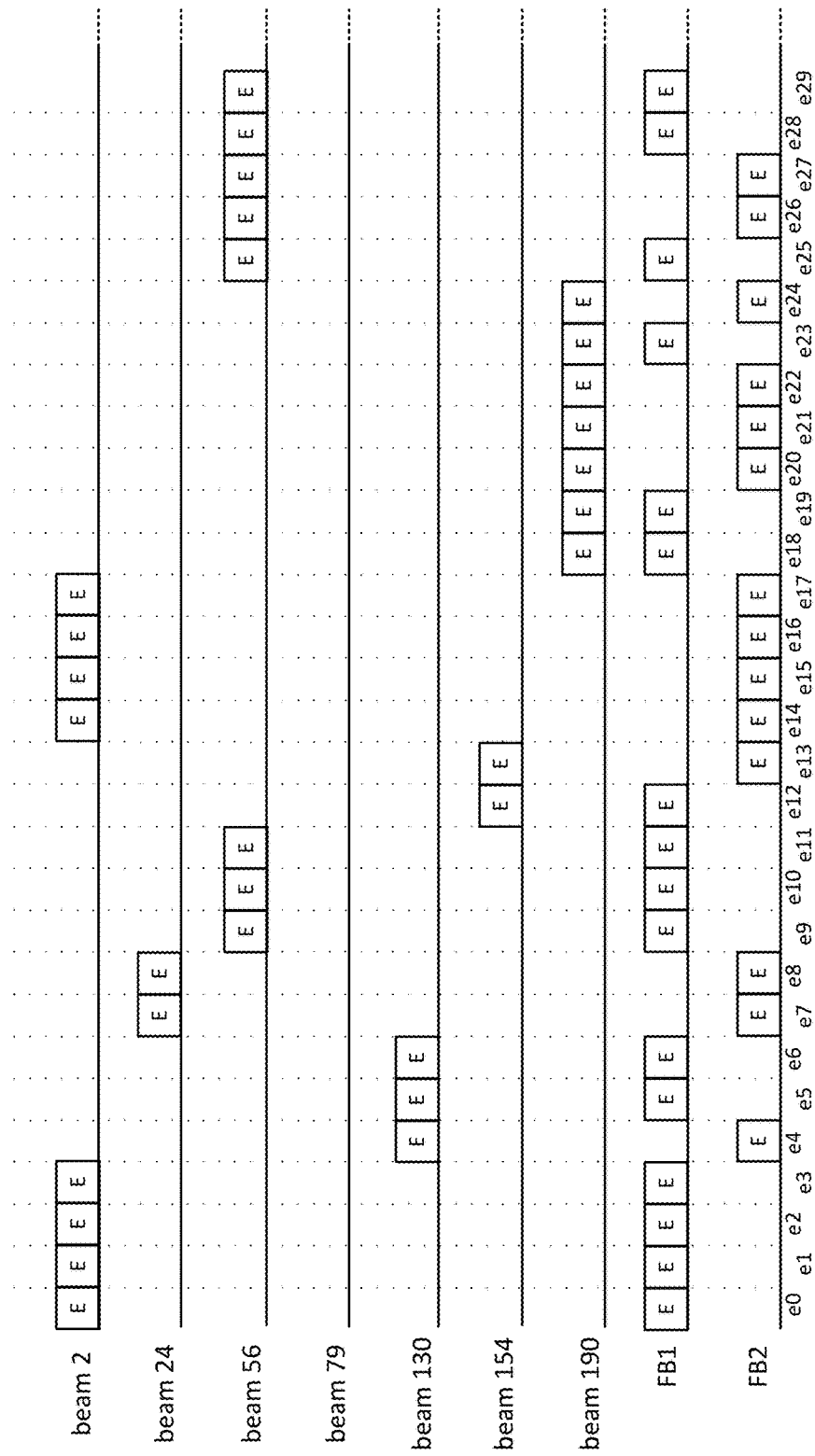
FIG. 30 describes a portion of one example of a beam hopping plan, and depicts time multiplexing of gateways.

Looking back on FIG. 24, all the beams of a hopping group are switched so that at any one given epoch one of the beams of the hopping group are in communication with a feeder beam. In another embodiment, the hopping group can be in communication with multiple feeder beams that are time multiplex. For example, FIG. 30 shows non-articulated spot beams implementing time domain beam hopping, including spot beams 2, 24, 56, 79, 130, 154 and 190. At any given epoch, only one of those time domain beam hopping spot beams will be active. FIG. 30 shows two feeder beams FB1 and FB2. FB1 connects to one gateway. FB2 connects to a second gateway. Thus, FIG. 30 shows a first plurality of spot beams (2, 24, 56, 79, 130, 154 and 190) and a second plurality of spot beams (FB1 and FB2). At any epoch, one spot beam of the hopping beams is active and one spot beam of the feeder beams is active in order for the two active beams to communicate. Thus, each of satellites 302-322 are configured to provide a first plurality of spot beams (e.g., spot beams 24, 56, 79, 130, 154, 190) for communication with subscriber terminals using time domain beam hopping to move throughput between spot beams of the first plurality of spot beams and a second plurality of spot beams (e.g., FB1 and FB2) adapted for communication with gateways. The satellites each include a spectrum routing network (one or more of the selection matrices and/or channelizer) that is configured to time multiplex the spot beams of the second plurality of spot beams with spot beams of the first plurality of spot beams. That is, each active time hopping beam can communicate with either one of the feeder beams at different epochs. For example, spot beam 130 communicates with FB2 at epoch E4 and FB1 at epochs E5 and E6, all while spot beam 130 remains over a subscriber terminal location on the planet surface. Similarly, spot beam 2 communicates with FB1 and epochs E0, E1, E2 and E3 and communicates with FB2 at epochs E7 and E8, all while spot beam 2 remains over a subscriber terminal location on the planet surface. In one embodiment, a spot beam's communication with a first gateway can be interleaved with its communication with a second gateway so that the respective sets of epochs are interleaved (set of epochs 18, 19 and 23 intermixed with set of epochs 20, 21, 22 and 24). When more than one gateway is supported in a feeder beam the N gateways may operate on different frequencies or the same frequency. If operating on one frequency each gateway will have a different epoch assigned for transmission and reception.

Figure 31:
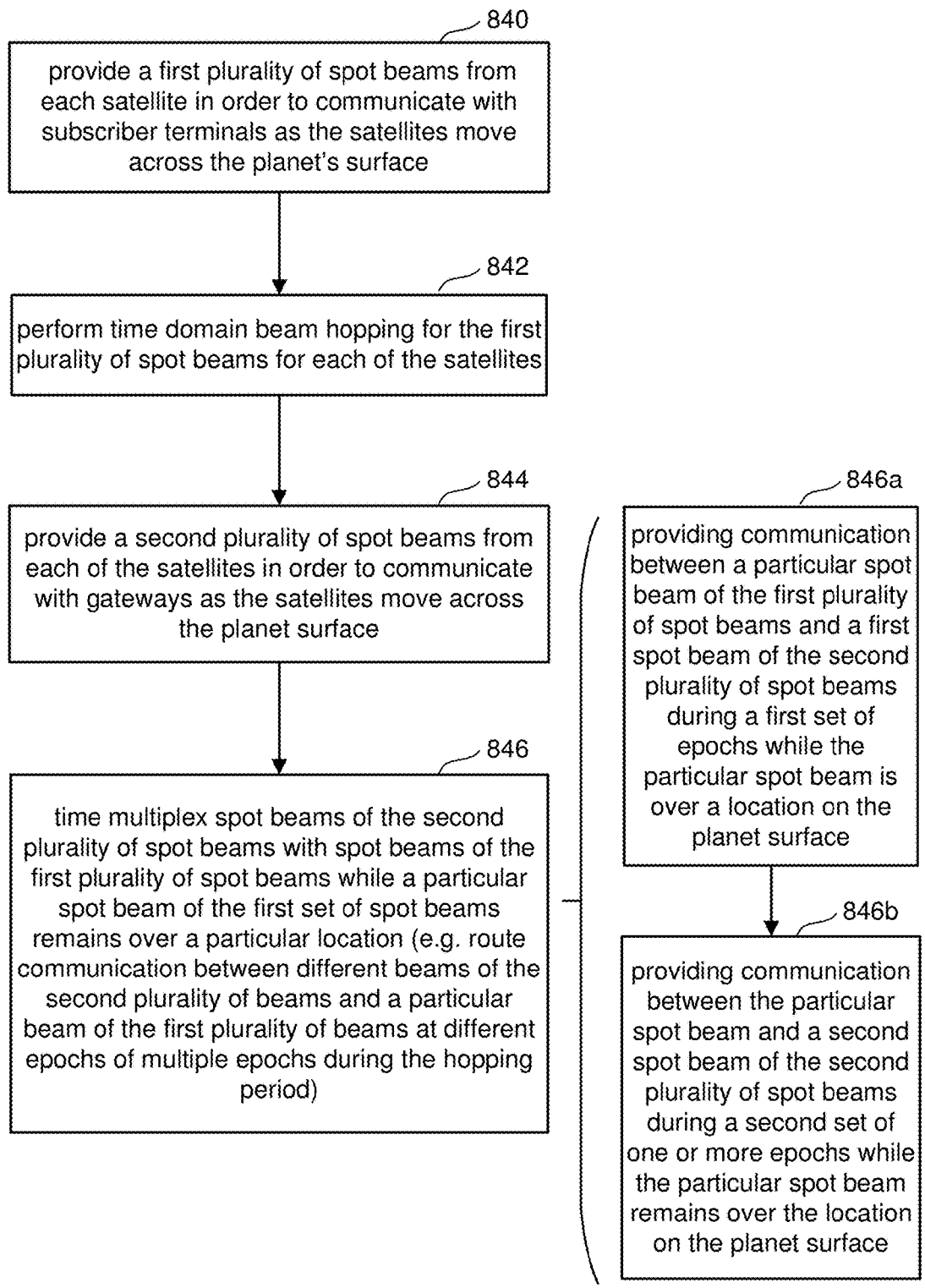
FIG. 31 is a flow chart describing one embodiment of a process for performing time domain beam hopping and time multiplexing gateways.

FIG. 31 is a flowchart describing one embodiment of a process for performing time domain beam hopping with time multiplexing gateways, as depicted in FIG. 30. The process of FIG. 31 is continuously performed by each of satellites 302-322. In step 840, each satellite provides a first plurality of spot beams in order to communicate with subscriber terminals, as the satellites move across the planet surface. In step 842, the satellites will perform time domain beam hopping for the first plurality of spot beams. In step 844, each of the satellites provides a second plurality of spot beams in order to communicate with the gateways, as the satellites move across the planet surface. In step 846, each satellite provides time multiplexing of the spot beams of the second plurality of the spot beams with the spot beams of the first plurality of spot beams while a particular spot beam of the first set of spot beams remains over a particular location (e.g., route communications between different beams of the second plurality of spot beams and a particular beam of the first plurality of spot beams at different epochs of multiple epochs during the hopping period).

FIG. 31 shows one example implementation of step 846 includes steps 846A and 846B. In step 846A, a satellite provides communication between a particular spot beam of the first plurality of spot beams and a first spot beam of the second plurality of spot beams during a first set of epochs while the particular spot beam is over a location on the planet surface (e.g., while illuminating a set of one or more subscriber terminals). In step 846B, the satellite provides communication between the particular spot beam and a second spot beam of the second plurality of spot beams during a second set of one or more epochs while the particular spot beam remains over the location on the planet surface. So during a particular hopping period, a hopping beam can communicate with different feeder beams.

Figure 32:
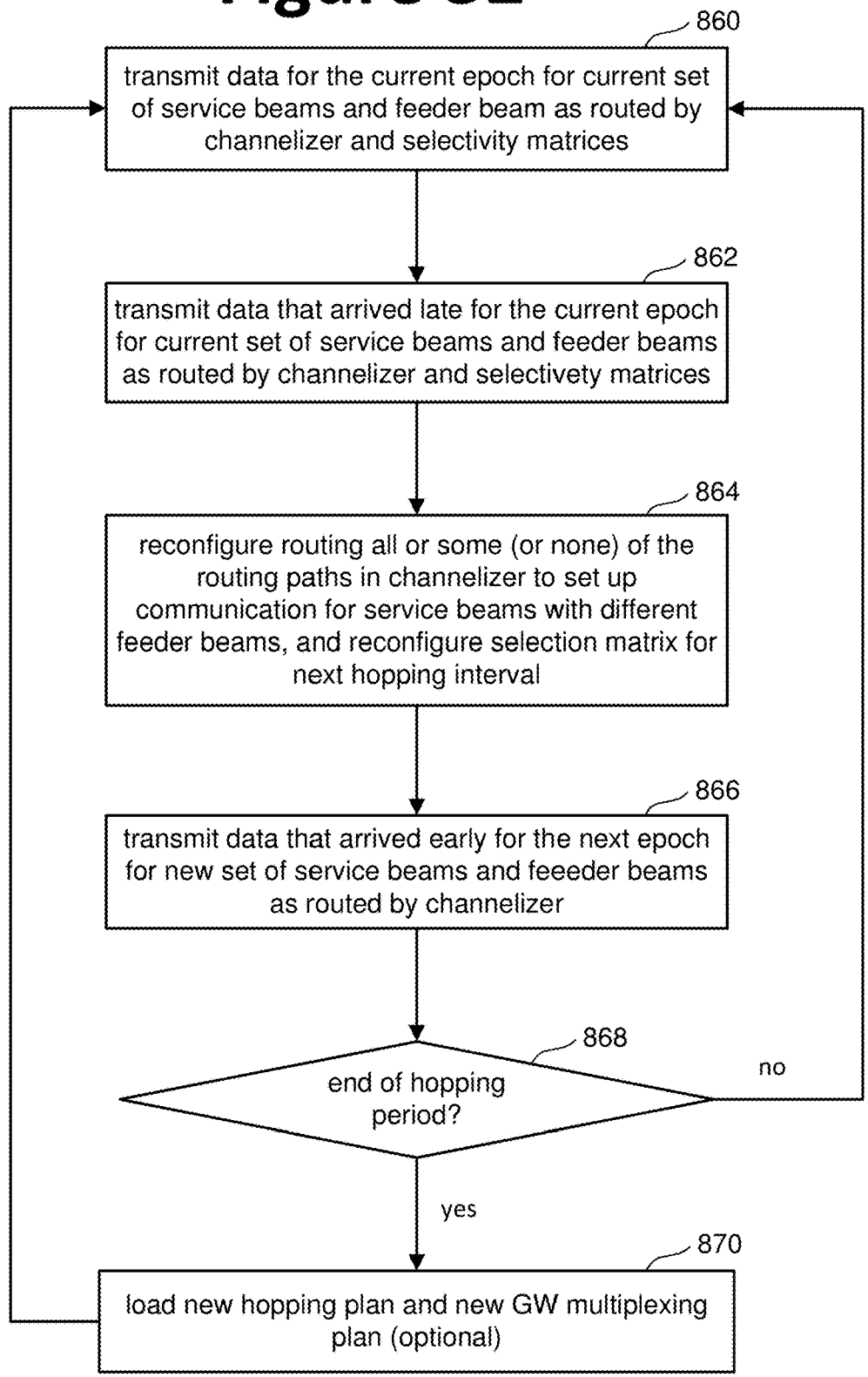
FIG. 32 is a flow chart describing one embodiment of a process for performing time domain beam hopping on a satellite.

FIG. 32 provides a flowchart describing one embodiment of a process for performing time domain beam hopping on a satellite that includes the multiplexing of gateways as described above. In step 860, the satellite transmits data for the current epoch for the current set of service beams and feeder beams, as routed by the channelizer and the various selection matrices. In step 862, the satellite transmits data that arrived late for the current epoch for the current set of service beams and feeder beams as routed by the channelizer and selection matrices. In one embodiment, step 860 corresponds to transmitting the payload of a super-frame and step 862 corresponds to transmitting the late arrival window 724 of a super-frame (see FIG. 26). In step 864 of FIG. 32, satellite reconfigures routing of all or some (or none) of the routing paths of the channelizer and selection matrices to set up communication for service beams with different one or more feeder beams, and reconfigures the selection matrices for the next hopping arrival. In one embodiment, step 864 corresponds to reconfiguration time 722. In step 866, the satellite transmits data that arrives early for the next epoch for the new set of service beams and feeder beams as routed by the channelizer and selection matrices. In one embodiment, step 866 corresponds to early arrival window 726. Step 860-866 correspond to one epoch. If this epoch was not at the end of a hopping period (step 868), then the process will continue back at step 860 to perform transmission of data for the next epoch. However, if this epoch was the last epoch of the hopping period (step 868), then the satellite can load a new hopping plan and new gateway multiplexing plan. In one embodiment, step 870 is optional. After step 870, the process loops back to step 860 and performs the next epoch for the next hopping period.

Allocating Throughput

As discussed above, the hopping plan assigns different epochs to different beams of the hopping group. Thus, the system can allocate different amounts of throughput to each beam of the hopping group, where the amount of throughput allocated corresponds to the number of epochs assigned to the particular beam of the hopping group. In one embodiment, the amount of throughput (the amount of epochs) assigned to each hopping beam is based on demand of users within the coverage area during a given hopping period. In some embodiments, as discussed above, the non-articulated spot beams can be used to service both subscriber terminals and gateways. In that situation, the allocation of throughput to a spot beam can be based on the throughput needs of the gateway in the spot beam as well as the subscriber terminals in the spot beams. Thus, the number of epochs assigned to that spot beam is based on the needs of the gateway and the needs of all the subscriber terminals. Note that the epochs assigned to a beam for a hopping plan can be continuous or non-continuous (spaced apart in time).

Figure 33:
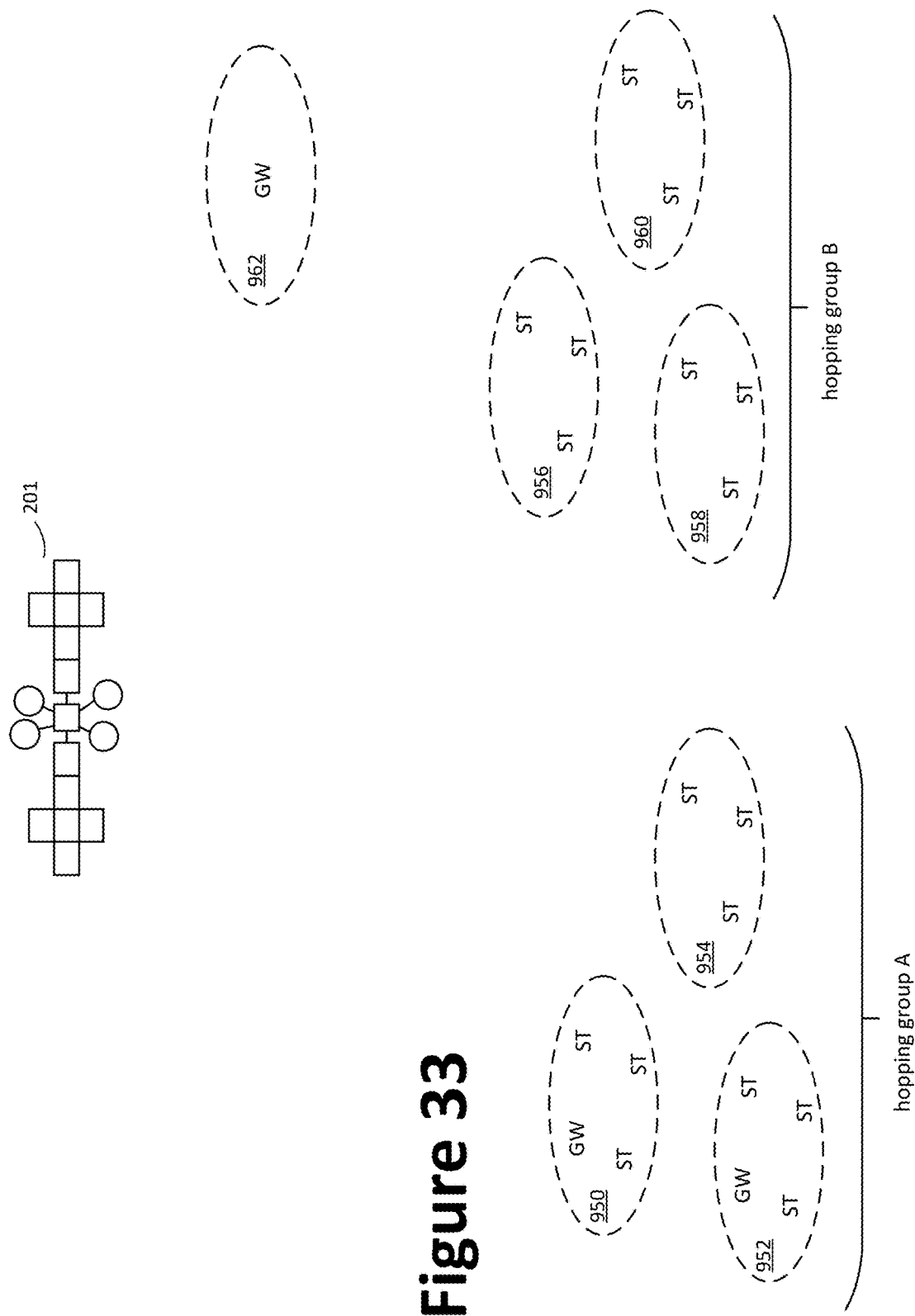
FIG. 33 depicts a portion of a satellite communication system, showing a satellite that is configured to implement a beam hopping plan that during a hopping period provides throughput to a first spot beam for an aggregated time duration based on bandwidth assignments to the first gateway and the first set of subscriber terminals.
Figure 34:
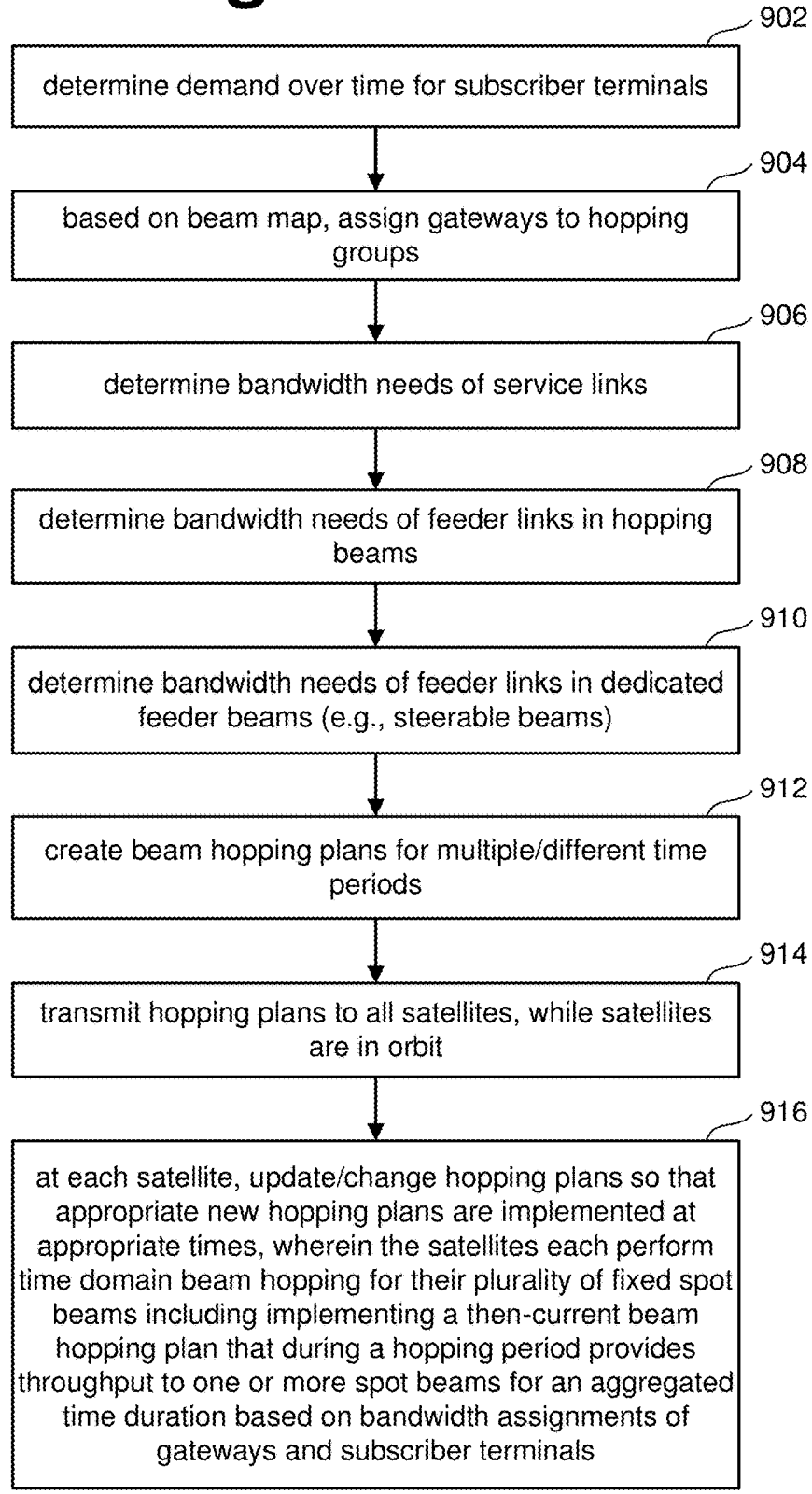
FIG. 34 is a flow chart describing one embodiment of a process for performing time domain beam hopping, taking into account the bandwidth needs of the subscriber terminal and the gateway.

FIG. 34 depicts an embodiment where a satellite is configured to provide a plurality of spot beams adapted for communication using time domain beam hopping to switch throughput among spot beams of a hopping group, where the plurality of spot beams includes at least one spot beam that illuminates and communicates with a gateway and a plurality of subscriber terminals. A satellite is configured to implement a beam hopping plan that during a hopping period provides throughput to the first spot beam for an aggregated time duration (e.g., number of epochs) based on the bandwidth assignments to the gateway and the plurality of subscriber terminals. Note that the performing time domain beamed hopping for the spot beam includes providing throughput to the spot beam for a non-continuous set of multiple epochs that form the aggregated time duration. For example, FIG. 33 shows satellite 201 providing spot beams 950, 952 and 954 in hopping group A and spot beams 956, 958, and 960 in hopping group B. Satellite 201 also provides steerable feeder beam 962. Non-articulated spot beam 950, at this point in time, illuminates and communicates with subscriber terminals ST and a gateway GW. Spot beam 952 also communicates with subscriber terminals ST and a gateway GW. Spot beam 954 communicates only with subscriber terminals ST. Spot beams 956, 958 and 960 only communicate with subscriber terminals ST. Because spot beams 950, 952 and 954 are in a same hopping group, satellite 201 performs time domain beam hopping such that only one of those three spot beams are active at a given time. That means that only one of gateway 950 and 952 can be active at the same time. Thus, the performing time domain beam hopping for the plurality of spot beams includes providing throughput to multiple gateways over time that are geographically separated from each other because they are in separate spot beams. In the embodiment depicted in FIG. 33, the amount of throughput provided to spot beam 950 (e.g., number of epochs assigned) is based on the throughput needs of the subscriber terminals as well as the throughput needs of the gateway in spot beam 950. The amount of throughput provided to spot beam 952 (e.g., the number of epochs assigned in the hopping plan) includes enough throughput (e.g., epochs) to service the subscriber terminals ST in spot beam 952 as well as servicing the gateway GW in spot beam 952. Note that spot beam 954 does not include a gateway. In one embodiment, each of the subscriber terminals in spot beam 954 can communicate with either the gateway in spot beam 950 or the gateway in spot beam 952 by multiplexing between the two gateways, as described above.

FIG. 34 is a flowchart describing one embodiment of a process for operating a satellite that includes performing time domain beam hopping for the plurality of spot beams including implementing a beam hopping plan that during a hopping period provides throughput to first spot beam for an aggregated time duration based on bandwidth assignments of the gateway and subscriber terminals in that spot beam. In step 902, the system will determine demand over time for the subscriber terminals. This can be performed at the network control center. In step 904, based on the beam map, gateways are assigned to various hopping groups. In step 906, the system determines the bandwidth needs of the service links (communication with subscriber terminals) based on the demand over time of the subscriber terminals. In step 908, the bandwidth needs of the feeder links (communication with gateways) in the hopping beams will be determined based on demand of the subscriber terminals in communication with the gateways. In step 910, bandwidth will be determined for the feeder links in dedicated feeder beams (e.g., the steerable beams as opposed to the non-articulated beams that are shared between subscriber terminals and gateways). In step 912, a hopping beam plan will be created for the multiple/different hopping periods. In step 914, the created hopping plans are transmitted to all the satellites while the satellites are in orbit. For example, the network control center will transmit the hopping plans to the satellite when the satellites pass over or by the network control center. These hopping plans are received by the satellites and stored in the memory for the satellites. In step 916, each satellite will update or otherwise change its current hopping plan so that a new hopping plan is implemented at the appropriate time or times. The satellites each perform time domain beam hopping of the plurality of non-articulated spot beams including implementing a then-current beam hopping plan that during a hopping period provides throughput to one or more spot beams for an aggregated time duration based on the bandwidth assignments of gateways and subscriber terminals.

Figure 35:
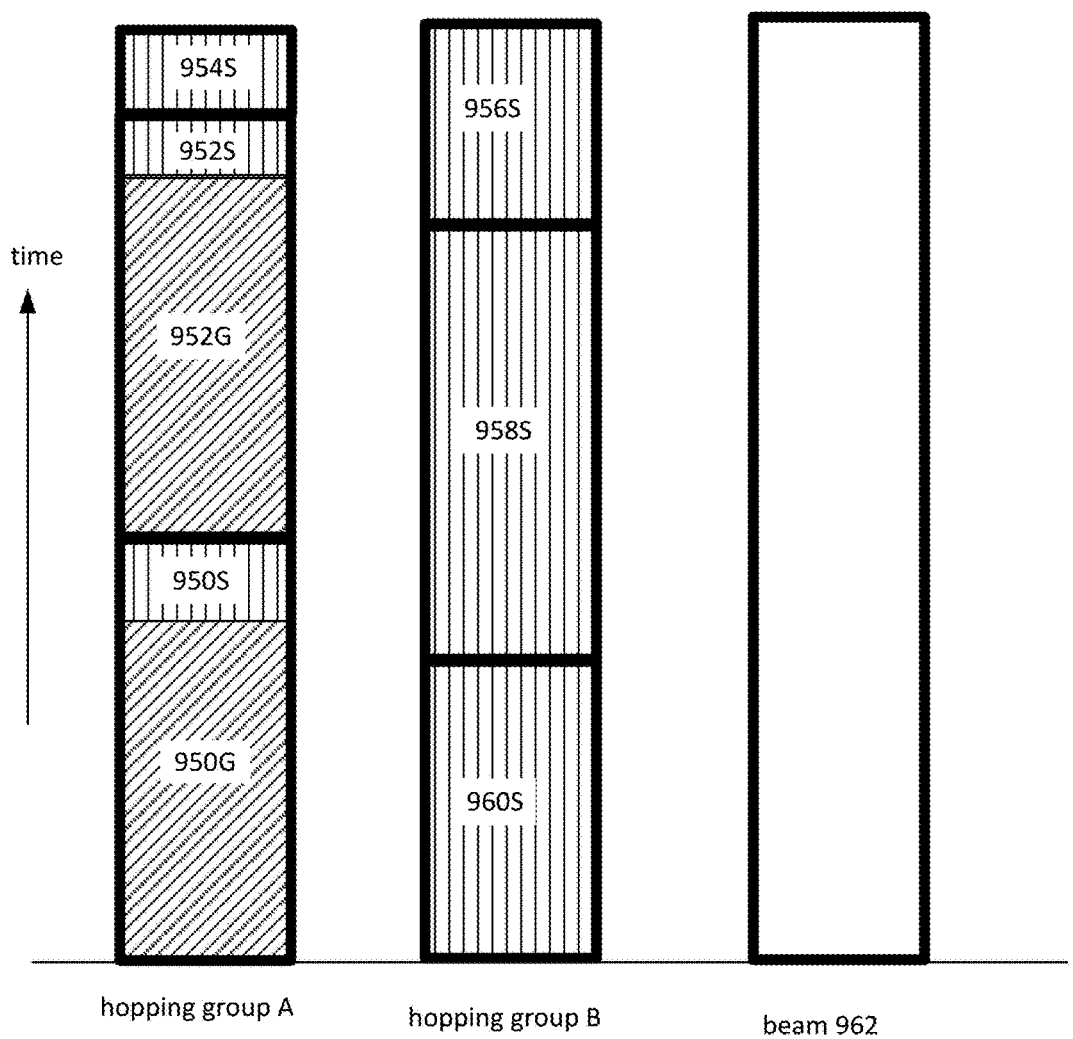
FIG. 35 is a chart describing one example of sharing capacity by dividing up epochs or capacity units based on pro-rate bandwidth needs.

FIG. 35 is a chart describing one example of sharing capacity by dividing up epochs or CUs in the epoch based on pro rata throughput needs. For example, FIG. 35 shows the dividing up of CUs or epochs for hopping group A, hopping group B and beam 962 of FIG. 33. As beam 962 only includes a single gateway, all time is available to that gateway. In some embodiments, there can be multiple gateways in spot beam 962 so that the throughput of spot beam 962 must be divided among the multiple gateways. Hopping group B includes three beams that only includes subscriber terminals. The amount of throughput (or epochs) provided to beam 956 is represented in FIG. 35 as 956S. The amount of throughput provided to beam 958 is represented as 958S. The amount of throughput provided to spot beam 960 is represented as 960S in FIG. 35. As can be seen, the amount of throughput or number of epochs is not divided equally among the three spot beams. In FIG. 35, the amount of throughput or epochs provided to spot beam 954 (that does not include a gateway) is represented by box 954S. The amount of throughput or epochs provided to spot beam 950 is represented by two components: one component 950S accounting for the throughput assignment to subscriber terminals and a second component 950G representing the assignment of throughput to the gateway in spot beam 950. Since, in beam 950, the gateway may use different frequency than the users the first and second component can exist simultaneously. The amount of throughput or epochs provided to spot beam 952 includes two components: 952S represents the amount of throughput assignment accounted for the subscriber terminals and 952G represents the assignment of bandwidth for gateway. Since, in beam 952, the gateway may use different frequency than the users the first and second component can exist simultaneously.

As mentioned above, in some embodiments there can be multiple gateways in a gateway beam. These multiple gateways can support (ie communicate with) different subscriber terminal sets in the same one or more spot beams that perform time domain beam hopping or support (ie communicate with) different subscriber terminal sets in the different one or more spot beams that perform time domain beam hopping. In another alternative, these multiple gateways can support (ie communicate with) the same subscriber terminals. The multiple gateways in the same spot beam will use different epochs to communicate with the subscriber terminals.

In some embodiments, a satellite has two or multiple spot beams in a hopping group that illuminate and communicate with gateways and subscriber terminals, where the gateways are geographically separated from each other. For the multiple spot beams that illuminate and communicate with gateways and subscriber terminals, they are all individually assigned frequency throughput for a total time duration based on throughput assignments of the respective gateways and subscriber terminals. Therefore, the satellite performs time domain beam hopping, including providing throughput to multiple gateways over time that are geographically separated from each other.

In regard to the constellation of satellites 302-322, the providing a plurality of spot beams and performing time domain beam hopping for the plurality of spot beams are performed separately and concurrently by multiple satellites using a same beam map and traveling along a same orbital path.

In one embodiment, the satellite is configured to switch throughput at a number of epochs based on the uplink and downlink demand from user terminals in the hopping group beam members. In another embodiment, the satellite is configured to switch throughput at a number of epochs based on the uplink and downlink demand from user terminals and gateways in the hopping group beam members.

Beam to Beam Handover

As each of satellites 302-322 move in orbit, their Fields of Regard move, causing each of the spot beams' coverage areas to move. As a subscriber terminal reaches the edge of a spot beam it must be handed over to the next spot beam on the same satellite. Typically, the handover will be from a spot beam in a first hopping group to a spot beam in a different hopping group. This may cause the updating of hopping plans to account for the subscriber terminal(s) changing hopping groups. When the subscriber terminal reaches the edge of a spot beam at the edge of the Field of Regard, then the subscriber terminal is handed over to the next satellite.

Figure 36:
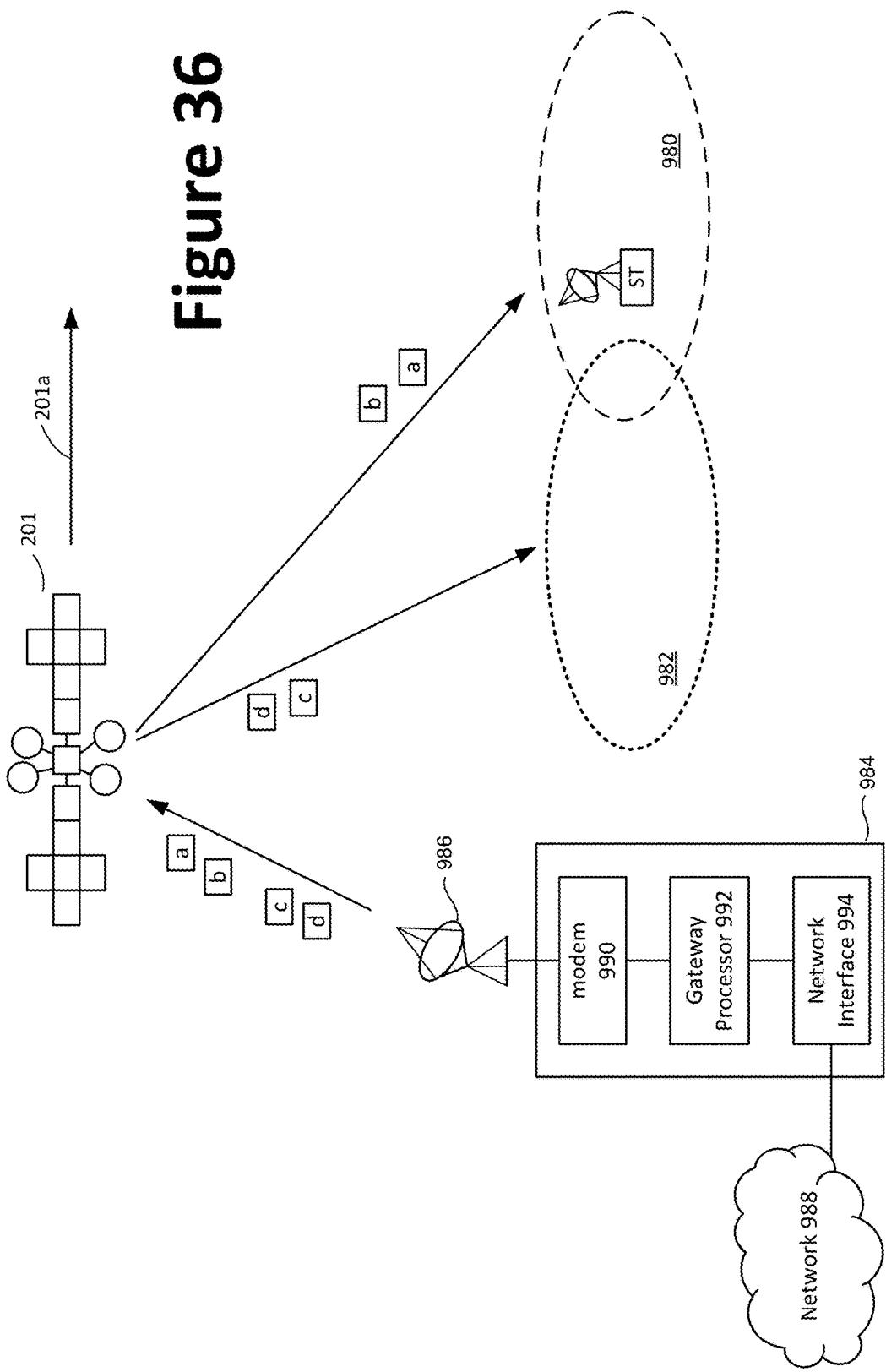
FIG. 36 depicts a portion of a satellite communication system, showing a handover of a subscriber terminal between spot beams on a same satellite.

FIG. 36 graphically depicts a portion of the satellite communication system, showing a handover of subscriber terminal between spot beams of the same satellite. For example, FIG. 36 shows satellite 201 traveling in the orbital direction 201A providing spot beam 980 and spot beam 982. As satellite 201 moves in direction 201A, subscriber terminal ST will move from spot beam 980 to spot beam 982; therefore, a handoff must occur. FIG. 36 shows spot beam 201 in communication with gateway 984 (which includes antenna 986). In one embodiment, gateway 984 includes modem 990 connected to antenna 986, network interface 994 connected to network 988 (which may be the Internet or other network), and gateway processor 992 which is connected to modem 990 and network interface 994. In one embodiment, gateway processor 992 can be a computing device that includes one or more microprocessors, memory, nonvolatile storage, etc.

Because subscriber terminal ST is being handed over from spot beam 980 to spot beam 982, gateway processor 992, which receives messages from network 988 to be sent to subscribe terminal ST, must communicate those messages via the appropriate spot beam. For example, FIG. 36 shows gateway 984 communicating messages A, B, C and D. Because the timing of the transmission of the messages (in light of the hopping plan), message A and message B will be transmitted from the satellite 201 to subscribe terminal ST while subscriber ST is in spot beam 980. Messages C and message D will be transmitted from satellite 901 to subscribe terminal ST while subscribe terminal ST is in spot beam 982. Note that spot beam 980 and 982 are among the non-articulated spot beams that implement time domain beam hopping. Furthermore, spot beam 980 has a different frequency range than spot beam 982, but both spot beams use the same polarization. In other hopping arrangements, spot beams 980 and 982 can have the same frequency range or overlapping frequency ranges.

Figure 37:
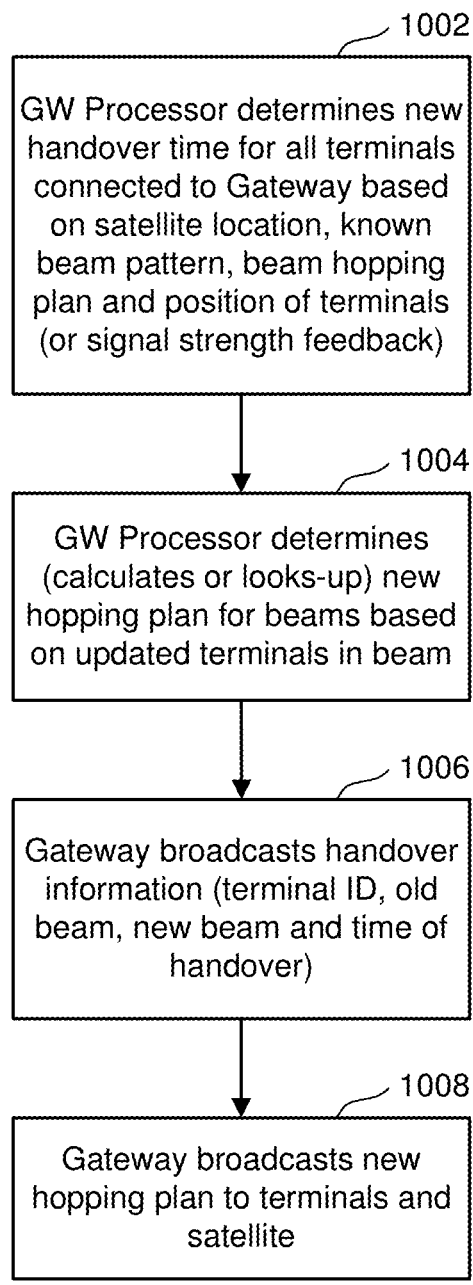
FIG. 37 is a flow chart describing one embodiment of a gateway process for performing a handover of a subscriber terminal between spot beams on a same satellite.

FIG. 37 is a flow chart describing one embodiment of a process performed by the gateway for performing handover of subscriber terminal between spot beams on the same satellite. In step 1002, gateway processor 992 determines new handover times for all terminals connected to that particular gateway based on the satellite's location, the known beam pattern and the known beam hopping plan(s) as well as the position of the terminals (or feedback of the signal strength received by the subscriber terminals from the satellite). In step 1004, gateway processor 992 determines (calculates or looks up in a database) new hopping plan(s) for the spot beams based on updated terminals and the beams. For example, when subscriber terminal ST transitions from beam 980 to beam 982 that may affect the hopping plan due to a change in demand. In step 1006, gateway 984 will broadcast the handover information to all the terminals in all the spot beams communicating with the gateway 984. The handover information includes a set of records, with each record including a terminal ID for the subscriber terminal, old spot beam, new spot beam, and time of handover. Other information could also be provided. In step 1008, the gateway broadcast the new hopping plan to the terminals and the satellite. In one embodiment, the satellite already has the hopping plan and does not have it communicated from the gateway.

Figure 38:
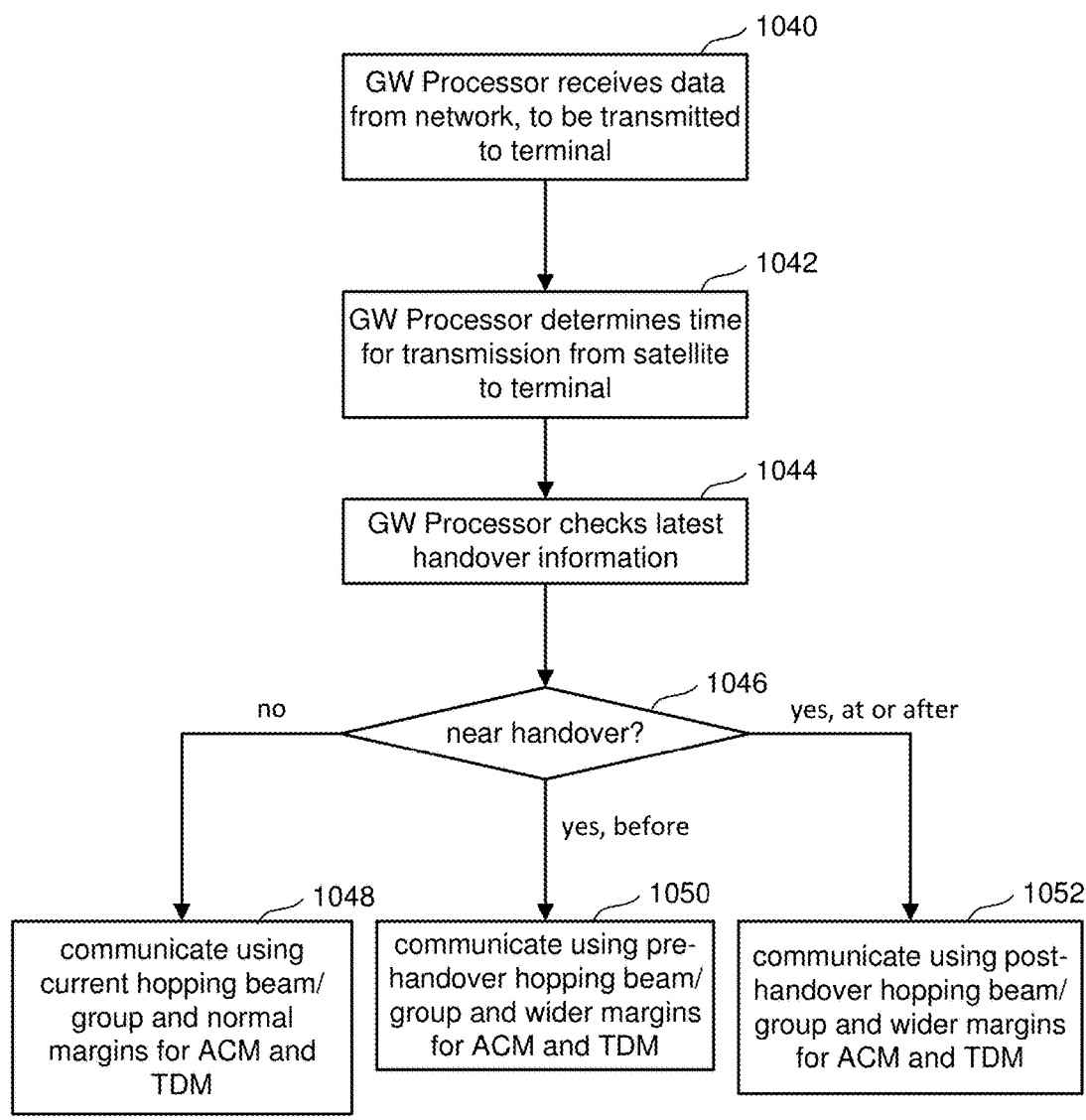
FIG. 38 is a flow chart describing one embodiment of a gateway process for performing a handover of a subscriber terminal between spot beams on a same satellite.

FIG. 38 is a flow chart describing one embodiment of a process performed by the gateway for performing a handover of the subscriber terminal, at the time of hand off. In step 1040, gateway processor 992 receives data from network 988, which is to be transmitted to subscriber terminal ST. In step 1042, gateway processor 992 determines the time for transmission of that received data from the satellite 201 to subscriber terminal ST. In step 1044, gateway processor 992 checks the latest handover information (see step 1006 in FIG. 37). In step 1046, gateway processor 992 determines whether the time that the satellite will be transmitting the data to the subscriber terminal is near handover time. If that time is not near the handover time, then in step 1048 gateway processor 992 communicates the received data using the current hopping plan and the current hopping group as well as normal margins for Adaptive Coding and Modulation (ACM) and Time Domain Beam Hopping (TDM). In one embodiment, the margins for TDM relate to the size or timing of the late arrival window and early arrival window. If the time for transmission form the satellite is near the handover time but before the handover time, then step 1050 gateway processor 992 communicates the data to the terminal using the pre-handover hopping beam, of the pre-handover hopping group and wider margins (if needed) for ACM and TDM. If the time for transmission from the satellite to the terminal is to be after the handover time, then gateway processor 992 communicates the data using the post-handover hopping beam of the post-handover hopping group and wider margins (if needed) for ACM and TDM.

Figure 39:
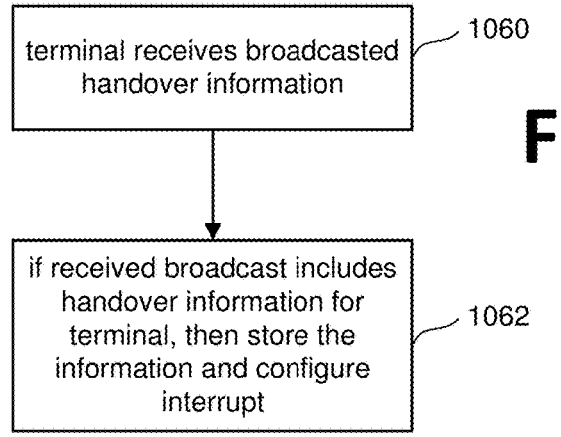
FIG. 39 is a flow chart describing one embodiment of a subscriber terminal process for performing a handover of the subscriber terminal between spot beams on a same satellite.

FIG. 39 is a flow chart describing one embodiment of a processor performed by a subscriber terminal in regarding to handing over the subscriber terminal between spot beams. The process FIG. 39 is performed in response to the gateway performing the processor FIG. 37. In step 1060 FIG. 39, the terminal receives broadcasted handover information (see step 1006 of FIG. 37). In step 1062, if the received broadcast includes handover information for that terminal, then that terminal stores the information and will configure it during an epoch when the beam is not active or during the payload transition time. Note that the processes of FIGS. 37 and 39 are performed continuously.

Figure 40:
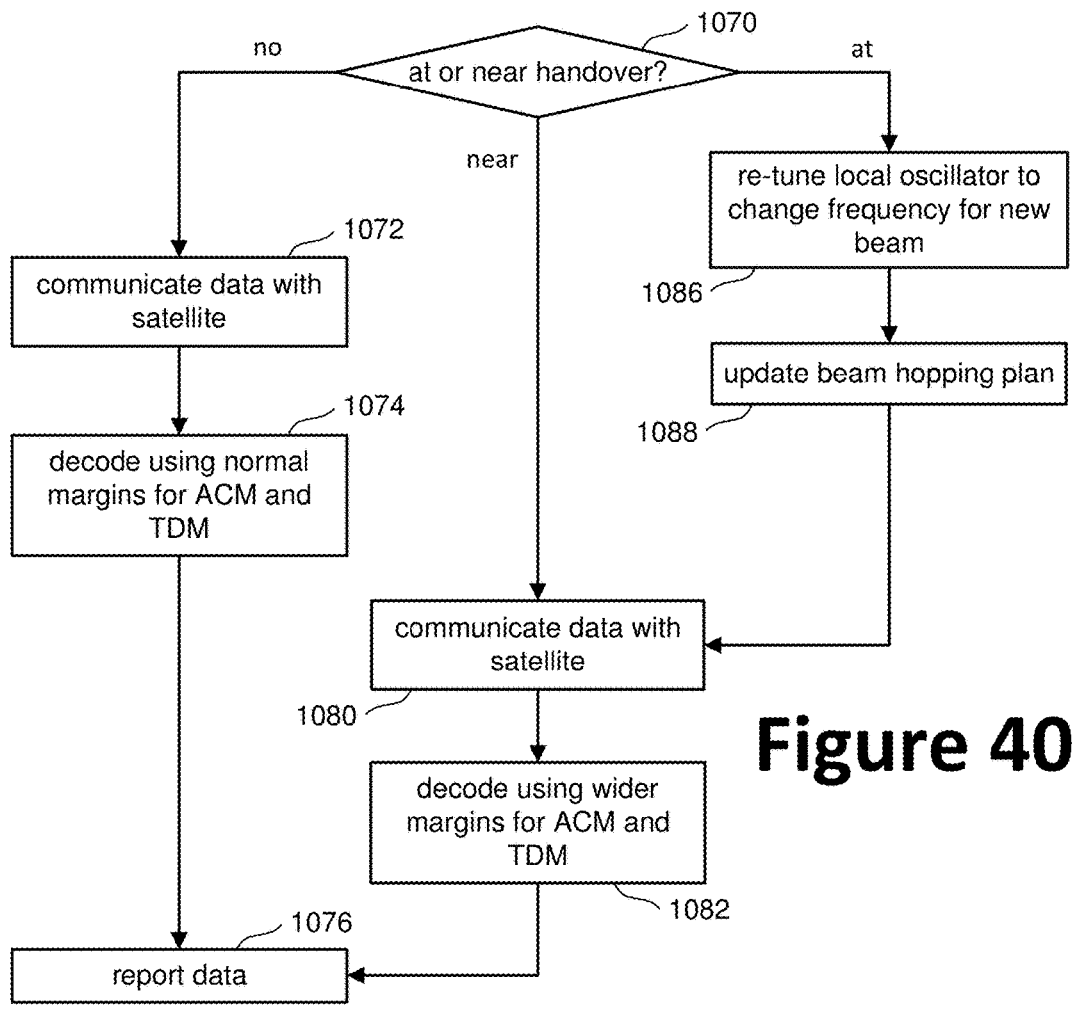
FIG. 40 is a flow chart describing one embodiment of a subscriber terminal process for performing a handover of the subscriber terminal between spot beams on a same satellite.

FIG. 40 is a flow chart describing one embodiment performed by a subscriber terminal at the time for a handover between spot beams. It was noted that in step 1062, an interrupt is configured. That interrupt will trigger the performance of the process of FIG. 40. In step 1070, it is determined whether the terminal is at or near a time of a handover. If not, and the terminal receives data in step 1072 (in response to step 1048 of FIG. 38), then the terminal decodes that data in step 1074 using normal margins for ACM and TDM. The data is reported to a client in step 1076. A client for a subscriber terminal can be a computing device, smart appliance, etc. If, in step 1070, is determined that the terminal is near a handover time, but before the handover time, then in step 1080, the terminal will receive data from the satellite and decode that data in step 1082 using the wider margins for ACM and TDM. The data will then be reported in step 1076. If the terminal is at a time for handover then in step 1086 the terminal retunes its local oscillator to change frequencies to the master frequency for the new spot beam. That is, looking back at FIG. 36, subscriber terminal ST will retune its local oscillator from the frequency for spot beam 980 to the frequency for spot beam 982. In step 1088, the hopping plan will be updated. In some embodiments, the terminal keeps tracking of the hopping plan. In other embodiments, the terminal will not keep track of the hopping plan. In one embodiment, a subscriber terminal will include one antenna and one oscillator. In other embodiments, the subscriber terminal includes two antennas and two oscillators to alternate using terminals and oscillators between spot beams.

Figure 41:
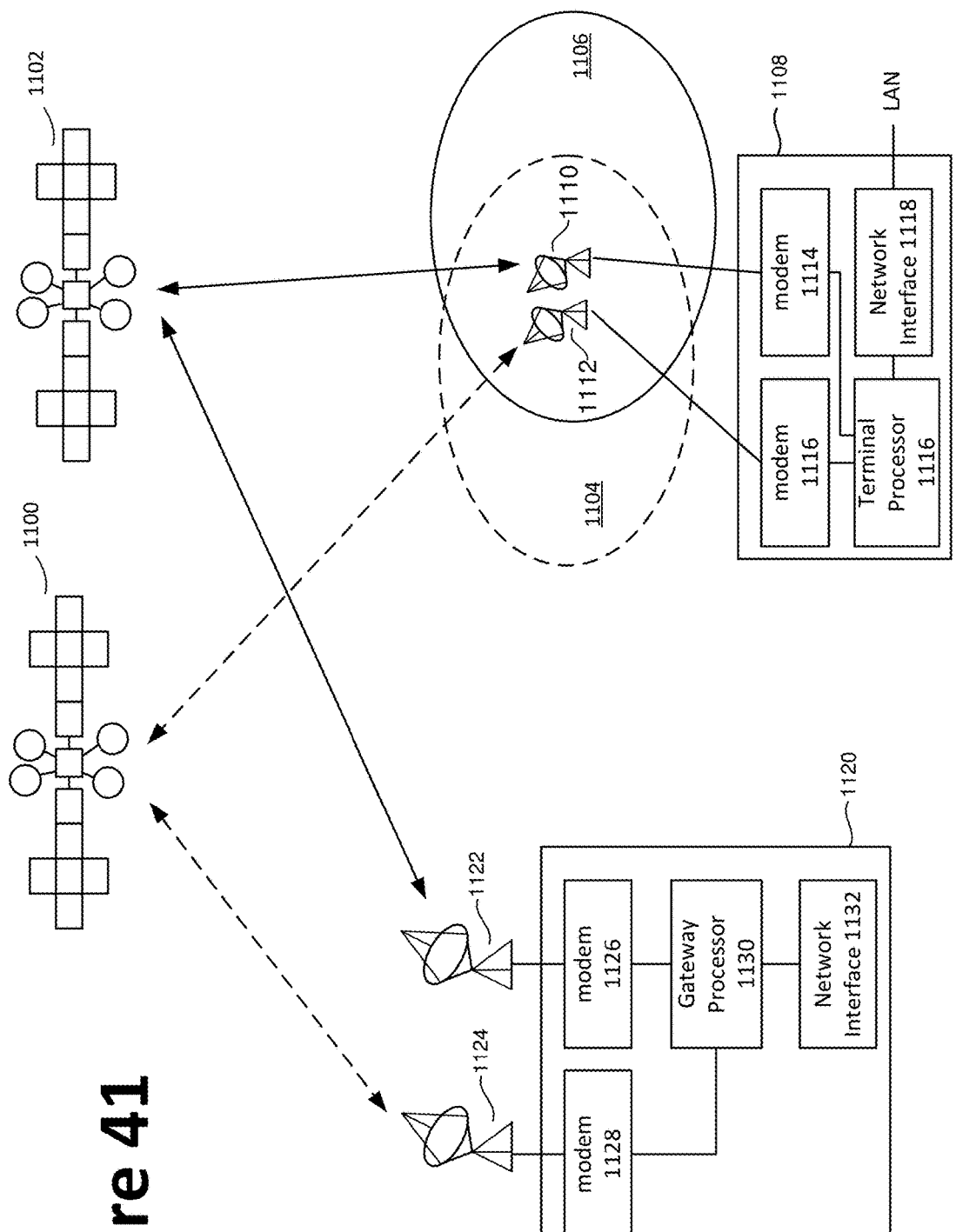
FIG. 41 depicts a portion of a satellite communication system, showing a handover of a subscriber terminal between spot beams of different satellites.

FIG. 41 depicts a portion of a satellite communication system showing a handover of a subscriber terminal between spot beams of different satellites. For example, FIG. 41 shows satellite 1100 and satellite 1102, which can be any pair adjacent satellites of satellite 302-322. Satellite 1102 provides spot beam 1106. Satellite 1100 provides spot beam 1104. The subscriber terminal 1108 includes two antennas 1110 and 1112, two modems 1114 in communication with antenna 1110 and modem 1116 in communication with antenna 1112, terminal processor 1116 and network interface 1118 which is connected to a local area network (LAN). Terminal processor 1116 can be any computing device suitable that includes a processor, memory, nonvolatile memory and appropriate communication interfaces.

In FIG. 41, subscriber terminal 1108 is positioned in a region that represents where spot beam 1106 overlaps with spot beam 1104. Gateway 1120 is communication with both satellites 1100 and 1102. Gateway 1120 includes a first antenna 1124 for communicating with satellite 1100. Gateway 1120 includes antenna 1122 for communicating with satellite 1102. Gateway 1120 includes a first modem 1128 connected to antenna 1124 to second modem 1126 connected to antenna 1122. Gateway 1128 includes gateway processor 1130 connected to both modem 1126 and 1128. Gateway processor 1130 is also connected to network interface 1132, which can communicate with the Internet or other network. Because gateway 1120 is in communication with both satellites, and utilizes one processor 1130, when the subscriber terminal hands over from satellite 1102 to satellite 1100 the communication between subscriber terminal 1108 and gateway 1128 will not be broken. So as satellites 1102 and 1100 move west to east, causing subscriber terminal 1108 to transition from spot beam 1106 on satellite 1102 to spot beam 1104 on satellite 1100, the communication path between subscriber terminal 1108 and gateway 1128 will change from going via satellite 1102 to going via satellite 1100. Gateway 1120 will perform the process of FIG. 37 described above for identifying and communicating the handover information.

Figure 42:
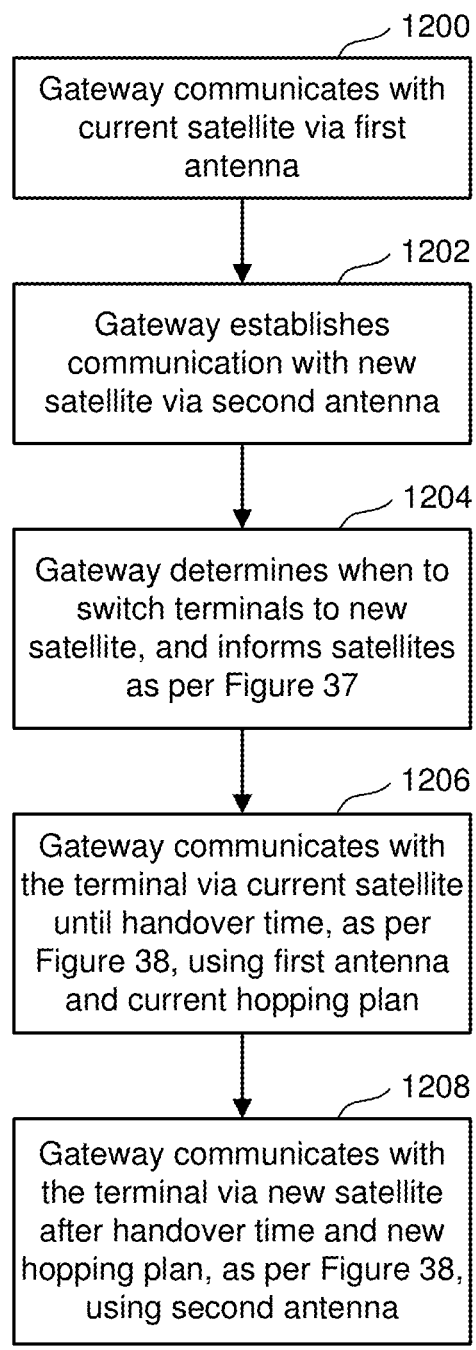
FIG. 42 is a flow chart describing one embodiment of a gateway process for performing a handover of a subscriber terminal between spot beams on different satellites.
Figure 43:
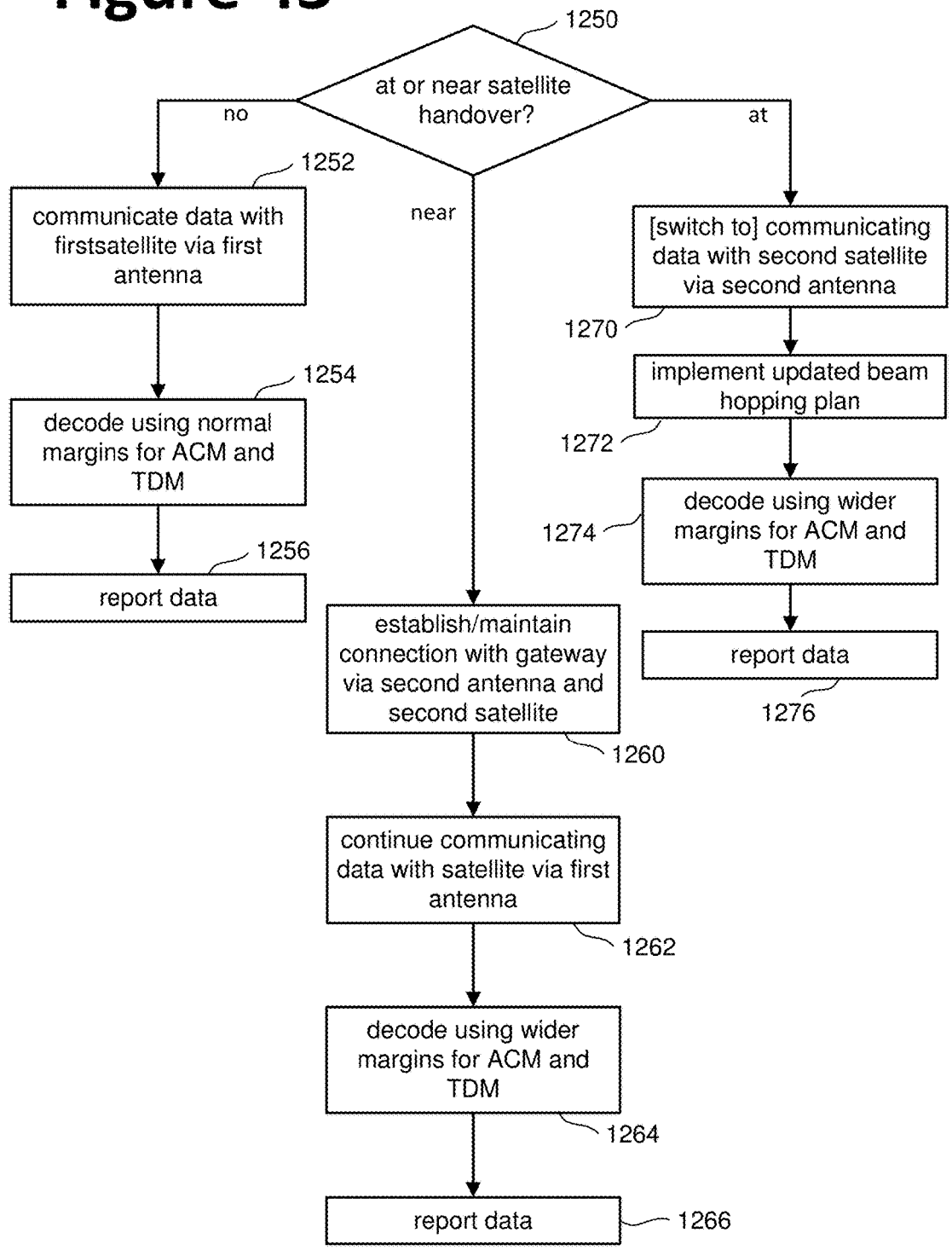
FIG. 43 is a flow chart describing one embodiment of a subscriber terminal process for performing a handover of the subscriber terminal between spot beams on different satellites.

Additionally, gateway will perform the process depicted in FIG. 42 for handing over a subscriber terminal between spot beams of different satellites. In step 1200, gateway processor 1130 communicates with the current satellite via first antenna (e.g., antenna 1122). In step 1202, gateway 1120 establishes communication with the new satellite via a second antenna 1124. In step 1204, the gateway determines when the switch terminals to the new satellite based on the handover information described above. Gateway 1120 will inform the satellites and the subscriber terminals as per the process of FIG. 37. In another embodiment, the satellites are preprogrammed as to when to switch. In another embodiment, the gateway informs the network control center. In step 1206, the gateway communicates with the terminal via the current satellite (e.g., satellite 1102) until the handover time, performing the process of FIG. 38 using the first antenna (antenna 1122) and the current beam hopping plan. In step 1208, the gateway communicates with the terminal via the new satellite (satellite 1100) after the handover time using the new hopping plan, performing the process of FIG. 30 using the second antenna (e.g., antenna 1124). The subscriber terminal will perform the process of FIG. 39, as described above, to receive the new handover information. Additionally, the subscriber terminals will perform the process of FIG. 43 at the time of handover. In step 1250, the gateway decides whether the subscriber terminal is at or near the satellite handover time. If the subscriber terminal is not at or near a satellite handover time, then step 1252, data will be communicated with the satellite via its first antenna (e.g., antenna 1110). In step 1254, the gateway will decode received data using normal margins for ACM and TDM. In step 1256, received data will be reported to the client. Note that data that is transmitted will not need to be decoded and reported, but rather would be encoded.

If, in step 1250, it is determine that the subscriber terminal is near handover time, then at step 1260, the terminal will establish or maintain a connection with the gateway via the second antenna and second satellite. In step 1262, the subscriber terminal will continue communicating data with the satellite via the first antenna. In step 1264, received data will be decoded by the gateway using wider margins for ACM and TDM. In step 1266, data received will be reported. Data that is being transmitted will be encoded using wider margins for ACM and TDM, if ACM is being used on the up link for the return path.

If in step 1250, it is determined that the subscriber terminal is at the handover time, then step 1270, the subscriber terminal switch to communicating data with the second or new satellite via the second antenna. In step 1272, a new hopping plan will be implemented. In one embodiment, the subscriber terminal does not know what the hopping plan is and just reacts to data from the gateway and, therefore, will not be aware of the new hopping plan. In step 1274, data received will be decoded using wider margin for ACM and TDM. Data transmitted will use wider margins for ACM, if ACM is being used. Data received will be reported in step 1276.

The above description of beam to beam handovers includes communicating, at a ground base terminal, with a non-geostationary satellite constellation using a first spot beam of the non-geostationary satellite constellation and the first beam hopping plan; and the ground based terminal changing the communicating with the non-geostationary satellite constellation to use a second spot beam of the non-geostationary satellite constellation in a second hopping beam.

Handover for Multiple Gateways

As described above, some of the non-articulated spot beams 1-200 for each of the satellites 302-322 can be used to service subscriber terminals and gateways. In some embodiments, subscriber terminals in the non-articulated spot beams are configured to communicate with gateways in the non-articulated spot beams. In such embodiments, the group of subscriber terminals communicating with the gateway and the non-articulated beams will need to communicate with at least two gateways. In one implementation, the two gateways communicating with the group of subscriber terminals are in the same country as the subscriber terminals in order to comply with local laws restricting communicating across borders. In other embodiments, the two gateways can be in different countries.

Figure 44:
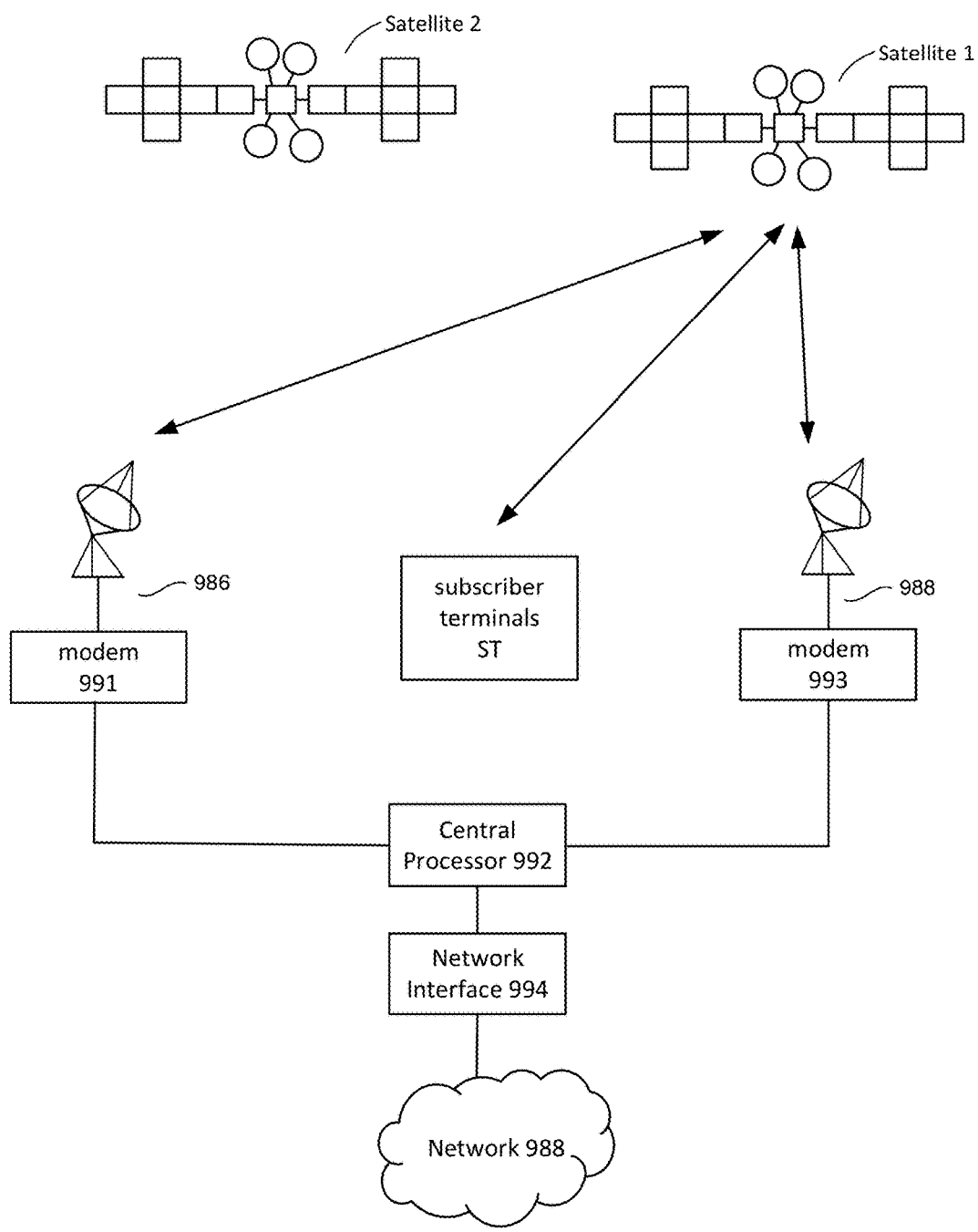
FIG. 44 depicts a portion of a satellite communication system, showing two cooperating gateways operating within hopping beams and communicating with hopping beams.

FIG. 44 shows an example configuration where two gateways 986 and 988 communicate and service subscriber terminal ST via Satellite 1. Each of the gateways has its own antenna and its own modem. For example, gateway 986 includes modem 991 and gateway 988 includes modem 993. Neither gateway includes a gateway processor. Rather, both modems 991 and 993 communicate with a central processor 992 which is in communication with the network interface 984 for communicating on network 988 (e.g., Internet). By sharing a central processor 992, streams of communication between the subscriber terminal ST and entities on network 988 may be maintained in a manner with no apparent interruption. In one embodiment, gateway 986 is located at the western edge of the subscriber terminals and gateway 988 is located at the eastern edge of the subscriber terminals. Therefore, these gateways can be referred to as the eastern gateway and the western gateway. The reason for locating the gateways on the western edge and the eastern edge is because the satellites 302-322 move from west to east and locating the gateways at the western edge and the eastern edge (separated in the orbital direction) allows for efficient handovers. In other embodiments where the satellites travel at a different orbital direction, the gateways will be located at different locations that are separated from each other by different orbital directions. That is, the first gateway will be a first location, the second gateway is at a second location, and the second location is separated from the first location in the orbital direction.

Figure 46A:
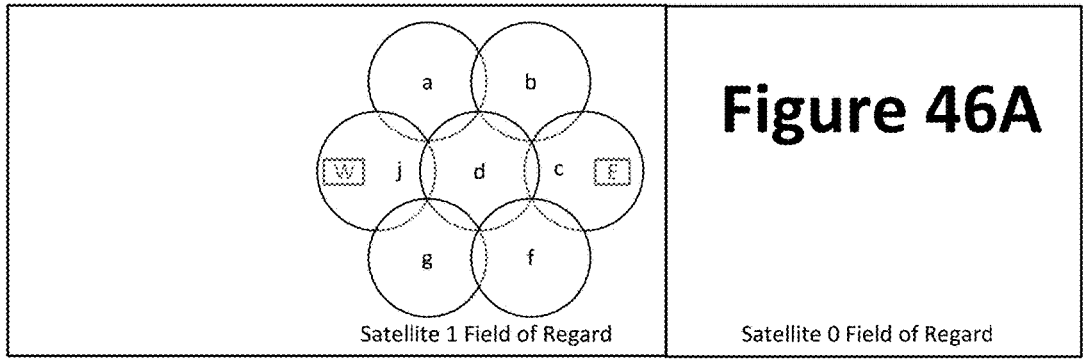
FIGS. 46A, 46B, 46C, and 46D depict Fields of Regards of two satellites moving over coverage areas.

FIG. 45 is a flow chart describing one embodiment of a process for performing the handover between satellites, with the use of eastern and western gateways, where the gateways are operating within and communicating with spot beams implementing time domain beam hopping. Note that rather than using eastern and western gateways, the same process can be used for two different gateways at two different locations separated in the orbital direction. In step 1350, all or a subset of subscriber terminals communicate with the eastern gateway via satellite 1 as the non-articulated spot beam implementing time domain beam hopping traverse the region where the subscriber terminals are located. FIG. 46A shows the time when step 1350 is performed. Field of Regard for satellite 1 is completely covering spot beams A, B, C, D, J, F, and G, which are the spot beams for which the subscriber terminals are located. At the eastern edge of spot beam C is eastern gateway E. The western edge of spot beam J is western gateway W.

Figure 46B:
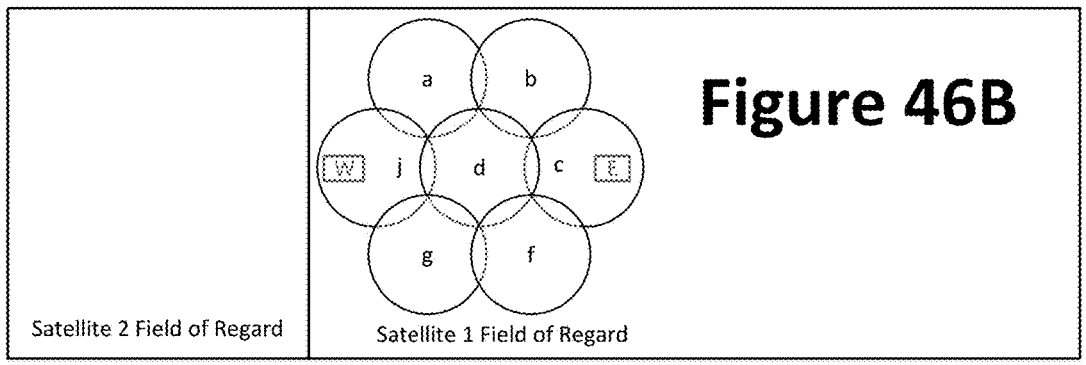
Figure 46C:
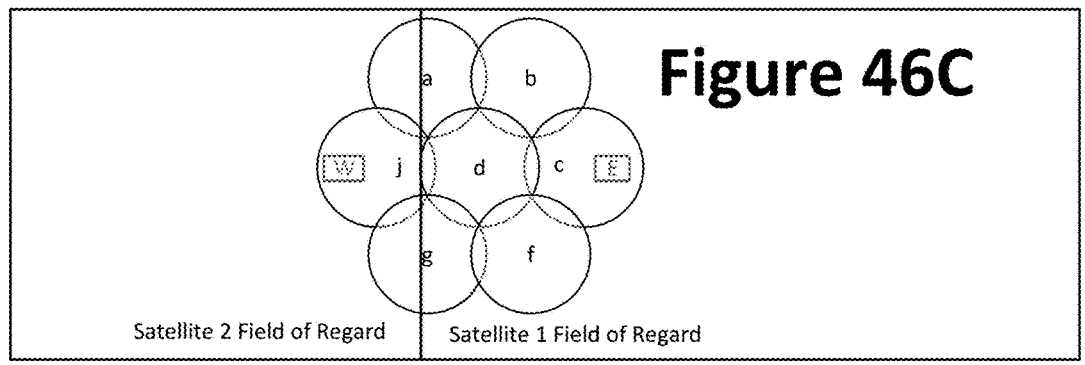

In step 1354, western gateway W hands over to satellite 2, as soon as possible (or as close to as soon as possible). For example, FIG. 46B shows that the Field of Regard for Satellite 2 is very close to spot beam J, close enough to allow western gateway W to connect to Satellite 2.

In step 1356, as the Field of Regard for Satellite 2 passes over the spot beams, subscriber terminals in the spot beams under the Field of Regard for Satellite 2 begin to connect to Satellite 2. As discussed above, the subscriber terminals will be told ahead of time of the handover information. Thus, when subscriber terminals handover to Satellite 2, they will begin to connect to and communicate with the western gateway via Satellite 2. For example, FIG. 46J shows a portion of the Field of Regard for Satellite 2 over spot beams A, J and G, and the Field of Regard for Satellite 1 over spot beams A, G, D, B, C and F. Subscriber terminals in spot beams A, J and G will have connected to Satellite 2 and began communicating with gateway W via Satellite 2.

Figure 46D:
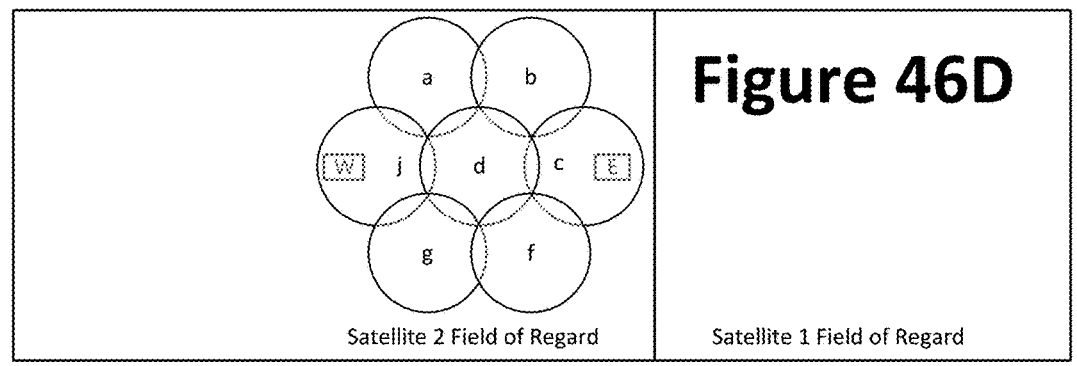

After all the terminals in spot beams A, B, C, D, J, F, and G have handed over to Satellite 2 and are in communicating with western gateway, the eastern gateway E will handover to Satellite 2. For example, FIG. 46D shows all five spot beams within the Field of Regard for Satellite 2; therefore, all the subscriber terminals have been handed over and connected to Satellite 2 and are in communication with the western gateway via Satellite 2. In step 1360, in response of instructions from the central processor 992, all of the subscriber terminals will then switch to communicating with the eastern gateway E via Satellite 2. The process of FIG. 45 will then be performed again with Satellite 3 (not depicted), then with satellite 4 (not depicted), etc. In this manner, the plurality of subscriber terminals are configurable to communicate with central processor 992 via the non-geostationary satellites via the first eastern gateway or the western gateway. The central processor 992 is configured to assign each subscriber terminal to communicate with the central processor 992 via the eastern gateway or the western gateway based on location of the appropriate non-geostationary satellite.

In some embodiments, the eastern gateway (and some subscriber terminals) and the western gateway (and some subscriber terminals) are in different non-articulated spot beams that implement time domain beam hopping and that are in the same or different hopping groups performing the same or different hopping plans.

Steerable Gateway Beams

Figure 47:
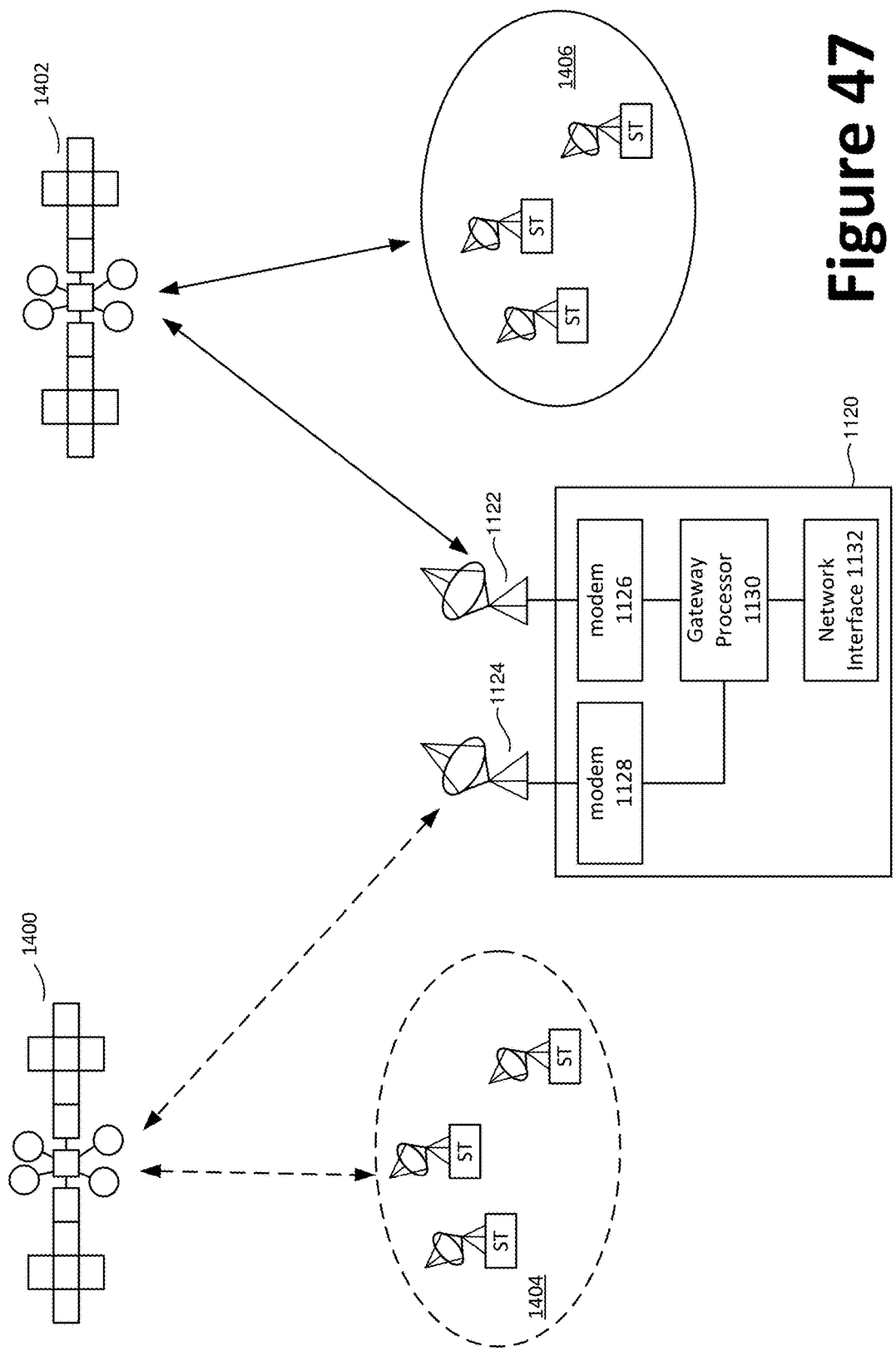
FIG. 47 depicts a portion of a satellite communication system, showing a gateway connecting to steerable spot beams of two satellites for performing a handover.

As discussed above with respect to FIG. 2, each of the satellites 302-322 include eight steerable 4.2 degree gateway beams and six steerable 2.8 degree gateway/high capacity subscriber terminal beams. Additionally, each of the non-geostationary satellites of the constellations configured to provide a first plurality of two hundred non-articulated spot beams that comprise the Field of Regard. The steerable spot beams can be steered to establish communication with a gateway outside of and in front of the Field of Regard and maintain that communication while the satellite and the Field of Regard move over and the past the gateway including when the gateways outside of and behind the Field of Regard for the respective satellite. This enables the gateways to establish connection with the satellite prior to the spot beams covering the subscriber terminals and then maintain connection to the satellite while the subscriber terminals handover to the satellite and while the subscriber terminals handover to the next satellite to allow seamless communication for the subscriber terminals. This configuration is depicted graphically in FIG. 47 which shows satellite 1400 and satellite 1402. Satellite 1400 provides non-articulated spot beam 404 which implements time domain beam hopping for communicating with the plurality of the subscriber terminals ST. Satellite 1402 provides non-articulated spot beam 1406 that implements time domain beam hopping for communication with a plurality of subscriber terminals ST. It is possible that both satellites 1400 and 1402 are simultaneously in communication with gateway 1120. In another embodiment, epoch allocations are made to non-articulated beams such that no beam hopping is required in a geographic area.

In one embodiment, gateway 1120 includes two antennas, including antenna 1122 for communicating with satellite 1402 (the eastern satellite) and antenna 1124 for communicating with satellite 1400 (the western satellite). As the satellites of the constellation move west to east, the gateway's antennas will be in communication with different pairs of satellites. Gateway 1120 includes the modem 1126 in communication with antenna 122 and modem 1128 in communication with antenna 1124. Gateway 1120 also includes gateway processor 1130 that is in communication with modem 1126, modem 1128 and network interface 1132 (which connects to the Internet or other network). The spot beams that satellite 1402 and 1400 use to connect to gateway 1120 are steerable so that they can remain pointed at the gateway as the satellites and the Field of Regards move. This is described in more detail with respect to the flow chart of FIG. 48 and the graphs of FIGS. 49A-E.

Figure 49A:
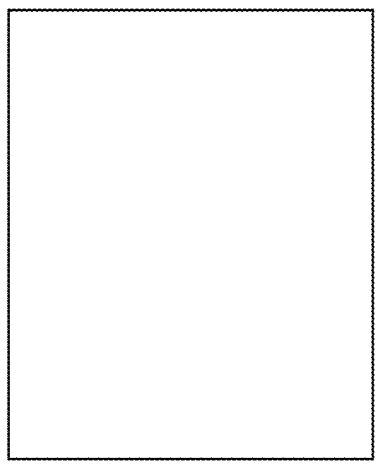
FIGS. 49A, 49B, 49C, 49D and 49E depict a Field of Regard of a satellite moving over coverage regions as the satellite orbits the Earth.

In step 1430 of FIG. 48, the gateway is connected to satellite 1 via steerable spot beam for satellite 1 in order to communicate with its subscriber terminals via satellite 1. In step 1432, while the gateway is communicating with subscriber terminals via satellite 1 (e.g., the gateway is in the Field of Regard satellite 1) and the gateway is not in the Field of Regard of satellite 2 because the gateway is east (in front) of satellite 2, the gateway establishes synchronization with satellite 2 using the timing beacon for satellite 2 (timing synchronization aligns gateway forward burst with the allocated time slot reference on the satellite). In step 1434, satellite 2 moves its steerable beams (e.g., beams 286, 288, 290, 292, 294, 296, 270, 272, 274, 276, 278, 280, 282 or 284 of FIG. 2) to point at the gateway and the gateway initiates a forward link for communication with the subscriber terminals. FIG. 49A depicts the situation existing at the time of step 1434.

FIG. 49A shows the gateway GW surrounded by five coverage areas B1, B2, B3, B4 and B5 each of those coverage areas B1-B1 include a plurality of subscriber terminals that are supported by and are in communication with the gateway. FIG. 49A shows that the Field of Regard for satellite 2 is east of the gateway and the coverage areas B1-B5 such that is not covering or overlapping with the gateway or the coverage area of B1-B5. Despite the fact that the gateway is outside the Field of Regard for satellite 2, satellite 2 points/moves one of its steerable beams to cover (point at) and communicate with the gateway.

Figure 49B:
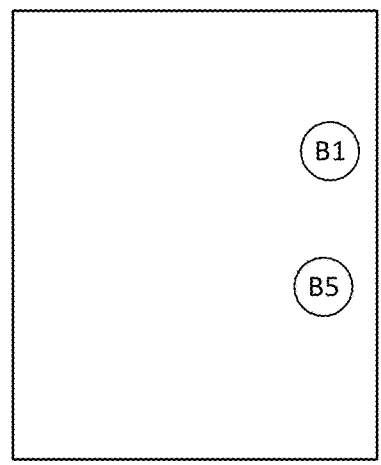

In step 1436, satellite 2 establishes internal connectivity to service the gateway, including providing initial bandwidth to the steerable spot beam for establishing communication. Satellite 2 provides connectivity for the gateway to communicate via the steerable spot beam with subscriber terminals. In step 1438, as the non-articulated spot beams performing time domain beam hopping (and the Field of Regard) traverse across the coverage region supported by the gateway, additional terminals handover to satellite 2 and re-establish communication with the gateway. For example, FIG. 49B shows a portion of the Field of Regard for satellite 2 covering and including coverage areas B1 and B5. Therefore, subscriber terminals in coverage areas B1 and B5 will have handed over to satellite 2 and established communication with gateway GW via satellite 2.

Figure 49C:
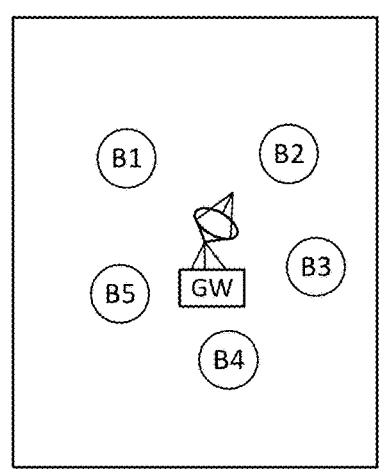

As discussed above, the steerable beams can include a single purpose beam that only communicate with gateways or dual purpose beams that can communicate with gateways and subscriber terminals. If the steerable spot beam that is pointed to and communicating with the gateway is a dual purpose spot beam, then as that dual purpose spot beam traverses across the Field of Regard, including the non-articulated spot beams implementing time domain beam hopping, the system can optionally use the steerable spot beam for communicating with the subscriber terminals. If the system uses the steerable spot beam to communicate with the subscriber terminals, then the non-articulated spot beams that implement time domain beam hopping that overlap with the steerable spot beam will (optionally) be turned off while they overlap with the steerable spot beam. When these non-articulated spot beams are turned off the one or more epochs that they would have been assigned in the hopping plan are then provided to other spot beams in the same hopping group in step 1440 In step 1442, as more subscriber terminals establish communication with the gateway (due to movement of satellite 2), satellite 2 provisions more bandwidth to the gateway including updating internal connectivity to provide additional bandwidth. That is, the steerable spot beam can be able to communicate using multiple colors (see frequency plan described above). Initially one color can be provided to the spot beam. As more subscriber terminals connect to the gateway, additional colors can be added to the non-articulated spot beams frequency allocation. FIG. 49C shows the Field of Regard for satellite 2 encompassing the gateway in coverage regions B1-B5. Therefore, all the subscriber terminals that are supported by gateway GW are now communicating with gateway GW via satellite 2. As satellite 2 moves from its position in FIG. 49A to its position in FIG. 49C, it adjusts the pointing of the steerable spot beams so that the steerable keeps pointing at gateway GW. In step 144, the gateway breaks its connection with satellite 1 as satellite 1 is moved to orbital position in which it can no longer service any subscriber terminals supported by the gateway, thus freeing up the steerable spot beam that satellite 1 was using to point at the gateway to be used for another gateway.

Figure 49D:
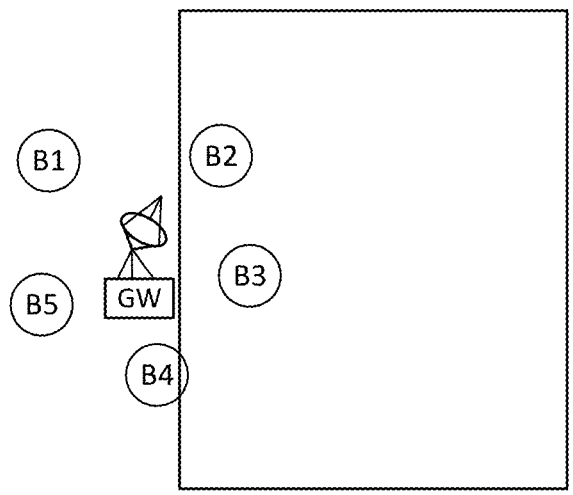
Figure 49E:
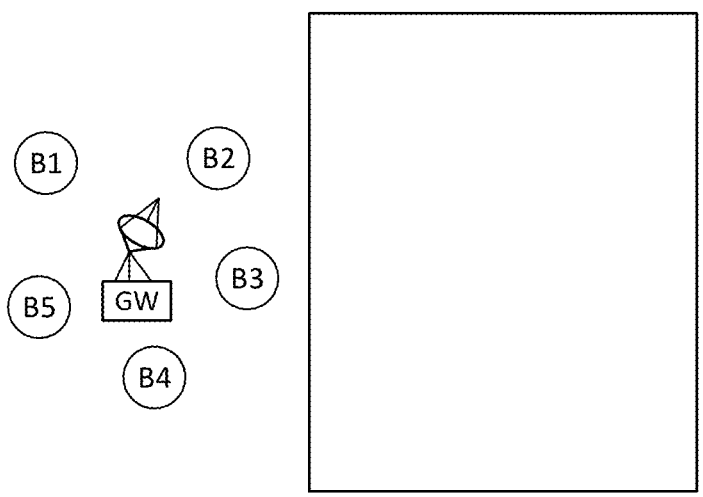

In step 1446, as the Field of Regard for satellite 2 leaves the region supported by the gateway, additional subscriber terminals start to handover to satellite 3 for communication with the gateway via satellite 3. Not that in between steps 1444 and 1446 is an arrow 1445. That arrow indicates when the process of FIG. 48 is started again for satellites 2 and 3 (rather than satellites 1 and 2). In step 1448, as most subscriber terminals stop communication with the gateway via satellite 2, satellite 2 provisions less bandwidth to the gateway, including configuring internal connectivity (the selection matrices and digital channelizer) to reduce the provisioned bandwidth for the steerable spot beam pointing at gateway GW. FIG. 49D shows the Field of Regard of satellite 2 moving east of gateway GW and only covering coverage areas B2 and B3, as well as a small portion of coverage area B4. At this point, subscriber terminals in coverage areas B1 and B5 have handed over to the next satellite. The gateway remains in contact with satellite 2 as long as satellite 2 is in an orbital position to service any of the subscriber terminals supported by the gateway, even if the Field of Regard of satellite 2 does not illuminate the gateway because the gateway is behind the Field of Regard, as depicted in FIG. 49D (step 1450). In step 1452, the gateway will break the connection with satellite 2 if satellite 2 has moved to an orbital position which it can no longer service any terminal supported by the gateway. For example, FIG. 49E shows a Field of Regard of satellite 2 east of coverage areas B1. B2, B3, B4 and B5.

Synchronization

Because of the timing as discussed above, it is important that the satellites, subscriber terminals and gateways all remain in tight synchronization. In one embodiment, a master clock is maintained and accessed at a terrestrial location. For example, the master clock can be maintained by or at the network control center. As each satellite passes over or near the network control center, the satellites will synchronize with the network control center, or synchronize with the master clock. The gateways will then synchronize with each satellite prior to connection with the satellite so that the gateways are now in synchronization with the satellite they are communicating with. The subscriber terminals will be responsible for maintaining synchronization with the gateways. In this system, each satellite comprises an antenna system that is configured to receive command information from a ground center (e.g., network control center) includes a command to adjust a clock on the satellite to synchronize the satellite to a master clock. The satellite also sends a beacon signal toward the Earth (i.e., toward multiple gateways). The beacon signal includes timing information to synchronize the gateway to the satellite. The gateways are configured to communicate with the satellite and with the terminals via the satellite. The gateway is configured to receive the beacon signal from the satellite and synchronize to the satellite based on the beacon signal. The gateway is configured to send communication to the terminal via the satellite. The communication includes timing data for the terminal synchronize to the gateway.

FIG. 50 is a flow chart describing one embodiment of a process for performing timing synchronization for the satellite communication system. In step 1502, network control system 230 (FIG. 1) maintains a master clock. In step 1504, as the satellite passes above or near the network control center (or to the nearest location to the network control center in its orbit), the network control center sends a timing message that includes a command to set the clock on the satellite. The network control center may also send one or more hopping plans. In one embodiment, the master clock is maintained at the network control center. In another embodiment, the master clock is maintained at another location but the network control center can access the master clock and send the command to the satellite. That command can set the satellite's clock to the master clock or to adjust the satellite's clock accordingly. In step 1506, in response to receiving the command, the satellite clock sets or otherwise updates its clock to the master clock, thereby synchronizing the satellite to the master clock (and synchronizing the satellite to the network control center).

In step 1508, the satellite transmits a beacon signal that includes timing information. The beacon signal is a broad beam that may cover the entire face of the planet that can be seen by the satellite. In step 1510, prior to establishing communication with the satellite (prior to establishing communication with subscriber terminals via the satellite) for the current orbit, the gateway synchronizes with a satellite using the satellite's beacon signal (timing synchronization aligns the gateway forward burst with the allocated time slot reference on the satellite while accounting for delay and Doppler-see step 1432 of FIG. 48). The gateway will then establish communication with the satellite to implement connections between the gateway and a plurality of subscriber terminals via the satellite. In step 1512, the gateway sends communication to the subscriber terminals via the satellite, that communication includes timing data. In step 1514, subscriber terminals synchronize to the gateway during the communication based on the timing data, aligning the subscriber terminal timing with the satellite clock. In one embodiment, the communication includes user data so that the subscriber terminal synchronizes to the gateway while communicating user data with the gateway.

Figure 51:
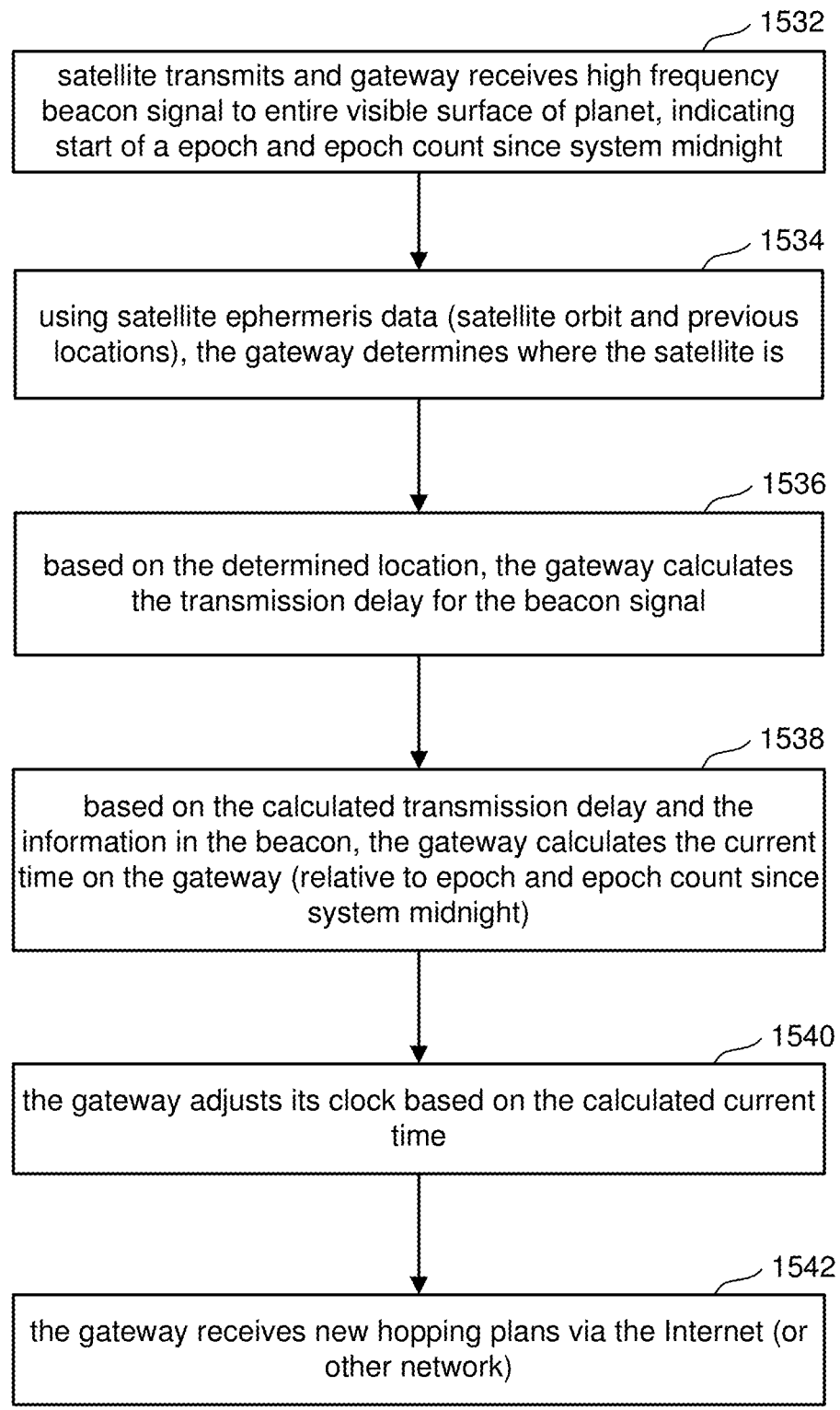
FIG. 51 is a flow chart describing one embodiment of a process for synchronizing a gateway to a satellite.

FIG. 51 is a flow chart describing more details of the process for synchronizing the gateway. In one embodiment, the process of FIG. 51 is one example implementation of step 1510 of FIG. 50. In step 1532, the satellite transmits and the gateway receives the high frequency beacon signal that was broadcast to the entire visible surface of the planet. The beacon signal indicates start of an epoch and a number of epochs since midnight. In one embodiment, the entire satellite communication system has an agreed upon midnight. Note that midnight occurs at different times on the planet (i.e., difference time zones) so, in one embodiment, the system picks a single time reference to be the official midnight of the satellite system. In step 1534, using satellite ephemeris data (satellite orbit and previous time tagged locations) the gateway determines where the satellite currently is. In step 1536, based on the determined location, the gateway calculates the current time of day for the gateway (relative to epoch and epoch counts in system midnight). In step 1540, the gateway uses the timing beacon to further adjust its clock based on the calculated current time of day. In step 1542, the gateway receives one or more new hopping plans via the internet (or other network) from the network control center in order to implement in the future.

Figure 51A:
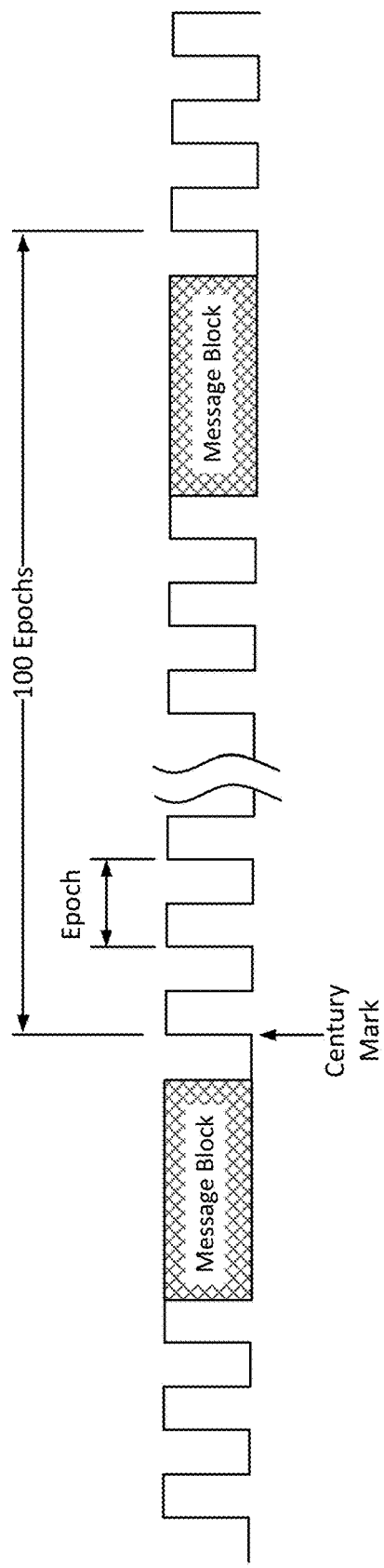
FIG. 51A depicts an example beacon signal.

FIG. 51A provides one example of a beacon signal. In one example embodiment, the beacon signal includes a set of pulses, where the period of pulses is equal to one epoch as depicted in FIG. 51A. The beacon signal will also include a Message Block that indicates the distance in time from system midnight. The Message Block ends each set of a period of time that the gateway knows which epoch within the time of day window the epoch corresponds with. In this case, one hundred epochs (Century). Thus, the first pulse after a Message Block is the start of a new Century. Each message block will identify which century it is in. Therefore, the gateway upon receiving a message block can determine how many epochs there have been since midnight. Additionally, the gateway can use the timing of the pulses to determine when an epoch starts and therefore adjust its clock accordingly.

In one embodiment, the gateway does not tell the subscriber terminals what epoch it may communicate in. This process is described in more detail by the flow chart of FIG. 52, which is one example of implementation of step 1514 of FIG. 50. In step 1560, the subscriber terminal is always looking for the header of a super-frame in the down link. The header contains a unique sequence of bits. Therefore, in one embodiment, the subscriber terminal does not need to know the hopping plan because the subscriber terminal is always looking for the unique sequence of bits. When the subscriber terminal's beam is not active, the subscriber terminal will not see that unique sequence of bits. In step 1562, the subscriber terminal detects the header of the super-frame in the down link. In step 1564, the subscriber terminal uses the symbol phases in the header to adjust its clocking/timing so that the subscriber terminal is now in synchronization with the gateway. In some cases, the gateway will include clock information, date information or other timing information in the payload of the super-frame. If the time of day is in the super-frame, then the subscriber terminal will calculate the current time of day from the subscriber terminal based on the time of day in the super-frame and transmission delay. In step 1570, the calculated current time is used to adjust the clock for the subscriber terminal. If the time of day is not in the super-frame, then no further adjustment is made to the timing (step 1572).

In one embodiment, the gateway will instruct the subscriber terminal when to transmit on the up link and what frequency to use. This will enable the subscriber terminal to transmit when its hopping beam is active, without having to know the full hopping plan.

In one embodiment, when a subscriber terminal is connected to multiple gateways, the subscriber terminal establishes independent timing even if the gateways are communicating over the same satellite. Thus, s first gateway and a second gateway connected to the same subscriber terminal via the same satellite are configured to establish independent (ie separate) timing with the subscriber terminal.

Note that in the above discussion of FIG. 51, the gateway used ephemeris data to calculate the satellite's current location. FIG. 53 is a flow chart describing one embodiment describing one embodiment for a plurality of gateways to determine ephemeris data for a satellite. The process of FIG. 53 can be performed for each satellite multiple times day. In step 1580, multiple gateways receive a GPS signal from the multiple GPS satellites. In step 1582, these gateways will identify GPS time based on those received GPS signals using known methods. In step 1584, the multiple gateways will receive the beacon signal from a particular satellite. Each of the gateways will determine the time of receipt of that beacon signal in GPS time. All the gateways transmit (via the internet or other network) their receive times (in GPS time) of that beacon signal to other gateways. Each of the gateways calculate the location and velocity of the satellite based on the beacon signal received times at each gateway and the known locations of each gateway. This assumes that the gateways are not mobile. This process can also make use for multiple samples of the beacon signal. By knowing the location of a gateway and the time it took to transmit a beacon signal from the satellite to the gateway, it can be calculated how far the satellite is from the gateway. That creates a sphere around the gateway where the satellite can be anywhere on the surface of that sphere. But knowing that sphere from multiple gateways, there will be an intersection point that intersects all the spheres, which represents the location of the satellite at the moment and time. By calculating the satellite at multiple times, the satellite location and velocity can be calculated. By knowing the proposed orbit and a bunch of samples of location and velocity, the gateway can predict the location of the satellite at any given time. If the process of FIG. 53 is performed multiple times a day, then the gateway's ephemeris data will remain current.

One embodiment also includes determining the Doppler to the satellite including receiving the beacon signal at the ground based gateway, determining frequency offset over time of the beacon signal at the ground based gateway; and calculating Doppler to the satellite using the history of the beacon signal frequency offset.

As described above, in one embodiment, the non-geostationary satellites are configured to provide steerable gateway beams and non-articulated gateway beams. The non-geostationary satellite includes a beam hopping plan for the plurality of spot beams using time domain beam hopping, a beam steering plan for the steerable gateway beams, a steering plan for the high capacity bams and a connectivity plan for on-board routing between the gateway beams and the plurality of spot beams using time domain beam hopping. The hopping plan and the connectivity plan are structured as a sequence of epochs.

In some embodiments the satellite clock is adjusted during the reconfiguration time, and/or the clock on the satellite is adjusted by a terrestrial location (e.g., network control center 230, a gateway or other terrestrial location) in burst of small increments periodically while the satellite is in view.

Note that the discussion above introduces many different features and many embodiments. It is to be understood that the above-described embodiments are not all mutually exclusive. That is, the features described above (even when described separately) can be combined in one or multiple embodiments.

One embodiment includes a satellite communication system, comprising: a non-geostationary satellite configured to provide a plurality of spot beams that implement a first frequency plan at Earth's Equator and a second frequency plan away from Earth's Equator, the second frequency plan is different than the first frequency plan.

One embodiment includes a satellite communication system, comprising: a constellation of non-geostationary satellites, each of the non-geostationary satellites configured to provide a plurality of spot beams that include a first subset of spot beams configured to illuminate a first region that is located at Earth's Equator and a second subset of spot beams configured to illuminate a second region away from the Equator, the first set of spot beams implement a first frequency plan, the second set of spot beams implement a second frequency plan different than the first frequency plan.

One embodiment includes a method for communicating, comprising: operating a constellation of non-geostationary satellites; each of the satellites providing spot beams that implement a first frequency plan at Earth's Equator and implement a second frequency plan away from Earth's Equator as the satellites travel in orbit around Earth; multiple satellites of the constellation communicating with a first terminal at the Equator using spot beams that implement the first frequency plan; and multiple satellites of the constellation communicating with a second terminal away from the Equator using spot beams that implement the second frequency plan.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite communication system, comprising:
a non-geostationary satellite configured to provide a plurality of spot beams that implement a first frequency plan for at least two of the spot beams that are planned to illuminate at Earth's Equator and a second frequency plan for at least two other spot beams that are planned to illuminate Earth elsewhere than Earth's Equator, where the second frequency plan is different than the first frequency plan.

2. The satellite communication system of claim 1, wherein:
the Earth illuminating plans of the satellite include a first subset of two or more rows of spot beams configured to illuminate a first region that overlaps Earth's Equator and a second subset of two or more rows of spot beams configured to illuminate a second region that does not overlap the Equator, where the first subset of spot beams implement the first frequency plan, the second subset of spot beams implement the second frequency plan.

3. The satellite communication system of claim 1, wherein:
the first frequency plan specifies frequency bands that are allowed to be used and frequency bands that are not allowed to be used by beams implementing the first frequency plan; and
the second frequency plan specifies frequency bands are allowed to be used and frequency bands are not allowed to be used by beams implementing the second frequency plan.

4. The satellite communication system of claim 3, wherein:
the second frequency plan allows use of frequency bands not allowed to be used in the first frequency plan.

5. The satellite communication system of claim 3, wherein:
the non-geostationary satellite has a plurality of antennas for providing the plurality of spot beams that are planned to illuminate Earth and the plurality of antennas are configured to also receive respective uplink signals from respective spots on Earth that the respective antennas can illuminate by way of their respective spot beams;

the first frequency plan allows use of different uplink frequency bands than allowed by the second frequency plan; and the first frequency plan allows use of includes different downlink frequency bands than allowed by the second frequency plan.

6. The satellite communication system of claim 3, wherein:
the second frequency plan allows use of larger continuous frequency ranges than does the first frequency plan.

7. The satellite communication system of claim 3, wherein:
the second frequency plan allows use of a greater number of continuous frequency ranges than does the first frequency plan.

8. The satellite communication system of claim 3, wherein:
the second frequency plan allows use of more bandwidth than does the first frequency plan.

9. The satellite communication system of claim 3, wherein:
the first frequency plan specifies respective beam polarizations to be used for the respective frequency bands that are allowed to be used by beams implementing the first frequency plan; and
the second frequency plan specifies respective beam polarizations to be used for the respective frequency bands that are allowed to be used by beams implementing the second frequency plan.

10. The satellite communication system of claim 1, wherein:
the non-geostationary satellite is configured to implement time-domain beam hopping for at least a subset of the plurality of spot beams that are non-articulated spot beams so as to compensate for movement of the non-geostationary satellite relative to Earth's surface and for potentially varying dwell time preferences or needs of surface terminals.

11. The satellite communication system of claim 10, wherein:
the Earth illuminating plans of the satellite include a first subset of spot beams configured to illuminate a first region that is located at Earth's Equator and a second subset of spot beams configured to illuminate a second region away from the Equator;
the first subset of spot beams implement the first frequency plan;
the second subset of spot beams implement the second frequency plan;
the first subset of spot beams implement a first beam hopping plan; and
the second subset of spot beams implement a second beam hopping plan that is different than the first beam hopping plan.

12. The satellite communication system of claim 11, wherein:
the first subset of spot beams are divided into respective subdivisions for respectively illuminating respective parts of a first set of predetermined zones on Earth's surface and into respective first beam hopping groups where each first beam hopping group has plural beams and no more than one beam thereof is planned to illuminate a corresponding part of the first set of predetermined zones;
the second subset of spot beams are divided into a second set of predetermined zones and into respective second beam hopping groups where each second beam hopping group has plural beams and at least one beam thereof is planned to illuminate a corresponding part per of the second set of predetermined zones;
the first set of zones are in a first area at the Equator; and
the second set of zones are in a second set of areas away from the Equator, the second set of areas are above and below the Equator.

13. The satellite communication system of claim 1, further comprising:
additional satellites that together with the non-geostationary satellite form an Earth surrounding constellation of spaced apart non-geostationary satellites that each are configured to similarly implement the first frequency plan at Earth's Equator and the second frequency plan away from Earth's Equator.

14. The satellite communication system of claim 13, wherein:
each respective satellite of the constellation has a respective same beam map; and
each satellite of the Earth surrounding constellation of spaced apart non-geostationary satellites is configured to travel along a same orbital path.

15. A satellite communication system, comprising:
a non-geostationary satellite configured to provide a plurality of spot beams that implement a first frequency plan at Earth's Equator and a second frequency plan away from Earth's Equator, the second frequency plan is different than the first frequency plan, wherein:
the satellite includes a first subset of spot beams configured to illuminate a first region that is located at Earth's Equator and a second subset of spot beams configured to illuminate a second region away from the Equator;
the first set of spot beams implement the first frequency plan;
the second set of spot beams implement the second frequency plan;
the first set of spot beams consist of only non-articulated spot beams relative to the satellite; and
the second set of spot beams includes non-articulated spot beams relative to the satellite and steerable spot beams.

16. A satellite communication system, comprising:
a constellation of non-geostationary satellites spaced apart to surround the Earth, each of the non-geostationary satellites configured to provide a plurality of spot beams that include a first subset of plural spot beams configured to illuminate within a first region that is located at Earth's Equator and a second subset of plural spot beams configured to illuminate within a second region away from the Equator and not illuminated by the first subset, the first subset of plural spot beams implement a first frequency plan, the second subset of plural spot beams implement a second frequency plan different than the first frequency plan.

17. The satellite communication system of claim 16, wherein:
each respective satellite of the constellation has a respective same beam map; and
each satellite of the constellation is configured to travel along a same orbital path.

18. The satellite communication system of claim 16, wherein:
each satellite of the constellation is configured to implement time-domain beam hopping for its respective plurality of spot beams that are non-articulated spot beams so as to compensate for movement of the respective non-geostationary satellite relative to Earth's surface and for potentially varying dwell time preferences or needs of surface terminals.

19. The satellite communication system of claim 18, wherein:
the first subset of spot beams for each satellite of the constellation is configured to implement a first beam hopping plan; and
the second subset of spot beams for each satellite of the constellation is configured to implement a second beam hopping plan that is different than the first beam hopping plan.

20. The satellite communication system of claim 19, wherein:
the first subset of spot beams for each satellite of the constellation is divided into a first set of zones and a first set of beam hopping groups that have no more than one beam per zone of the first set of zones;
the second subset of spot beams for each satellite of the constellation is divided into a second set of zones and a second set of beam hopping groups that have no more than one beam per zone of the second set of zones;
the first set of zones are in the first region; and
the second set of zones are in the second region, the second region includes areas above and below the Equator.

21. The satellite communication system of claim 16, wherein:
the first frequency plan specifies frequency bands that are allowed to be used and frequency bands that are not allowed to be used by beams implementing the first frequency plan; and
the second frequency plan specifies frequency bands are allowed to be used and frequency bands are not allowed to be used by beams implementing the second frequency plan.

22. A method for communicating, comprising:
operating a constellation of non-geostationary satellites;
each of the satellites being operated to provide a respective plurality of spot beams that implement a first frequency plan for at least two of the spot beams of the respective satellite that are planned to illuminate at Earth's Equator and implement a different second frequency plan for at least two others of the spot beams of the respective satellite that are planned to illuminate Earth elsewhere than Earth's Equator as the satellites travel in orbit around Earth;
where said operating of the constellation of non-geostationary satellites includes having multiple satellites of the constellation communicating with a first terminal at the Equator using spot beams that implement the first frequency plan; and
having multiple satellites of the constellation communicating with a second terminal away from the Equator using spot beams that implement the second frequency plan.

23. The method of claim 22, wherein:
the operating the constellation of non-geostationary satellites includes having each of the satellites of the constellation traveling spaced apart along a same orbital path so that the constellation surrounds the Earth; and
the communicating with the first terminal and the communicating with the second terminal includes using a respective same beam map for each respective one of the satellites of the constellation.

24. The method of claim 23, wherein:
the communicating with the first terminal and the communicating with the second terminal includes using respective adjacent fields of regard of respective ones of the satellites of the constellation.

25. The method of claim 22, wherein:
the communicating with the first terminal and the communicating with the second terminal includes implementing time domain beam hopping for the spot beams of each of the satellites of the constellation, the beam hopping spot beams being non-articulated spot beams such that the implemented time domain beam hopping compensates for movement of the respective non-geostationary satellites relative to Earth's surface and for potentially varying dwell time preferences or needs of surface terminals.

26. The method of claim 22, wherein:
each of the satellites includes a first set of spot beams configured to illuminate a first region that is located at Earth's Equator and a second set of spot beams configured to illuminate a second region away from the Equator;
the first set of spot beams implement the first frequency plan;
the second set of spot beams implement the second frequency plan; and
the communicating with the first terminal and the communicating with the second terminal includes implementing a first time domain beam hopping plan for the first set of spot beams of each of the satellites of the constellation and implementing a second time domain beam hopping plan for the second set of spot beams of each of the satellites of the constellation, where the first set of spot beams and the second set of spot beams are non-articulated spot beams.

27. The method of claim 26, wherein:
the first set of spot beams for each satellite of the constellation is divided into a first set of zones and a first set of beam hopping groups that have no more than one beam per zone of the first set of zones;
the second set of spot beams for each satellite of the constellation is divided into a second set of zones and a second set of beam hopping groups that have no more than one beam per zone of the second set of zones;
the first set of zones are in the first region; and
the second set of zones are in the second region, the second region includes areas above and below the Equator.

* * * * *